United States Patent [19]
Matsumaru et al.

[11] Patent Number: 5,196,972
[45] Date of Patent: Mar. 23, 1993

[54] CASSETTE LOADING DEVICE FOR VIDEO CASSETTE RECORDER

[75] Inventors: Masahiro Matsumaru, Abiko; Mitsuo Harumatsu, Tokyo; Masato Mihara, Hiratsuka, all of Japan

[73] Assignee: Victor Company of Japan, Ltd., Japan

[21] Appl. No.: 624,010

[22] Filed: Dec. 7, 1990

[30] Foreign Application Priority Data

| Dec. 7, 1989 | [JP] | Japan | 1-318600 |
|---|---|---|---|
| Mar. 30, 1990 | [JP] | Japan | 2-83785 |
| Mar. 30, 1990 | [JP] | Japan | 2-83786 |
| Mar. 30, 1990 | [JP] | Japan | 2-83787 |
| Aug. 27, 1990 | [JP] | Japan | 2-225684 |

[51] Int. Cl.⁵ .......................... G11B 5/48; G11B 21/16
[52] U.S. Cl. ...................................... 360/94; 360/96.5
[58] Field of Search ................... 360/94, 96.5, 71, 137; 242/199

[56] References Cited

U.S. PATENT DOCUMENTS

| 4,607,301 | 8/1986 | Iizuka | 360/96.5 X |
|---|---|---|---|
| 4,680,654 | 7/1987 | Shibuya | 360/96.5 |
| 4,873,593 | 10/1989 | Baranski | 360/96.5 |
| 4,918,550 | 4/1990 | Baranski | 360/94 |
| 4,953,042 | 8/1990 | Yoshikawa | 360/96.5 |
| 4,979,061 | 12/1990 | Kishimoto et al. | 360/96.5 |
| 4,992,894 | 2/1991 | Kaisha | 360/94 |
| 5,032,939 | 7/1991 | Mihara et al. | 360/94 |
| 5,038,238 | 8/1991 | Kim | 242/199 X |

FOREIGN PATENT DOCUMENTS 3336604 4/1984 Fed. Rep. of Germany .
3644284 6/1987 Fed. Rep. of Germany .
3626941 2/1988 Fed. Rep. of Germany .

Primary Examiner—John H. Wolff
Attorney, Agent, or Firm—Lowe, Price, Le Blanc & Becker

[57] ABSTRACT

A cassette loading device of the front loading type selectively loads standard and smaller cassettes into a loaded position in a video cassette recorder, and ejects the loaded cassette from the video cassette recorder. A housing has a cassette insertion slot, a first door mounted on the housing for selectively opening and closing the cassette insertion slot, and a second door mounted on the first door for selectively opening and closing an opening defined in the first door. A pair of door lock members is mounted on the housing one on each side of the cassette insertion slot. When no cassette is inserted, the first door is locked against angular movement by the door lock members, and when a standard cassette is inserted through the cassette insertion slot, a tapered surface of each of the door lock members is pushed by the inserted standard cassette to disengage an engaging surface of the door lock member from the first door to unlock the first door. When a smaller cassette is inserted through the opening, the smaller cassette is guided through the opening while opening the second door. The second door can be locked by another pair of door lock members on one side of the opening.

13 Claims, 37 Drawing Sheets

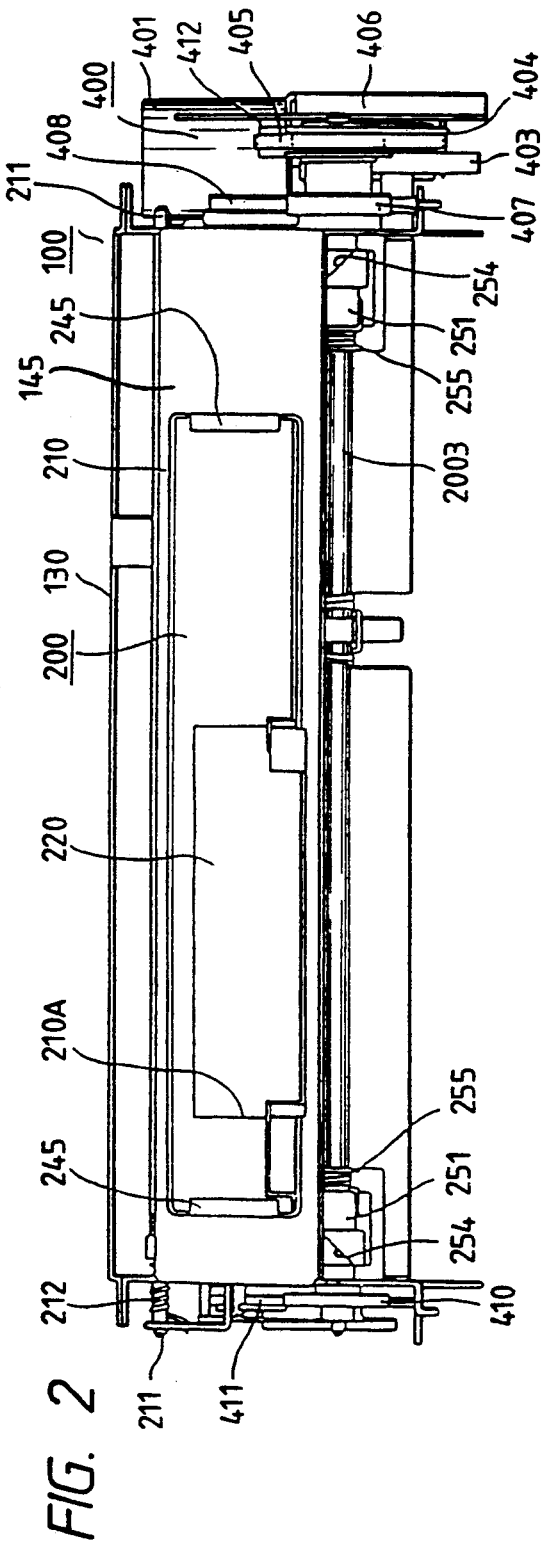
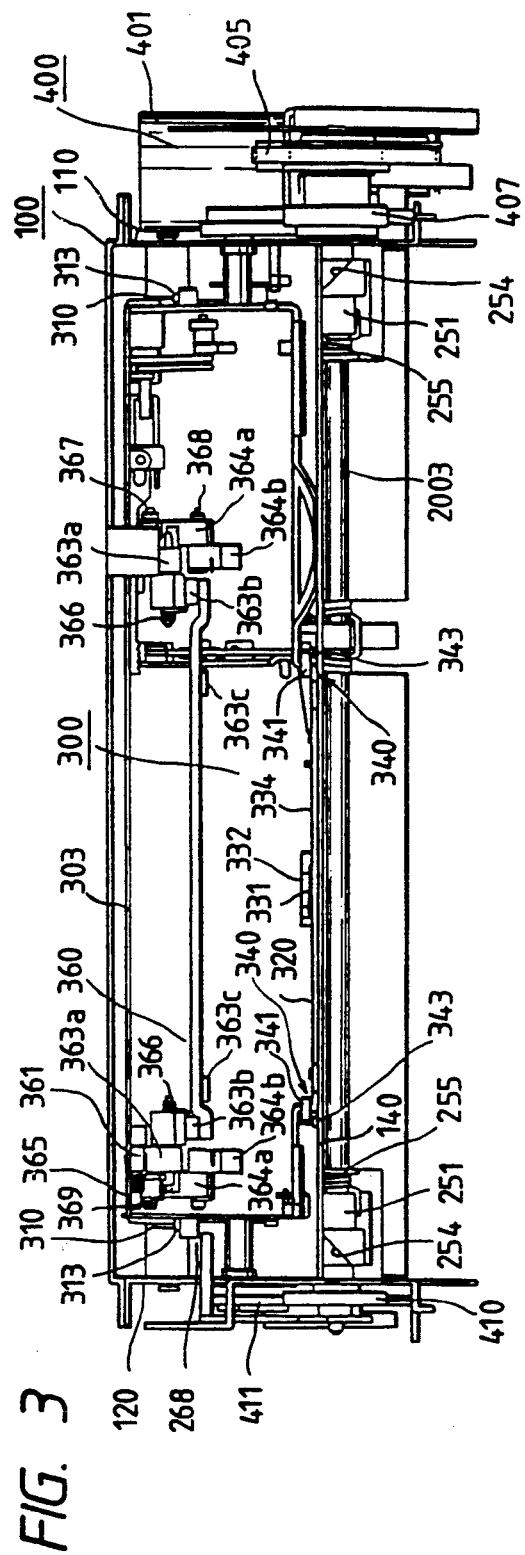
FIG. 2
FIG. 3

X ⟶ Y

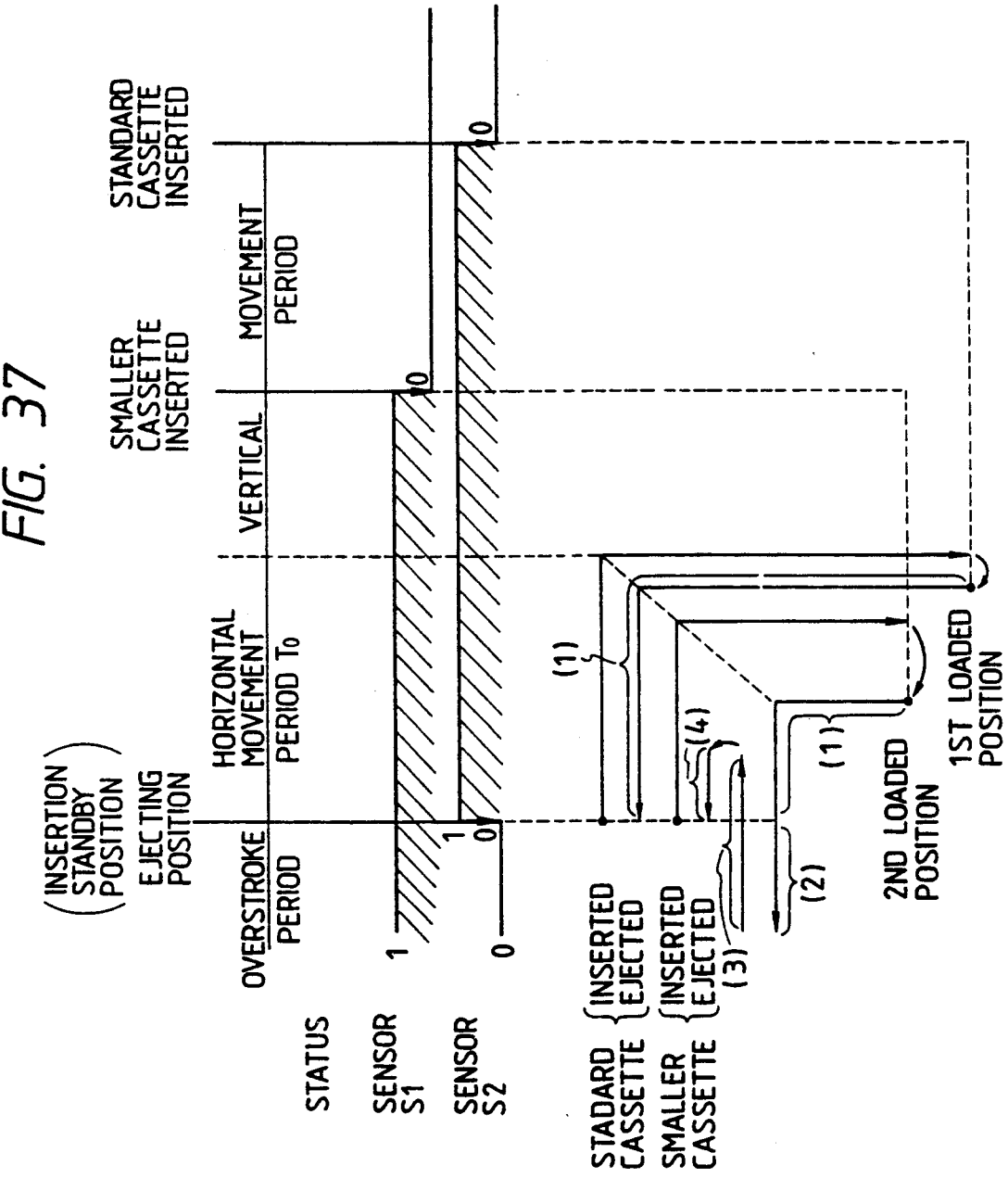

(INSERTION OF CASSETTE)

(EJECTION OF CASSETTE)

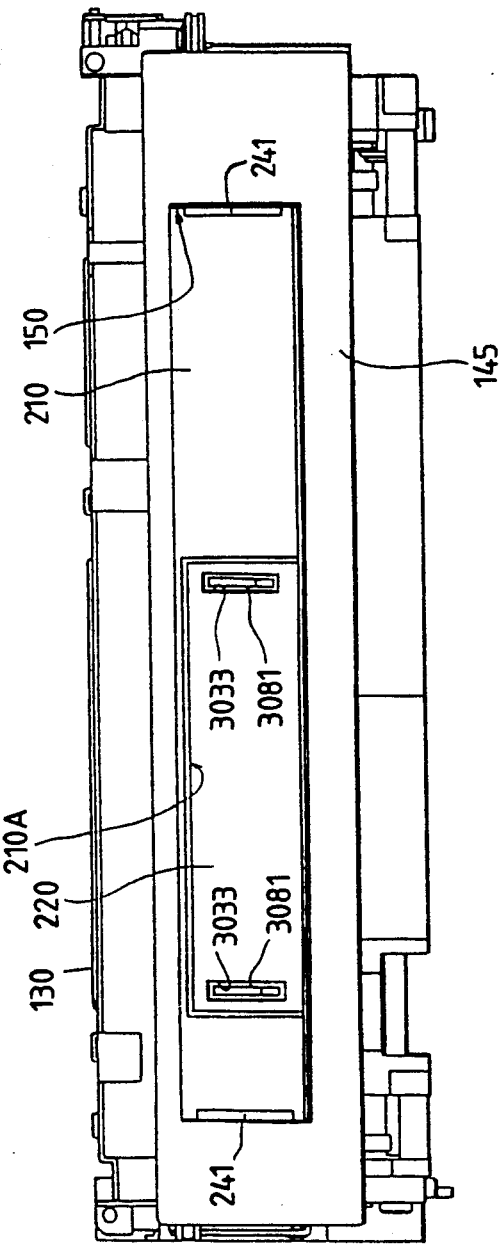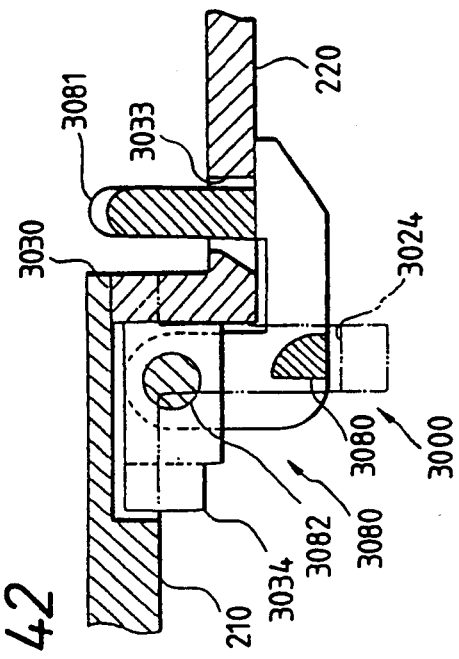

CASSETTE LOADING DEVICE FOR VIDEO CASSETTE RECORDER

BACKGROUND OF THE INVENTION

1. Field of the Invention

The present invention relates to a cassette loading device of the front loading type for loading a cassette with a magnetic tape wound on two reels therein, into a video cassette recorder (VCR).

2. Prior Art

Certain cassette loading devices of the front loading type for use in VCRs are constructed such that they can selectively loading standard cassettes and smaller cassettes into the VCRs.

Known cassette loading devices of the above type include a cassette holder for holding a cassette and loading the cassette into a loaded position. The cassette holder has a width which is substantially the same as the width of the standard cassette. Therefore, without some cassette positioning mechanism, the smaller cassette might be placed anywhere in the cassette holder and might not be inserted as desired in a predetermined proper position in the cassette holder.

Japanese Laid-Open Patent Publications Nos. 63(1988)-146263 and 63(1988)-191347, for example, disclose cassette loading devices which can insert a smaller cassette in a predetermined proper position in such a cassette holder.

The cassette loading device shown in the former publication includes two cassette detectors positioned respectively at locations spaced from each other by a distance which is substantially the same as the width of the smaller cassette, two lock members also positioned at those locations, respectively, and actuatable in ganged relation to the cassette detectors, and a cassette insertion prevention lid disposed substantially centrally between the cassette detectors. These detectors, lock members, and cassette prevention lid are positioned in a cassette insertion slot. When a smaller cassette is inserted in a proper position through the cassette insertion slot, the cassette detectors and lock members are operated to open the cassette insertion prevention lid, thereby allowing the smaller cassette to be loaded in position. When the smaller cassette is inserted in a wrong position, only one cassette detector is actuated, and the other cassette detector and lock member remain inactivated, keeping the cassette insertion prevention lid closed.

However, the cassette detectors, the lock members, and the cassette insertion prevention lid are complex in structure, increase the number of parts used, and make the cassette loading device costly to manufacture. The disclosed cassette loading mechanism is located on an upper panel of the cassette holder, so that the overall thickness or vertical dimension of the cassette loading device is relatively large, and so is the VCR in which the cassette loading device is incorporated.

The cassette loading device disclosed in the latter publication has two horizontally divided doors which normally cover a cassette insertion slot. One of the doors, for example, the left door, has a width corresponding to the width of the smaller cassette. The doors are associated with respective door lock levers. A smaller cassette can be inserted into the cassette holder while opening the left door, and a standard cassette can be inserted into the cassette holder while opening both the left and right doors. The smaller and standard cassettes, which are alternatively loaded in position, have their left and front end surfaces positioned in alignment with a common plane. The disclosed cassette loading device is designed for loading cassettes for professional use, known as MII-format VCR cassettes.

The door lock levers are disposed in a low position. Since a smaller cassette is pushed upwardly by the door lock members, it has to be inserted with horizontal forces as well as downward forces applied thereto. Consequently, it is relatively difficult to insert the smaller cassette into the VCR.

A smaller cassette for consumer use, typically referred to as VHS-C (registered trademark) cassette, is narrower than such a smaller cassette for professional use. Therefore, a smaller cassette for consumer use cannot be inserted in a proper position by the disclosed cassette loading device.

One solution is to employ a smaller door corresponding to a consumer-use smaller cassette, the smaller door being pivotally mounted on a larger door and displaced inwardly, i.e., spaced a certain distance from the left end of the larger door. Since the smaller door is spaced from the left end of the larger door, the left lock lever associated with the smaller door is also displaced inwardly, i.e., spaced from the left end of the larger door. However, when a standard cassette is inserted and ejected through the larger door, the left lock lever which is displaced inwardly tends to project into an opening in the bottom of the standard cassette, which opening serves to receive a tape loading member in the VCR. The lock lever thus projecting into the opening in the cassette bottom is liable to damage the magnetic tape in the standard cassette.

The above construction is also incorporated in a VCR which employs a standard cassette known as a VHS (registered trademark) cassette for consumer use and a smaller cassette or a VHS-C cassette for consumer use. When a cassette is loaded in such a VCR, the doors are closed and locked by the door lock levers. In order to eject the loaded cassette, the door lock levers must be turned into an unlocking position by solenoids or the like. Because of the solenoids used, the number of parts required is relatively large, the VCR itself is expensive to manufacture, and the sequence of controlling the cassette loading device is complex.

When a loaded cassette is to be ejected, the doors are turned into an open position by levers. Heretofore, both doors are turned when a standard cassette is ejected or a smaller cassette is ejected. Therefore, the right door, which has nothing to do with the smaller cassette, is also turned, when the smaller cassette is ejected. Upon reinsertion of the ejected smaller cassette, the smaller cassette may be laterally displaced as it is not limited in lateral position by the right door. The laterally displaced smaller cassette cannot however be inserted properly into the VCR. The right door which is turned into its open position when the smaller cassette is ejected also allows entry of foreign matter into the VCR.

Japanese Laid-Open Patent Publication No. 63(1988)-55754 discloses a cassette loading device which can insert a smaller cassette into a predetermined normal position in a VCR. The disclosed cassette loading device has a guide for guiding a smaller cassette which is inserted through a corresponding door. The guide is movable in ganged relation to a lever which is angularly moved when pushed by a standard cassette which is inserted through a corresponding door. When the standard cassette is inserted, the guide is moved out of the path of the standard cassette in ganged relation to the lever.

The above cassette loading device requires the special guide for guiding smaller cassettes. The door for smaller cassettes is freely angularly movable when no smaller cassette is inserted. Therefore, a smaller cassette may erroneously longitudinally be inserted through the door, or foreign matter may be inserted through the door.

SUMMARY OF THE INVENTION

It is an object of the present invention to provide a cassette loading device for inserting standard and smaller cassettes into respective normal positions in a cassette holder and loading the cassettes into respective predetermined loaded positions in a video cassette recorder, and for allowing standard and smaller cassettes to be loaded and ejected without any damage to magnetic tapes in the cassettes.

Another object of the present invention is to provide a cassette loading device for ejecting a loaded cassette while unlocking a door with a simple arrangement, i.e., without solenoids or special complex unlock mechanisms.

Still another object of the present invention is to provide a cassette loading device for ejecting a smaller cassette while locking a first door for a standard cassette and opening only a second door for the smaller cassette, and for ejecting the standard cassette while unlocking the first door.

Yet another object of the present invention is to provide a cassette loading device for opening only a second door for a smaller cassette when the smaller cassette is ejected, for allowing the ejected smaller cassette to be reinserted in a proper position without positional displacements, and for opening both the second door and a first door for a standard cassette when the standard cassette is ejected.

Yet still another object of the present invention is to provide a cassette loading device for normally locking doors for standard and smaller cassettes in closed positions to prevent fingers and foreign matter from entering the cassette loading device, for opening only the door for a smaller cassette when the smaller cassette is inserted from a proper position and in a proper direction to allow the smaller cassette to be inserted smoothly and reliably, and for opening both the doors for standard and smaller cassettes when the standard cassette is inserted from a proper position and in a proper direction, to allow the standard cassette to be inserted smoothly and reliably.

A still further object of the present invention is to provide a cassette loading device for inserting a smaller cassette stably while guiding the smaller cassette with simple guides which limit the smaller cassette in lateral position.

According to the present invention, there is provided a cassette loading device of the front loading type for loading a cassette into a loaded position in a video cassette recorder, comprising a housing having a cassette insertion slot, a door mounted on the housing for selectively opening and closing the cassette insertion slot, a door lock member mounted on the housing and having an engaging surface for locking the door in engagement therewith and a tapered surface for engaging a cassette which is about to be inserted into the cassette insertion slot in front of the door, and a door unlock member mounted on the housing and having an engaging surface for engaging the cassette which is loaded in the loaded position in the video cassette recorder and a control surface for controlling the door lock member. When the cassette is inserted through the cassette insertion slot, the tapered surface of the door lock member is pushed by the inserted cassette to disengage the engaging surface from the door to unlock the door, and when the cassette is thereafter brought into the loaded position, the engaging surface of the door unlock member is engaged by the inserted cassette to cause the control surface to keep the engaging surface of the door lock member out of engagement with the door, for thereby unlocking the door.

According to the present invention, there is also provided a cassette loading device of the front loading type for selectively loading a standard cassette and a smaller cassette into a loaded position in a video cassette recorder, comprising a housing having a cassette insertion slot, the cassette insertion slot having a width which is substantially the same as the width of the standard cassette, a first door mounted on the housing for selectively opening and closing the cassette insertion slot, the first door having an opening defined therein, the opening having a width which is substantially the same as the width of the smaller cassette, a second door mounted on the first door for selectively opening and closing the opening, and a pair of door lock members mounted on the housing one on each side of the cassette insertion slot, each of the door lock members having an engaging surface for locking the first door in engagement therewith and a tapered surface for engaging a standard cassette which is about to be inserted into the cassette insertion slot in front of the first door. When no cassette is inserted, the first door is locked at lateral opposite ends thereof against angular movement by the door lock members, and when the standard cassette is inserted through the cassette insertion slot, the tapered surface of each of the door lock members is pushed by the inserted standard cassette to disengage the engaging surface from the first door to unlock the first door, and when the smaller cassette is inserted through the opening, the smaller cassette is guided through the opening while opening the second door.

The cassette loading device further includes a pair of door unlock members mounted on the housing one on each side of the cassette insertion slot, each of the door unlock members having an engaging surface for engaging the standard cassette which is loaded in the loaded position in the video cassette recorder and a control surface for controlling the door lock member, the arrangement being such that when the standard cassette is inserted through the cassette insertion slot, the tapered surface of each of the door lock members is pushed by the inserted cassette to disengage the engaging surface from the first door to unlock the first door, and when the standard cassette is thereafter brought into the loaded position, the engaging surface of each of the door unlock members is engaged by the inserted standard cassette to cause the control surface to keep the engaging surface of each of the door lock members out of engagement with the first door, for thereby unlocking the door, and when the smaller cassette is inserted through the opening, the smaller cassette is guided through the opening while opening the second door and holding the first door locked by the door lock members.

According to the present invention, there is also provided a cassette loading device of the front loading type for selectively loading a standard cassette and a smaller cassette into a loaded position in a video cassette recorder, comprising a housing having a cassette insertion slot, the cassette insertion slot having a width which is substantially the same as the width of the standard cassette, a cassette holder movably mounted in the housing, for holding a cassette therein, a first door mounted on the housing for selectively opening and closing the cassette insertion slot, the first door being normally urged to close the cassette insertion slot, the first door having an opening defined therein and having a center positioned out of alignment with the center of the first door, the opening having a width which is substantially the same as the width of the smaller cassette, a second door mounted on the first door for selectively opening and closing the opening, the second door being normally urged to close the opening and having a control lever on one end thereof, a pair of door lock members mounted on the housing one on each side of the cassette insertion slot, for locking the first door in engagement therewith, a catch lever angularly movably mounted on the housing and having a control pin for engaging the first door, the catch lever applying forces tending to open the first door, through the control pin to the first door as the catch lever is angularly moved, a power transmitting mechanism for moving the cassette holder, the power transmitting mechanism including a main gear having a cam, a first door opening lever held in engagement with and angularly movable by the cam, the first door opening lever having an end engaging the catch lever, a second door opening lever held in engagement with and angularly movable by the cam, the second door opening lever having an end engaging the control lever, and a pair of door unlock members mounted on the housing one on each side of the cassette insertion slot, for causing the door lock members to unlock the first door when a standard cassette is placed in the loaded position. When a standard cassette is to be ejected from the loaded position, the main gear is rotated to cause the cam to angularly move the first door opening lever, for thereby angularly moving the catch lever to produce forces tending to open the first door. When a smaller cassette is to be ejected from the loaded position, the main gear is rotated to cause the cam to angularly move the second door opening lever, for thereby angularly moving the control lever to open the second door while preventing, with the door lock members, the second door from being opened by the forces produced when the catch lever is angularly moved by the first door opening lever which is angularly moved by the cam.

According to the present invention, there is also provided a cassette loading device of the front loading type for selectively loading a standard cassette and a smaller cassette into a loaded position in a video cassette recorder, comprising a housing having a cassette insertion slot, the cassette insertion slot having a width which is substantially the same as the width of the standard cassette, a first door mounted on the housing for selectively opening and closing the cassette insertion slot, the first door having an opening defined therein and spaced from an end of the first door, the opening having a width which is substantially the same as the width of the smaller cassette, a second door mounted on the first door for selectively opening and closing the opening, a pair of first door lock members mounted on the housing one on each side of the cassette insertion slot, each of the door lock members having an engaging surface for locking the first door in engagement therewith against angular movement thereof, and a tapered surface for engaging a standard cassette which is about to be inserted into the cassette insertion slot in front of the first door, to bring the engaging surface out of engagement with the first door thereby to unlock the first door, and a pair of second door lock members mounted on the housing one on each side of the opening at a lower edge thereof, each of the second door lock members having an engaging surface for locking the second door in engagement therewith against angular movement thereof, a standard cassette receiver disposed in the cassette insertion slot and engageable with and movable by a bottom of a standard cassette, at a position off an opening defined therein, which standard cassette is about to be inserted into the cassette insertion slot in front of the second door, thereby to unlock the second door, and a smaller cassette receiver disposed in the opening and engageable with and movable by a bottom of a smaller cassette, at a position off an opening defined therein, which smaller cassette is about to be inserted into the opening, thereby to unlock only the second door.

According to the present invention, there is provided a cassette loading device of the front loading type for loading a cassette into a loaded position in a video cassette recorder, comprising a housing having a cassette insertion slot, a door mounted on the housing for selectively opening and closing the cassette insertion slot, a door lock member mounted on the housing and having an engaging surface for locking the door in engagement therewith and a tapered surface for engaging a cassette which is about to be inserted into the cassette insertion slot in front of the door, a power transmitting mechanism for moving the cassette inserted through the cassette insertion slot into the loaded position, the power transmitting mechanism having a gear, and a door unlock mechanism mounted in the housing and including a control element for controlling the door lock member to lock the door when no cassette is inserted, and for turning the door lock member out of locking engagement with the door to keep the door unlocked, in response to rotation of the gear, when a cassette is inserted through the cassette insertion slot and moved into the loaded position.

According to the present invention, there is also provided a cassette loading device of the front loading type for selectively loading a standard cassette and a smaller cassette into a loaded position in a video cassette recorder, comprising a housing having a cassette insertion slot, the cassette insertion slot having a width which is substantially the same as the width of the standard cassette, a first door mounted on the housing for selectively opening and closing the cassette insertion slot, the first door having an opening defined therein and spaced from an end of the first door, the opening having a width which is substantially the same as the width of the smaller cassette, a second door mounted on the first door for selectively opening and closing the opening, and a pair of door lock members mounted on the housing one on each side of the opening at a lower edge thereof, each of the second door lock members having a engaging surface for locking the second door in engagement therewith against angular movement thereof when no cassette is inserted, a step disposed in the opening for guiding lower corners of a smaller cassette which is inserted through the opening, thereby to limit the smaller cassette in lateral position, and a smaller cassette receiver disposed in the opening and engageable with and movable by a bottom of the inserted smaller cassette, thereby to unlock the second door.

According to the present invention, there is further provided a cassette loading device of the front loading type for selectively loading a standard cassette and a smaller cassette into a loaded position in a video cassette recorder, comprising a housing having a cassette insertion slot, the cassette insertion slot having a width which is substantially the same as the width of the standard cassette, a first door mounted on the housing for selectively opening and closing the cassette insertion slot, the first door having an opening defined therein and spaced from an end of the first door, the opening having a width which is substantially the same as the width of the smaller cassette, a second door mounted on the first door for selectively opening and closing the opening, and a pair of guides mounted on the second door in the opening and projecting from the second door toward the first door, for guiding upper corners of a smaller cassette which is inserted through the opening, thereby to limit the smaller cassette in lateral position.

According to the present invention, there is also provided a cassette loading device of the front loading type for selectively loading a standard cassette and a smaller cassette into a loaded position in a video cassette recorder, comprising a housing having a cassette insertion slot, the cassette insertion slot having a width which is substantially the same as the width of the standard cassette, a first door mounted on the housing for selectively opening and closing the cassette insertion slot, the first door having an opening defined therein and spaced from an end of the first door, the opening having a width which is substantially the same as the width of the smaller cassette, a second door mounted on the first door for selectively opening and closing the opening, a pair of door lock members mounted on the housing one on each side of the opening at a lower edge thereof, each of the door lock members having an engaging surface for locking the second door in engagement therewith against angular movement thereof when no cassette is inserted, a step disposed in the opening for guiding lower corners of a smaller cassette which is inserted through the opening, thereby to limit the smaller cassette in lateral position, and a smaller cassette receiver disposed in the opening and engageable with and movable by a bottom of the inserted smaller cassette, thereby to unlock the second door, and a pair of guides mounted on the second door in the opening and projecting from the second door toward the first door, for guiding upper corners of a smaller cassette which is inserted through the opening, thereby to limit the smaller cassette in lateral position.

According to the present invention, there is provided a cassette loading device of the front loading type for selectively loading a standard cassette and a smaller cassette into a loaded position in a video cassette recorder, comprising a housing having a cassette insertion slot, the cassette insertion slot having a width which is substantially the same as the width of the standard cassette, a cassette holder movably mounted in the housing, for holding a cassette which is inserted, a first door mounted on the housing for selectively opening and closing the cassette insertion slot, the first door having an opening defined therein and spaced from an end of the first door, the opening having a width which is substantially the same as the width of the smaller cassette, a second door mounted on the first door for selectively opening and closing the opening, and a pair of door lock members mounted on the second door one on each side of the opening at a lower edge thereof, for locking the second door with respect to the first door, each of the door lock members having a wing movably extending through the second door, a shaft angularly movably supported on the second door for turning the door lock member thereabout, and a lock element, the first door having a stopper for engaging the lock element to lock the second door with respect to the first door. When a smaller cassette is inserted through the opening, the wing is pushed by the smaller cassette to turn the door lock member about the shaft for thereby bringing the lock element out of engagement with the stopper, whereby the second door is unlocked from the first door and can be opened by the inserted smaller cassette. When no cassette is inserted through the opening, the lock element is engaged by the stopper thereby locking the second door with respect to the first door.

Each of the door lock members has a tongue spaced from the shaft. The cassette loading device further includes a pair of door unlock members mounted in the housing, each for pushing the tongue to turn the door lock member for bringing the lock element out of engagement with the stopper, the arrangement being such that when a loaded smaller cassette is ejected, the tongue is pushed by the door unlock member to turn the door lock member thereby unlocking the second door from the first door.

According to the present invention, there is further provided a cassette loading device of the front loading type for selectively loading a standard cassette and a smaller cassette into a loaded position in a video cassette recorder, comprising a housing having a cassette insertion slot, the cassette insertion slot having a width which is substantially the same as the width of the standard cassette, a cassette holder movably mounted in the housing, for holding a cassette which is inserted, a first door mounted on the housing for selectively opening and closing the cassette insertion slot, the first door having an opening defined therein and spaced from an end of the first door, the opening having a width which is substantially the same as the width of the smaller cassette, a second door mounted on the first door for selectively opening and closing the opening, and a pair of door lock members mounted on the second door one on each side of the opening at a lower edge thereof, for locking the second door with respect to the first door, each of the door lock members having a wing movably extending through the second door beyond the first door, a shaft angularly movably supported on the second door for turning the door lock member thereabout, and a lock element extending beyond a lower edge of the opening, the housing having a pair of stopper arms each for engaging the lock element to lock the second door with respect to the housing. When a standard or smaller cassette is inserted, the wing is pushed by the cassette to turn the door lock member about the shaft for thereby bringing the lock element out of engagement with the stopper arm, whereby the second door is unlocked from the first door and can be opened by the inserted cassette, and when no cassette is inserted, the lock element is engaged by the stopper arm thereby locking the second door with respect to the housing.

The stopper arm is angularly movably mounted on the housing. The cassette loading device further includes a pair of door unlock members mounted in the housing, each for turning the stopper arm for bringing the stopper arm out of engagement with the lock element, the arrangement being such that when a loaded standard or smaller cassette is ejected, the stopper arm is turned by the door unlock member out of engagement with the lock element thereby unlocking the second door from the first door.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a front elevational view of the cassette loading device shown in FIG. 1;

FIG. 3 is a front elevational view of the cassette loading device, with a housing door assembly being omitted from illustration;

FIGS. 29 through 31A and 31B are views of a mechanism for turning a lid opener assembly for a smaller cassette;

FIG. 37 is a diagram of a control sequence for a cassette holder when standard and smaller cassettes are inserted and ejected;

FIG. 41 is a front elevational view of a cassette loading device incorporating second door lock mechanisms and second door unlock mechanisms according to another embodiment of the present invention;

FIG. 42 is an enlarged fragmentary cross-sectional view of one of the second door lock mechanisms and one of the second door unlock mechanisms in the cassette loading device shown in FIG. 41;

DETAILED DESCRIPTION

Figure 1:
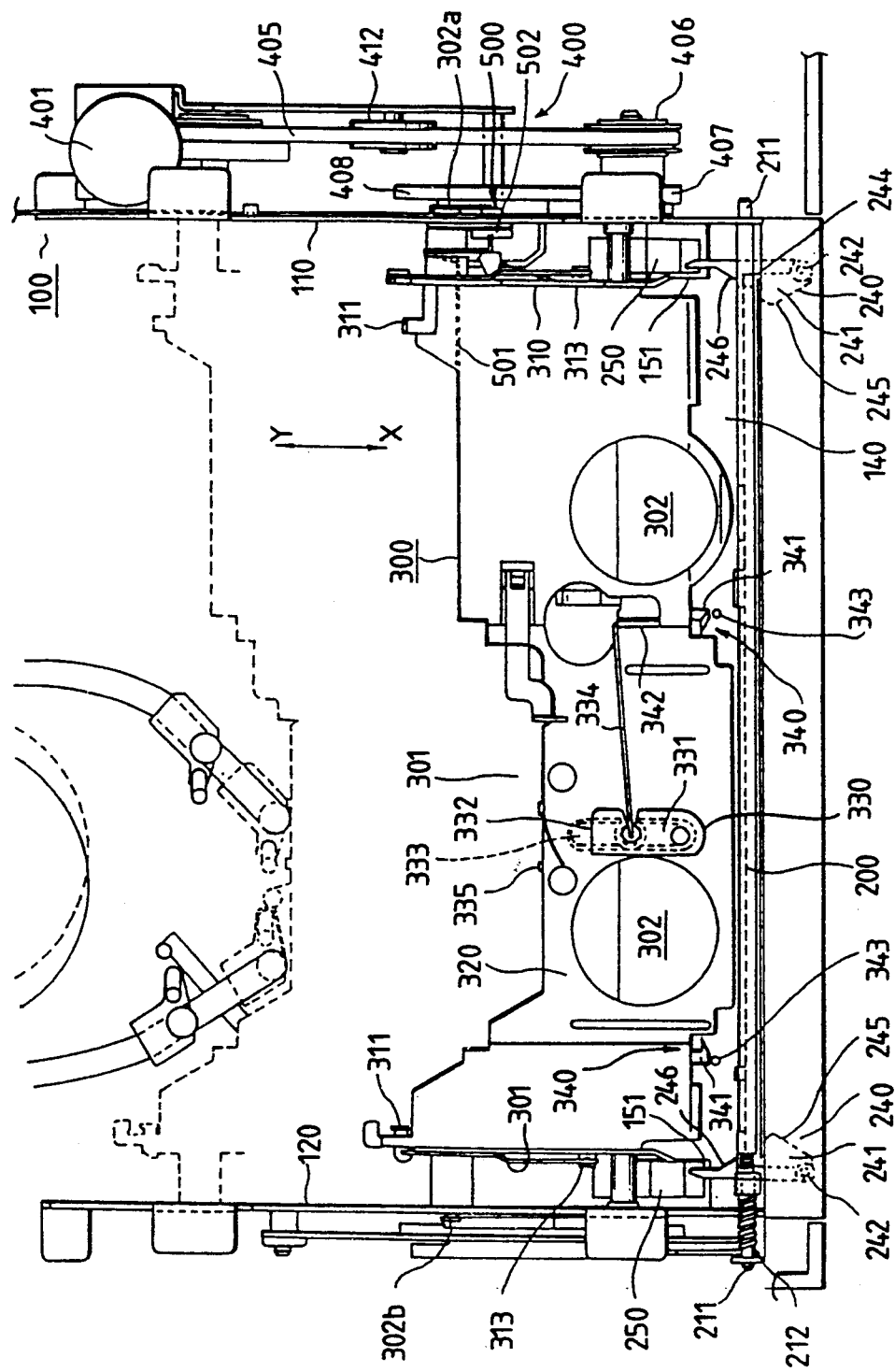
FIG. 1 is a plan view of a cassette loading device according to the present invention.

FIGS. 1 through 3 show a cassette loading device according to the present invention, capable of selectively loading a standard (VHS) cassette and a smaller (VHS-C) cassette into a video cassette recorder (VCR).

The cassette loading device generally includes a housing 100, a housing door assembly 200 disposed on a front end of the housing 100, a cassette holder 300 mounted in the housing 100 behind the housing door assembly 200, and a power transmitting mechanism 400 mounted on side panels of the housing 100.

The housing 100 comprises a pair of laterally spaced side panels 110, 120, an upper panel 130, a lower panel 140, and a front panel 145. The power transmitting mechanism 400 is supported on the side panels 110, 120. The power transmitting mechanism 400 includes a motor 401 mounted on the right side panel 110 (as viewed front the front side of the housing 100), and a pair of right and left main gears 408, 411 rotatably mounted respectively on the right and left side panels 110, 120. As also shown in FIGS. 4A through 4C and 5, when the motor 401 is energized, the rotative drive power produced thereby is transmitted through a worm 402, a worm wheel 403, a pulley 404, and a belt 105 to a pulley 406. From the pulley 406, the rotative drive power is transmitted through a right drive gear 407 to the right main gear 408, and also through a shaft 409 and a left drive gear 410 to the left main gear 411.

The cassette holder 300 in the housing 100 can selectively hold a standard cassette and a smaller cassette therein, and move the cassette held therein into a predetermined position for recording and playback. As shown in FIGS. 4A through 4C, 5, and 6, the cassette holder 300 has a pair of guide pins 301a, 302a projecting outwardly from one side panel thereof, and a pair of guide pins 301b, 302b projecting outwardly from the other side panel thereof. These guide pins 301a, 302a and 301b, 301b movably engage in substantially L-shaped guide grooves 111, 112 and 121, 122, respectively, which are defined in the side panels 110, 120 of the housing 100. The guide pins 301a, 301b also engage in respective slots 415, 416 in control arms 413, 414 joined to and extending radially outwardly from the respective main gears 408, 411.

Figure 4A:
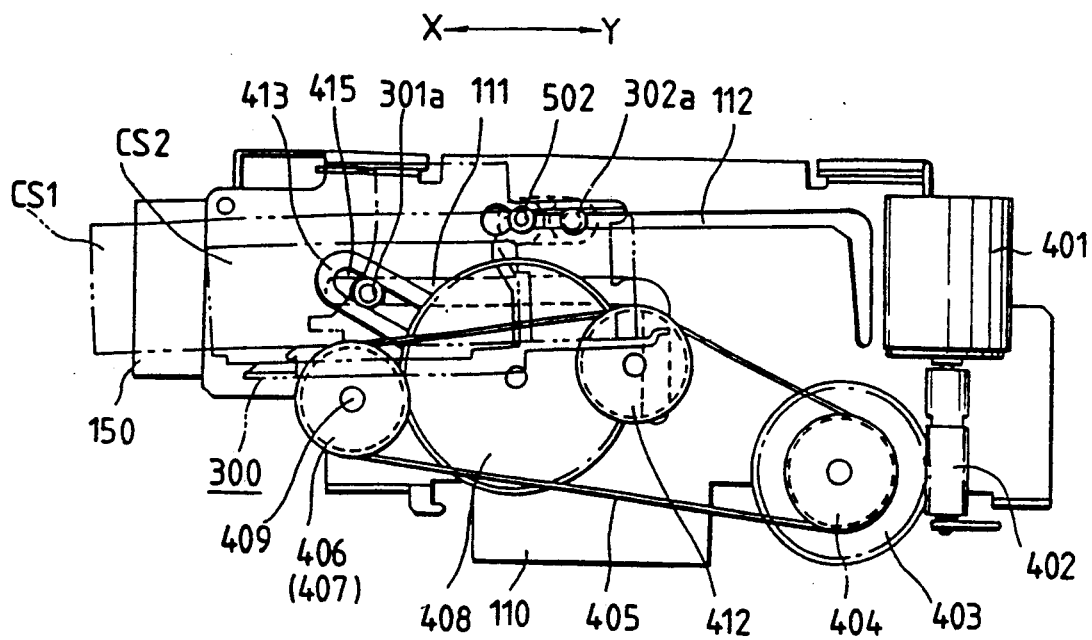
FIGS. 4A through 4C are side elevational views of the cassette loading device, showing different parts positions corresponding to insertion standby, first loaded, and second loaded positions, respectively.

When a standard or smaller cassette is about to be inserted into the cassette holder 300, the cassette holder 300 is positioned in an insertion standby position shown in FIGS. 1 and 4A. When the cassette is inserted into the cassette holder 300 through a front cassette insertion slot 150 defined in the front panel 145 of the housing 100, the cassette is detected by a cassette detecting switch (described later on), which then produces a signal to energize the motor 401. The right main gear 408 is rotated clockwise about its own axis in FIG. 4A, and the left main gear 411 is rotated counterclockwise about its own axis in FIG. 5, causing the control arms 413, 414 to turn clockwise and counterclockwise with the respective main gears 408, 411. The guide pins 301a, 301b are moved along the respective guide grooves 111, 121 by the respective control arms 413, 414, so that the cassette holder 300 is moved backwards in the direction indicated by the arrow Y. If a standard cassette is inserted, then the cassette holder 300 is moved backwards from the standby position shown in FIG. 4A into a first loaded position shown in FIG. 4B. If a smaller cassette is inserted, then the cassette holder 300 is moved backwards from the insertion standby position into a second loaded position shown in FIG. 4C, which is slightly higher than the first loaded position. Thus, the standard and smaller cassettes are loaded into their predetermined positions which differ depending on their size.

Figure 10:
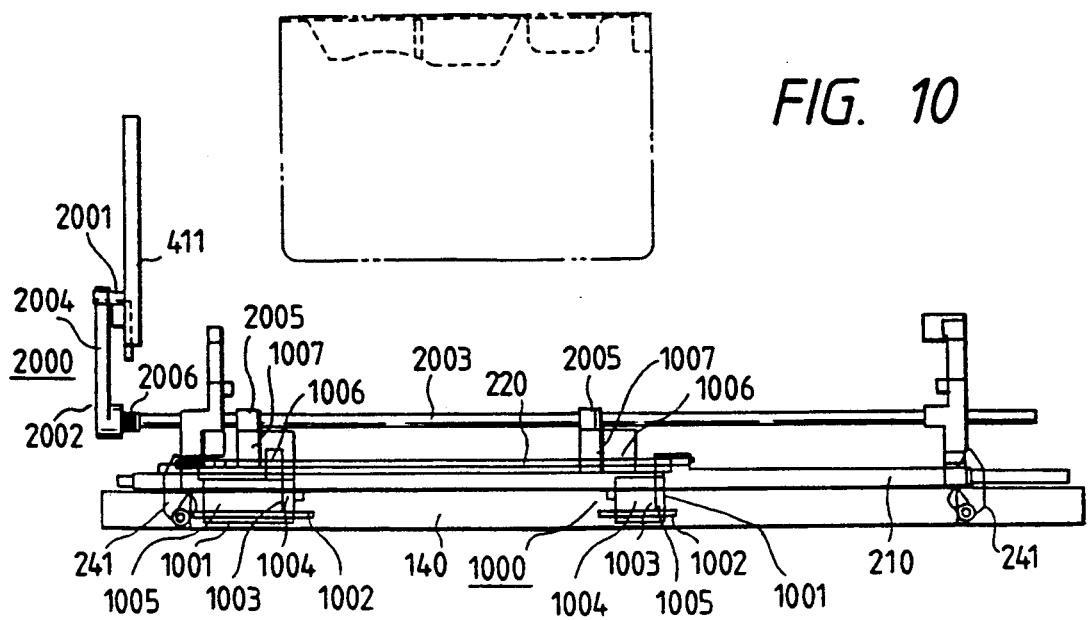
Figure 11:
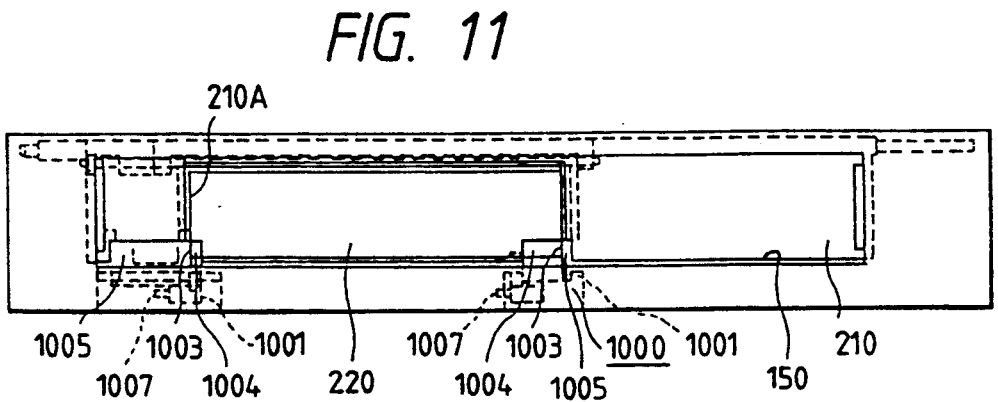

As shown in FIGS. 1, 2, 5 through 7, the housing door assembly 200 is disposed in the front cassette insertion slot 150. As shown in FIGS. 2, 10, and 11, the housing door assembly 200 comprises a first larger door 210 for introducing a standard cassette when opened, and a second smaller door 220 for introducing a smaller cassette when opened, the second door 220 being positioned behind or inwardly of the first door 210 for opening and closing an opening or smaller cassette insertion slot 210A that is defined in the first door 210. The first door 210 fully covers the cassette insertion slot 150 when closed. The first and second doors 210, 220 can be opened when they are pushed backwards by respective standard and smaller cassettes.

Figure 16:
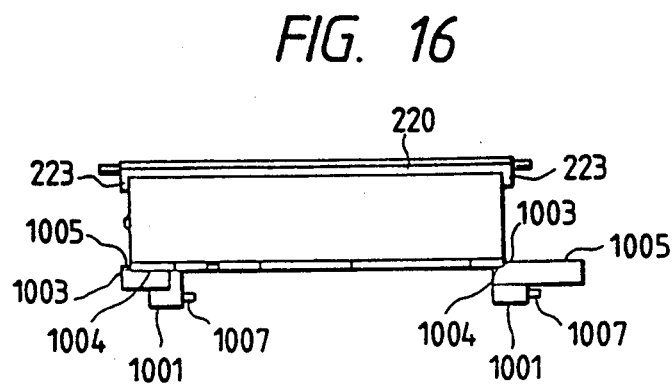

As shown in FIG. 16, the second door 220 has a pair of guide teeth 223 projecting from respective lateral ends thereof toward the first door 210. The guide teeth 223 serve to guide respective side walls of the smaller cassette.

Figure 8:
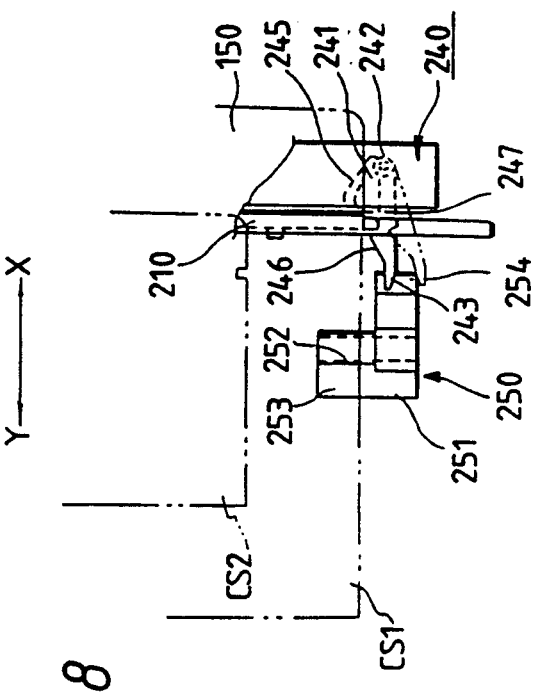
FIGS. 8 through 16 are schematic views of first and second door lock mechanisms and first and second door unlock mechanisms.
Figure 9:
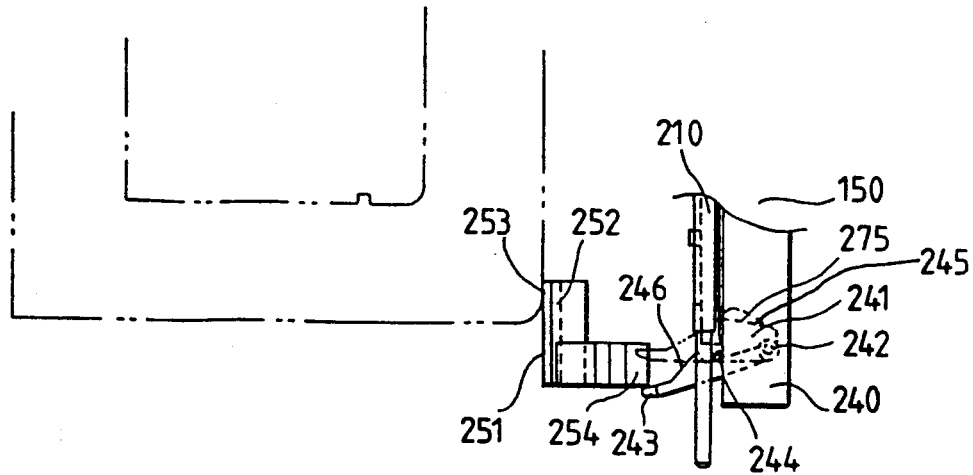

As illustrated in FIGS. 1, 8, and 9, a pair of first door lock mechanisms 240 for locking the first door 210 in a closed position is positioned at lateral or left and right ends, respectively, of the first door 210, i.e., the cassette insertion slot 150. As shown in FIGS. 10 and 11, a pair of second door lock mechanisms 1000 for locking the second door 220 in a closed position is positioned at lateral or left and right ends, respectively, of the second door 220, and mounted on the lower panel 140 of the housing 100, slightly below the lower edge of the cassette insertion slot 150.

The first door lock mechanisms 240 have respective first door lock members 241 pivotally supported on respective pins 242 mounted on the lower panel 140, the first door lock members 241 being normally urged to turn inwardly, i.e., clockwise and counterclockwise, respectively. The first door lock members 241 have respective L-shaped rear ends 243 extending downwardly and engageable with inner edges of recesses 151 (FIG. 1) defined in the lower panel 140 for limiting the inward turning movement of the first door lock members 241. The first door lock members 241 have engaging recesses 244 defined in inner surfaces thereof for engaging the lateral ends of the first door 210. Each of the first door lock members 241 also has tapered surfaces 245, 246 positioned forwardly and rearwardly of the engaging recess 244.

As shown in FIGS. 1 through 3 and 8 through 13, the first door lock mechanisms 240 ar associated respectively with first door unlock mechanisms 250 which are positioned behind the first door lock mechanisms 240. The first door unlock mechanisms 250 have respective first door unlock members 251 pivotally mounted on a shaft 2003 of a second door unlock mechanism 2000 (described later). The first door unlock members 251 are normally urged to turn clockwise (FIGS. 12 and 13), by springs 255 shown in FIGS. 2 and 3, disposed around the shaft 2003. The first door unlock members 251 have respective abutment portions 252 projecting inwardly in the direction indicated by the arrow Y in FIGS. 8 and 12, and held in abutment against the housing 100 inwardly of the recesses 151 so that the first door unlock members 251 are held in the position shown in FIG. 12. As shown in FIGS. 8 and 9, the abutment portions 252 have respective rear tapered surfaces 253 for engaging a standard cassette loaded in a position, and also have respective front tapered surfaces 254 oriented in the direction indicated by the arrow X and inclined outwardly. The L-shaped rear ends 243 of the first door lock members 241 engage the front tapered surfaces 254, respectively.

Figure 14A:
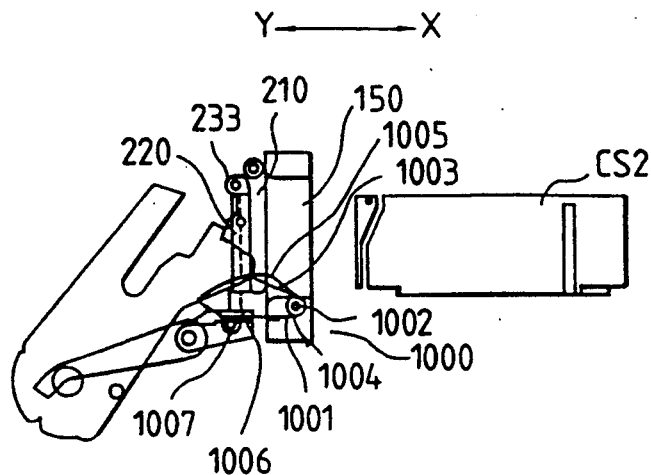
Figure 14B:
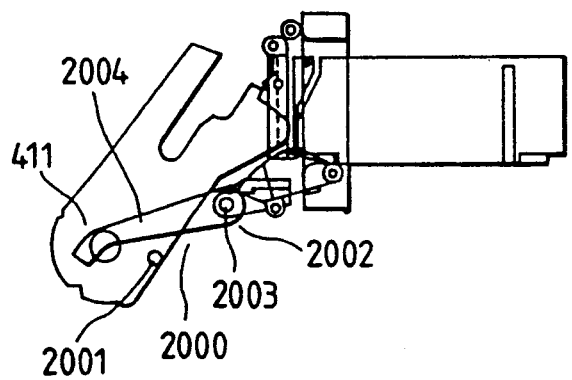
Figure 14C:
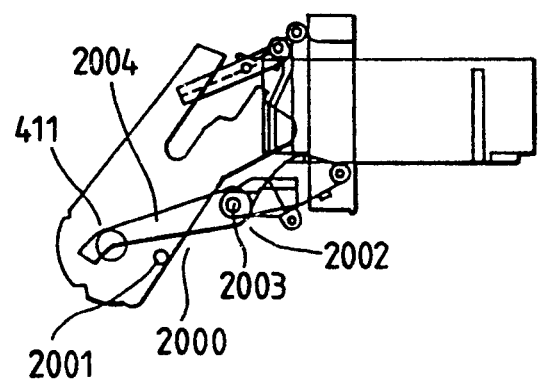
Figure 15A:
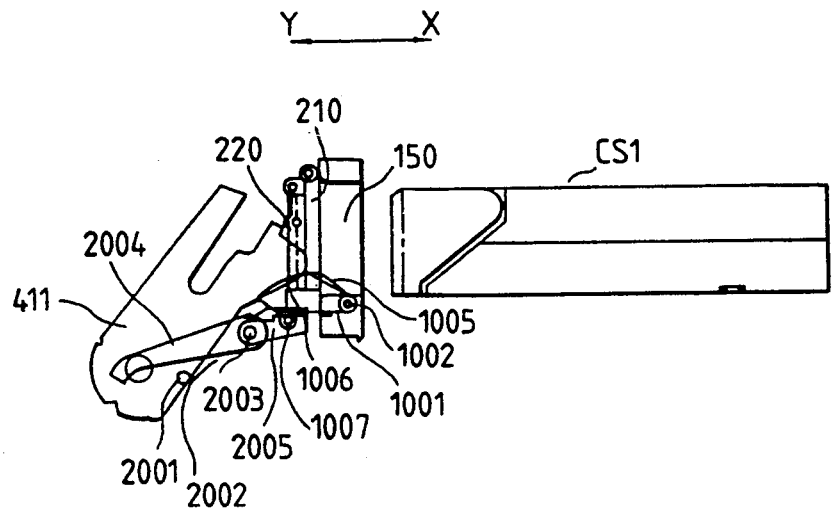

As shown in FIGS. 10 and 11, the second door lock mechanisms 1000 comprise respective second door lock members 1001 rotatably supported on respective shafts 1002 attached to the lower panel 140 of the housing 100. The second door lock members 1001 are normally urged by springs (not shown) to turn clockwise (FIG. 14A) about the shafts 1002, so that portions of the second door lock members 1001 are held against a lower surface of the lower panel 140 to keep the second door lock members 1001 horizontally as shown in FIGS. 14A and 15A. The second door lock members 1001 can turn counterclockwise (FIG. 14A) from the horizontal position.

As shown in FIGS. 10, 11, 14A through 14F, 15A through 15F, and 16, the second door lock members 1001 have respective steps 1003 positioned in front of the housing door assembly 200 or near the outer ends of the second door lock members 1001 in the direction indicated by the arrow X. The steps 1003 are horizontally spaced from each other by a distance corresponding to the width of the smaller cassette. The second door lock members 1001 have respective smaller cassette receivers 1004 and respective standard cassette receivers 1005, which are separated from each other by the steps 1003. The smaller cassette receivers 1004 are normally positioned in the smaller cassette insertion slot 210A for receiving or engaging the bottom of a smaller cassette, at positions off openings defined therein at its front end. The standard cassette receivers 1005 are normally positioned in the cassette insertion slot 150 for receiving or engaging the bottom of a standard cassette, at positions off openings defined therein at its front end.

The second door lock members 1001 also have, on their inner ends behind the housing door assembly 200 in the direction indicated by the arrow Y, respective lock members 1006 positioned in confronting relation to the rear surface of the second door 220 for locking the second door 200 against angular movement, and respective pins 1007 for engaging second door unlock mechanisms (described below).

The second door lock mechanisms 1000 are associated with a second door unlock mechanism 2000. As shown in FIG. 10, the second door unlock mechanism 2000 comprises a pin 2001 mounted on an outer side of the left main gear 411 of the power transmitting mechanism 400, and a second door unlock member 2002 which is composed of a shaft 2003 rotatably mounted on and extending between the side panels 110, 120 of the housing 100, a control lever 2004 fixedly mounted on a left end of the shaft 2003 and engageable with the pin 2001, and and a pair of laterally spaced control elements 2005 mounted on the shaft 2003 and engageable with the respective pins 1007 of the second door lock members 1001. The second door unlock member 2002 is normally urged to turn counterclockwise (FIGS. 14A through 14F and 15A through 15F) by a spring 2006 disposed around the shaft 2003, so that portions of the control elements 2005 are held against the lower surface of the lower panel 140 to keep the second door unlock member 2002 in a position shown in FIGS. 14A and 15A. The second door unlock member 2002 can turn clockwise from that position.

When no cassette is inserted, the first door lock members 241 and the first door unlock members 251 are in the position indicated by the solid lines in FIGS. 1 and 8. In this position, the engaging recesses 244 in the first door lock members 241 engage the lateral ends of the first door 210 to lock the first door 210 against angular movement. At the same time, the second door lock members 1001 and the second door unlock member 2002 are in the position shown in FIGS. 14A and 15A. The second door unlock member 2002 is in an inoperative position, with the lock members 1006 of the second door lock members 1001 being positioned against the rear surface of the second door 220, thereby locking the second door 220 against angular movement.

The first and second doors 210, 220 are therefore locked in the closed position. Even if the user attempts to insert a cassette of a different type or to push open the housing door assembly 200 (the first and second doors 210, 220), the housing door assembly 200 is not opened. Thus, a cassette of a different type is prevented from being inserted in error. Since no fingers are allowed to enter the video cassette recorder through the housing door assembly 200, at this time, the video tape recorder is prevented from being tampered with or broken, or children's fingers, for example, are prevented from getting injured by the mechanisms in the video cassette recorder.

Figure 15B:
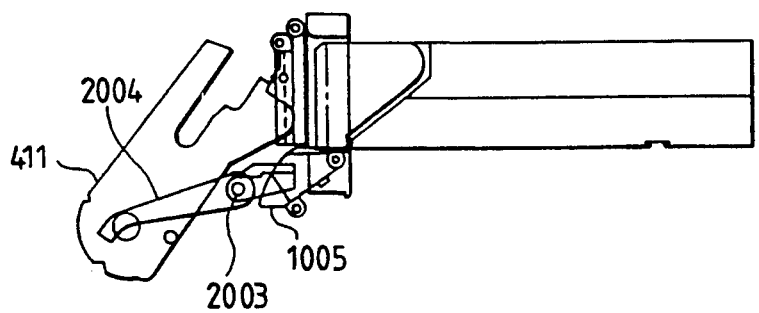
Figure 15C:
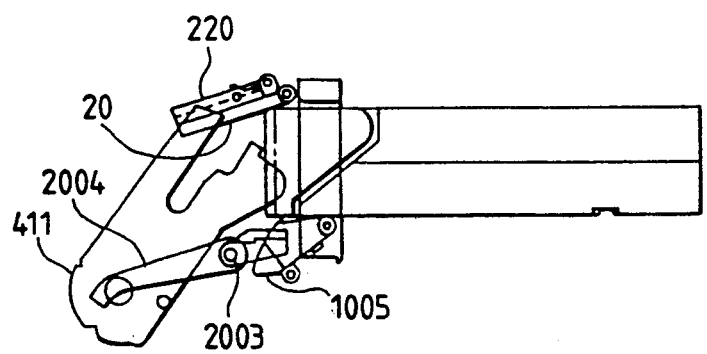
Figure 15D:
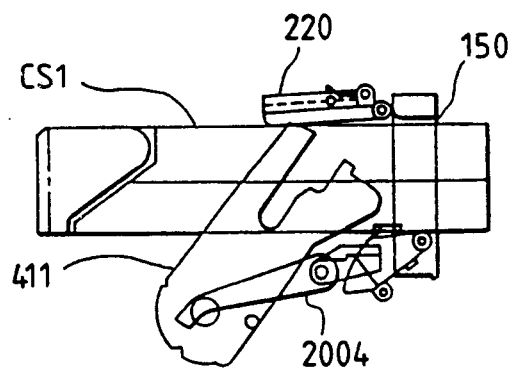

When a standard cassette CS1 is inserted into the cassette insertion slot 150, the lateral opposite ends of the standard cassette CS1 push the tapered surfaces 245 of the first door lock members 241 outwardly or away from each other against the bias of the springs, until the first door lock members 241 are turned counterclockwise and clockwise, respectively, about the pins 242 into the position indicated by the two-dot-and-dash lines shown in FIG. 8. The engaging recesses 244 in the first door lock members 241 are brought out of engagement with the lateral ends of the first door 210, which is therefore unlocked. As shown in FIG. 15B, the bottom of the standard cassette CS1 pushes the standard cassette receivers 1005 of the second door lock members 1001, which are turned counterclockwise about the shafts 1002 into a position shown in FIG. 15C. The lock members 1006 of the second door lock members 1001 disengage from the second door 220, which is thus unlocked. Now, the housing door assembly 200 itself can be angularly moved. As the standard cassette CS1 is continuously inserted as shown in FIG. 15D, the housing door assembly 200 is opened, allowing the standard cassette CS1 to be placed into the cassette holder 300. The standard cassette CS1 held on the cassette holder 300 is then moved through the position shown in FIG. 15E into the loaded position shown in FIG. 15F.

Figure 13:
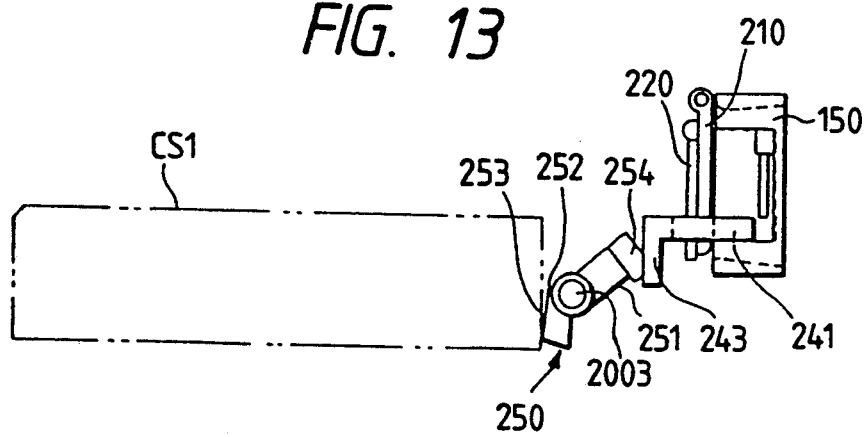
Figure 15E:
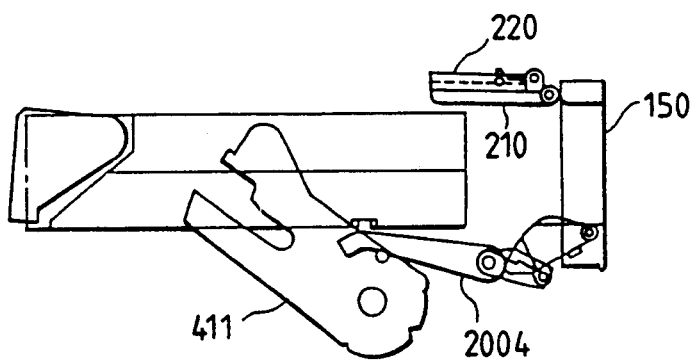
Figure 15F:
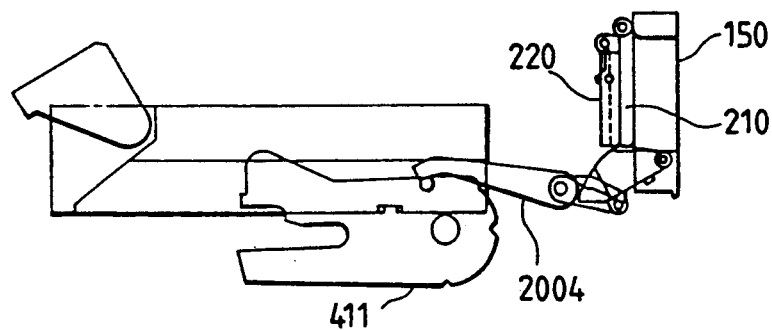

When the standard cassette CS1 is brought into the loaded position shown in FIG. 15F, the rear end of the standard cassette CS1 is held against and pushes the tapered surfaces 253 of the first door unlock members 251 as shown in FIGS. 9 and 13. The first door unlock members 251 are turned counterclockwise (FIG. 13) about the shafts 2003. The L-shaped rear ends 243 of the first door lock members 241 are supported by the tapered surfaces 254 of the first door lock members 251, whereupon the first door lock members 241 are held in the turned position indicated by the solid lines in FIG. 9. Therefore, the first door 210 is maintained in the unlocked position.

Upon rotation of the left main gear 411 to move the cassette holder 300, the pin 2001 on the left main gear 411 engages and pushes up the control lever 2004 clockwise in FIGS. 15E and 15F. The shaft 2003 is also rotated clockwise about its own axis until the control elements 2005 abut against the pins 1007 of the second door lock members 1001 which have been turned counterclockwise, thereby keeping the second door lock members 1001 in the turned position. Thus, the second door 220 is maintained in the unlocked position.

Accordingly, when the standard cassette CS1 is placed in the loaded position, the first and second doors 210, 220 are unlocked. At the time the standard cassette CS1 will subsequently be ejected out of the video cassette recorder, therefore, the housing door assembly 200 (first and second doors 210, 220) can be opened by a door opening mechanism (described later) without fail.

Figure 14D:
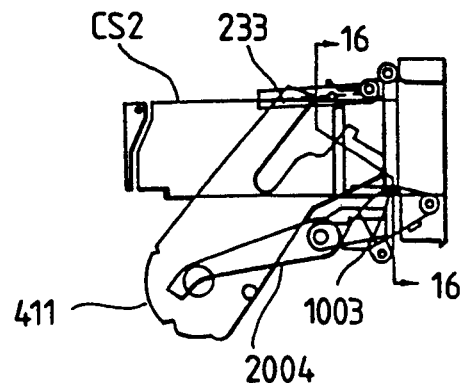

When a smaller cassette CS2 is inserted while the first and second doors 210, 220 are being locked as shown in FIGS. 1, 8, and 14A, the smaller cassette CS2 does not engage the first door lock members 241. Since the first door lock members 241 remain in the solid-line position shown in FIG. 8, the first door 210 remains locked in the closed position. The bottom of the smaller cassette CS1 as it is inserted pushes the smaller cassette receivers 1004 of the second door lock members 1001, which are turned counterclockwise (FIG. 14B) about the shafts 1002 into the position shown in FIG. 14C. The lock members 1006 of the second door lock members 1001 disengage from the second door 220, which is unlocked. Now, only the second door 220 can be turned whereas the first door 210 is locked against angular movement. The second door 220 is then opened by the inserted smaller cassette CS2, which is placed into the cassette holder 300 as shown in FIG. 14D.

As the smaller cassette CS2 moves into the cassette holder 300, the lateral lower corners of the smaller cassette CS2 are guided by the steps 1003 of the second door lock members 1001, and the lateral upper corners of the smaller cassette CS2 are guided by the guide teeth 223 of the second door 220, as shown in FIG. 16. Thus, the smaller cassette CS2 is prevented from moving laterally by these steps 1003 and guide teeth 223, and can reliably be inserted smoothly into the cassette holder 300 without any wobbling or undesired lateral movements.

Figure 14E:
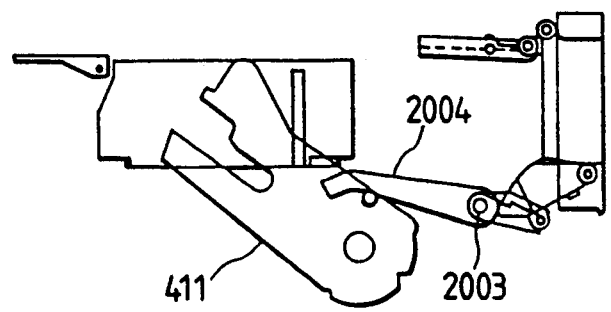
Figure 14F:
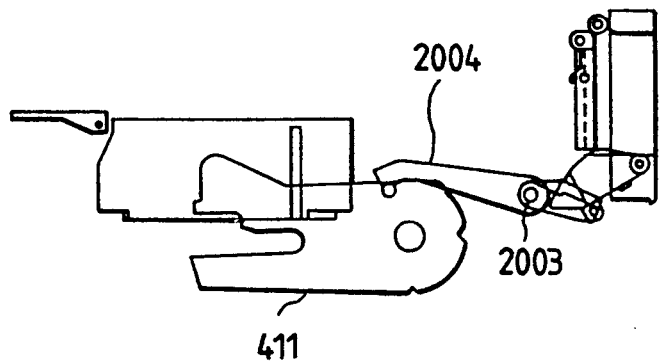

The smaller cassette CS2 which is held by the cassette holder 300 is then moved through the position shown in FIG. 14E into the loaded position shown in FIG. 14F. The smaller cassette CS2 placed in the loaded position is also shown in FIG. 10.

Figure 12:
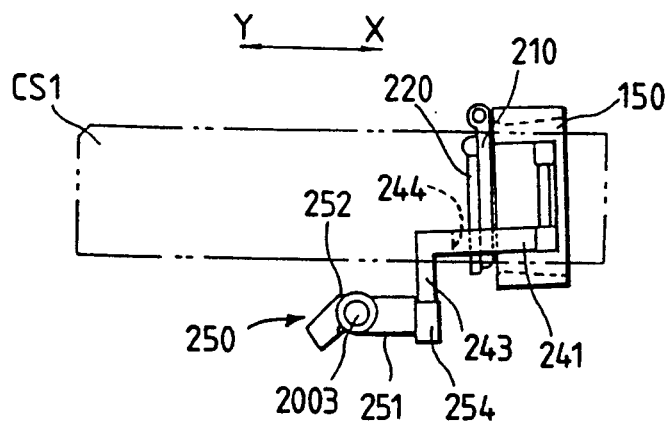

When the smaller cassette CS2 is brought into the loaded position shown in FIGS. 10 and 14F, the smaller cassette CS2 does not engage the first door lock members 251 as shown in FIG. 9, which are not angularly moved as shown in FIG. 12. Therefore, the first door lock members 241 remain in their original position indicated by the two-dot-and-dash lines in FIG. 9, keeping the first door 210 locked. Upon movement of the smaller cassette CS2 into the loaded position, the control lever 2004 causes the control elements 2005 of the second door unlock members 2002 to abut against the pins 1007 of the second door lock members 1001, so that the second door lock members 1001 are kept in the counterclockwise turned position. The second door 220 is thus maintained in the unlocked position.

Accordingly, when the smaller cassette CS2 is placed in the loaded position, only the second door 220 is unlocked. At the time the smaller cassette CS2 will subsequently be ejected out of the video cassette recorder, therefore, only the second door 220 can be opened by a door opening mechanism (described later) without fail.

The housing door assembly 200 will now be described in detail below.

Figure 7:
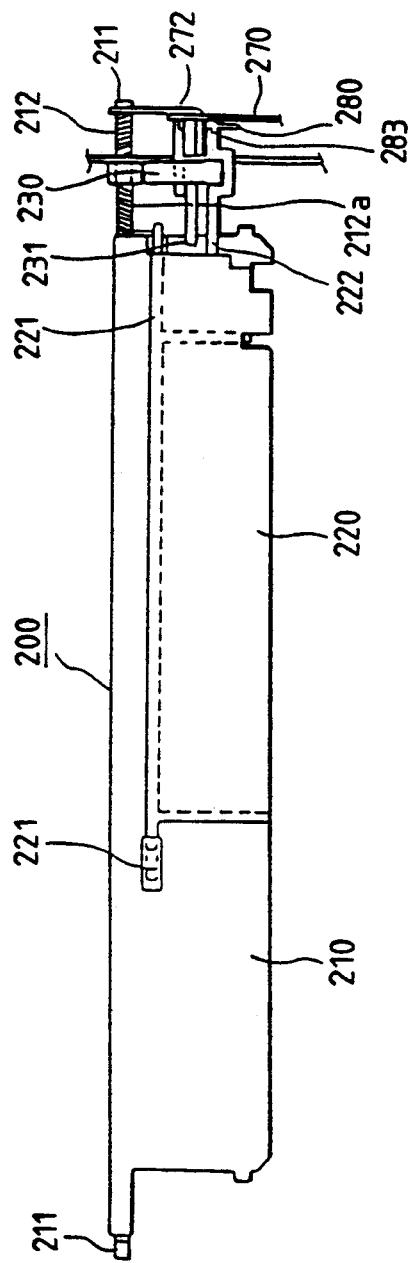
FIG. 7 is a rear elevational view of the housing door assembly.

As shown in FIGS. 1, 2, and 7, the first door 210 has a shaft 211 extending along its upper edge and rotatably supported by the housing 100 above the cassette insertion slot 150. The shaft 211 is normally urged by a double torsion spring 212, disposed around one end thereof, to turn the first door 210 in the closing direction (counterclockwise in FIG. 5).

As shown in FIG. 7, the second door 220 has a shaft 221 extending along its upper edge and rotatably supported on the rear surface of the first door 210. The double torsion spring 212 has a downwardly extending end 212a which engages a control lever 222 projecting laterally from one side of the second door 220, for normally urging the second door 220 to turn in the closing direction (counterclockwise in FIG. 5). A catch lever 230 is mounted on the shaft 211 and normally urged to turn counterclockwise in FIG. 5 by an intermediate portion of the double torsion spring 212. The catch lever 230 has a control pin 231 projecting laterally from an inner side edge thereof and having a tip end engaging the rear surface of the first door 210.

Figure 5:
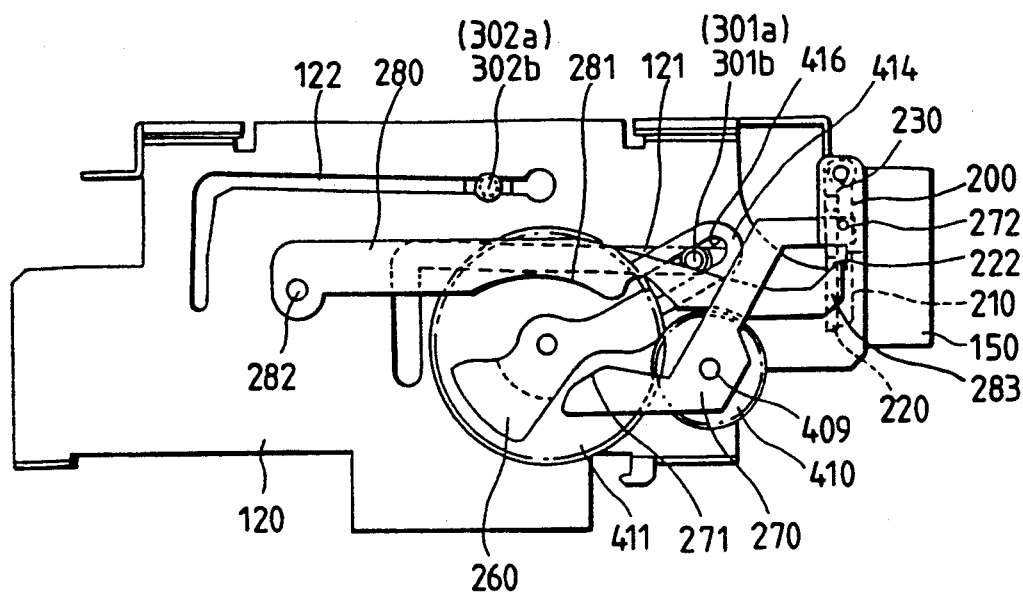
FIG. 5 is a side elevational view showing a door opening mechanism.

The door opening mechanism, which opens the housing door assembly 200 when a loaded cassette is to be ejected, includes a door opening cam 260 on the outer surface of the left main gear 411 as shown in FIG. 5. On one side of the door opening cam 260, there is disposed a first door opening lever 270 for opening the first door 210, the first door opening lever 270 being mounted on the shaft 409 and having a cam 271 on its rear end which is engageable by the door opening cam 260. On the other side of the door opening cam 260, there is disposed a second door opening lever 280 for opening the second door 220, the second door opening lever 280 being rotatably supported at one end on the left side panel 120 by a pivot pin 282 and having on its intermediate portion a cam 281 engageable by the door opening cam 260.

As shown in FIGS. 5 and 7, the first door opening lever 270 has on its front end a door opening pin 272 confronting an outer surface of the catch lever 230. The second door opening lever 280 has a front end 283 confronting an outer surface of the control lever 222 of the second door 220.

Figure 19:
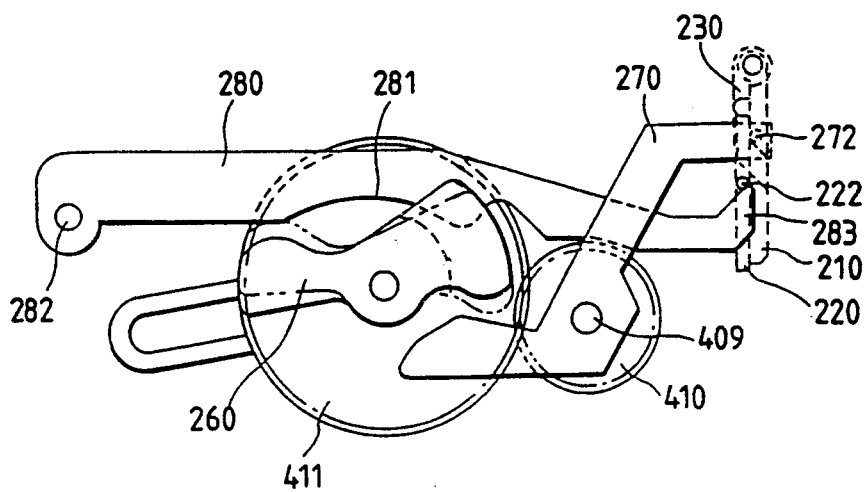

When a loaded cassette is to be ejected from the video cassette recorder, the housing door assembly 200 operates as follows:

When a standard or smaller cassette is placed in the loaded position, the door opening cam 260 and the first and second door opening levers 270, 280 are positioned as shown in FIG. 19. The door opening cam 260 on the left main gear 411 is in the angular position indicated by the solid lines when a standard cassette is in the loaded position, and is in the angular position indicated by the two-dot-and-dash lines when a smaller cassette is in the loaded position. Since the door opening levers 270, 280 are held out of engagement with the door opening ca 260 and not operated at this time, the first and second doors 210, 220 are closed.

Figure 18:
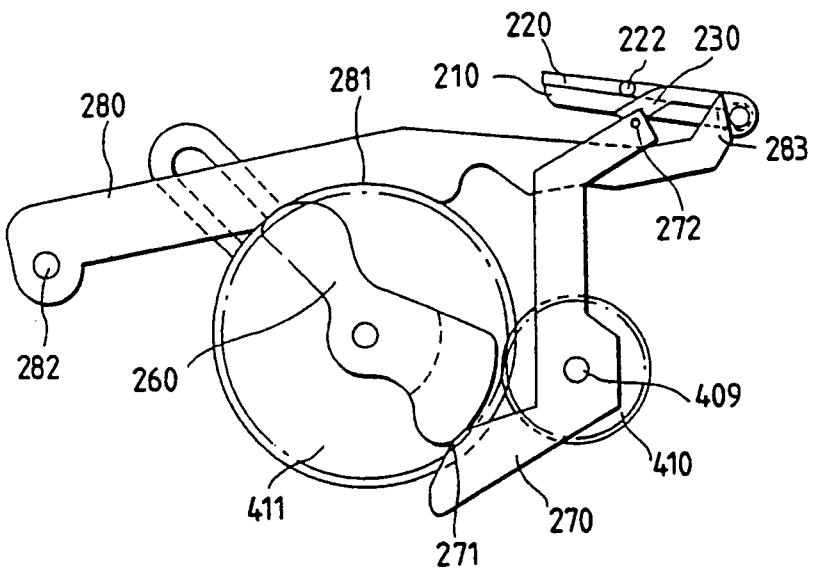

To eject a loaded standard cassette, the cassette holder 300 moves from the loaded position toward the housing door assembly 200. Upon clockwise rotation (FIG. 19) of the left main gear 411 at this time, the first and second door opening levers 270, 280 are engaged by the door opening cam 260 and turned counterclockwise about the shaft 409 and the pivot pin 282, respectively, as shown in FIG. 18 before the standard cassette reaches the first door 210. The angular movement of the first door opening lever 270 displaces the door opening pin 272 on its front end from the position shown in FIG. 19 to the position shown in FIG. 18. Because the catch lever 230 is pushed upwardly by the door opening pin 272 against the bias of the double torsion spring 212, forces tending to open the first door 210 are now applied from the double torsion spring 212 to the first door 210. The first door 210 is thus turned or opened upon the angular movement of the catch lever 230 as the first door 210 has been released from the door lock members 241 by the door unlock members 250. The second door opening lever 280 does not operate at this time because the second door 220 is opened with the first door 210.

Figure 17:
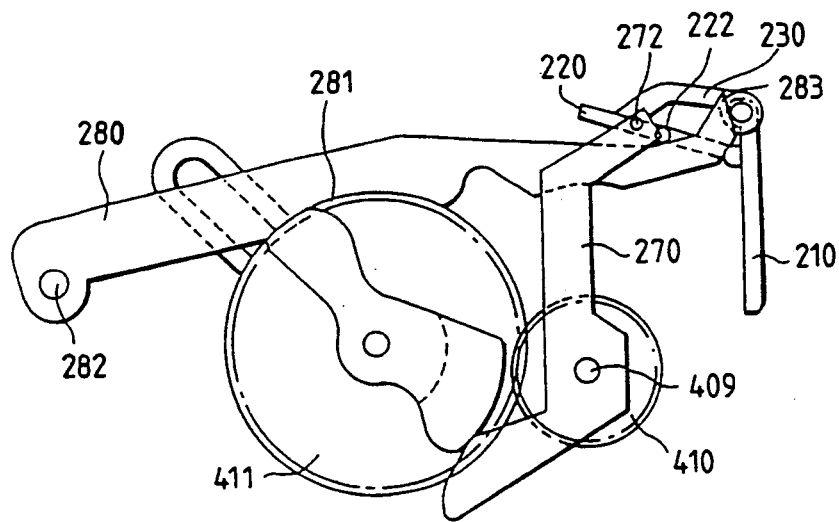
FIGS. 17 through 19 are side elevational views showing the manner in which the housing door assembly is opened by the door opening mechanism when a cassette is to be ejected.

To eject a loaded smaller cassette, the cassette holder 300 moves from the loaded position toward the housing door assembly 200, and the left main gear 411 is rotated clockwise in FIG. 19. Before the smaller cassette reaches the second door 220, the first and second door opening levers 270, 280 are engaged by the door opening cam 260, and are turned counterclockwise about the shaft 409 and the pivot pin 282, respectively. As the first door opening lever 270 is thus turned counterclockwise, the door opening pin 272 on its front end moves from the position shown in FIG. 19 to the position shown in FIG. 17. The catch lever 230 is pushed upwardly against the bias of the double torsion spring 212. Since the first door 210 is locked against angular movement by the door lock members 241, however, only the catch lever 230 is turned, and the first door 210 remains closed. Upon the angular movement of the second door opening lever 280, the control lever 222 is pushed upwardly as shown in FIG. 17, so that only the second door 220 is turned or opened.

The door depending on the loaded cassette can thus be opened when the cassette is to be ejected, and the loaded cassette is ejected through the opened door. When a cassette is inserted into the video cassette recorder, the first and second door opening levers 270, 280 are turned by the door opening cam 260 on the left main gear 411. However, such turning movement of the first and second door opening levers 270, 280 does not pose any problem since the cassette pushes open, and is inserted through, the corresponding door at this time. In this embodiment, the door opening cam 260 is disposed on the left main gear 411 only. However, it may be disposed on each of the right and left main gears 408, 411, and the first and second door opening levers 270, 280 may be positioned respectively on both sides of the housing 100 so that they coact with the respective door opening cams on the right and left main gears 408, 411.

As shown in FIGS. 1, 3, 20A, 20B, 21, and 22, the cassette holder 300 is of a horizontally elongate rectangular cross section and has a width substantially equal to the width of a standard cassette. The cassette holder 300 has a lowered region 320 on its bottom at a position slightly displaced to the left from the center, the lowered region 320 serving to hold a smaller cassette thereon. The bottom of the cassette holder 300 also has a recess 301 defined in a rear end thereof for accommodating tape loading members and other members to be received in the front openings in the cassettes which are loaded. The bottom of the cassette holder 300 further has a pair of spaced holes 302 which will be aligned with respective reels in the video cassette recorder when the cassette holder 300 is brought into the loaded position.

The cassette loading device additionally has a standard cassette detecting mechanism, a smaller cassette detecting mechanism, a smaller cassette positioning mechanism, a mechanism for preventing standard and smaller cassettes from being inserted in error, a smaller cassette holding mechanism, a mechanism for turning a lid opener assembly for a smaller cassette, a wire guiding mechanism, and a holder support mechanism, which will be described in detail below.

Figure 6:
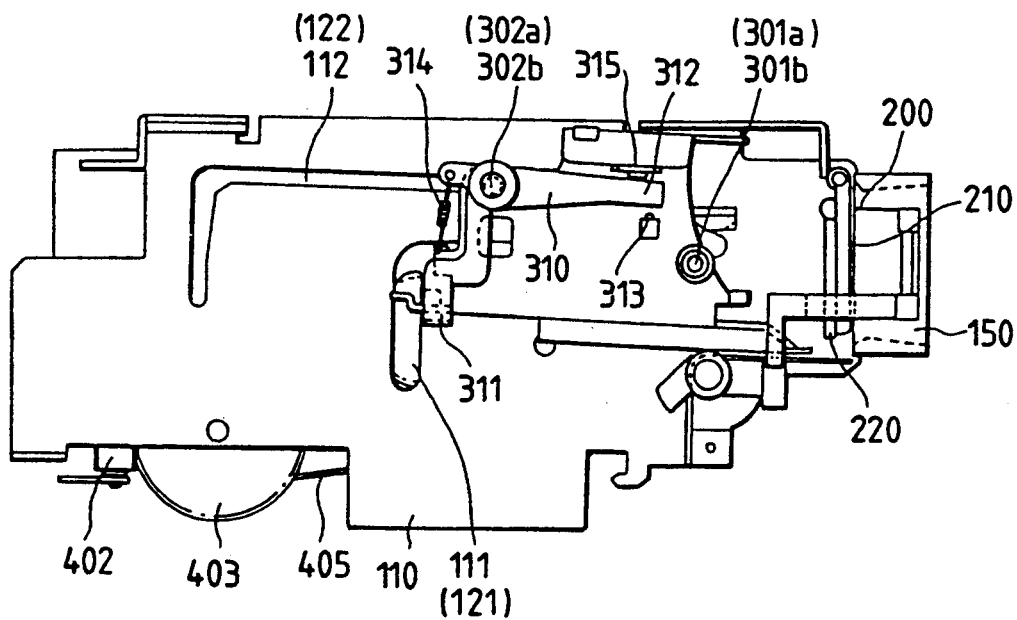
FIG. 6 is a side elevational view showing a standard cassette detecting mechanism.

As shown in FIGS. 1 and 6, the standard cassette detecting mechanism includes a pair of standard cassette detecting levers 310 angularly movably supported respectively on lateral side panels of the cassette holder 300 by the respective guide pins 302a, 302b. The standard cassette detecting levers 310 have lower ends 311 projecting over the bottom panel of the cassette holder 300 at its rear end. The standard cassette detecting levers 310 also have front ends 312 positioned near and for coaction with standard cassette detecting switches 313 mounted on the outer surfaces of the lateral side panels of the cassette holder 300. The standard cassette detecting levers 310 are normally urged to turn counterclockwise (FIG. 6) by springs 314 and held in the position shown in FIG. 6, with the upper surface of the front ends 312 being held in abutment against bent members 315 on the lateral side panels of the cassette holder 300.

When a standard cassette is properly inserted into the cassette holder 300, the front end of the standard cassette pushes backwards the lower ends 311 of the standard cassette detecting levers 310, causing the standard cassette detecting levers 310 to turn about the respective guide pins 302a, 302b until the front ends 312 contact and turn on the standard cassette detecting switches 313. Signals from the standard cassette detecting switches 313 which are turned on are sent to a microcomputer, which determines that the standard cassette is properly inserted. Then, the microcomputer sends a control signal to energize the motor 401.

If a standard cassette is not properly inserted into the cassette holder 300, and the lower end 311 of only on of the standard cassette detecting levers 310 is pushed by the standard cassette, then only one of the standard cassette detecting switches 313 is turned on. The microcomputer determines that the standard cassette is not properly inserted, and does not energizes the motor 401. The standard cassette detecting switches 313 may be positioned near the respective first door lock members 241 so that they can be turned on by the respective first door lock members 241 when they are angularly displaced by the insertion of the standard cassette.

As shown in FIGS. 1, 3, 20A, and 20B, the smaller cassette detecting mechanism, generally denoted at 330, comprises a slide plate 331 mounted on the lowered region 320 of the cassette holder 300, the slide plate 331 having a bent portion 332 on its rear end. The slide plate 331 is fitted in a guide hole 333 defined in the bottom of the cassette holder 300 and extending parallel to the directions indicated by the arrows X, Y. The slide plate 331 is slidable in and along the guide hole 333. The slide plate 331 is normally urged by a spring 334 to move in the direction indicated by the arrow X and be held in the position shown in FIG. 1. A smaller cassette detecting switch 335 is positioned on the bottom of the cassette holder 300 rearwardly of the slide plate 331.

When a smaller cassette is inserted into the cassette holder 300, the front end of the smaller cassette abuts against the bent portion 332 of the slide plate 331 and pushes the slide plate 331 against the resiliency of the spring 334. The slide plate 331 is now caused to slide in the direction indicated by the arrow Y. When the smaller cassette is inserted a certain distance, it displaces the bent portion 332 until the bent portion 332 contacts and turns on the smaller cassette detecting switch 335. When the smaller cassette detecting switch 335 is turned on, it applies a signal to the microcomputer, which then determines that the smaller cassette is inserted and energizes the motor 401.

As shown in FIGS. 1, 3, 20A, and 20B, the smaller cassette positioning mechanism, generally denoted at 340, comprises a pair of positioning hooks 341 for engaging in respective vertical slots 50 (FIG. 20B) defined in opposite lateral sides of a smaller cassette CS2 near one end thereof in the direction indicated by the arrow X. The positioning hooks 341 are normally urged inwardly, i.e., toward each other, by hook springs 342. Usually (before a smaller cassette is inserted into the cassette holder 300), the positioning hooks 341 have distal ends projecting into the lowered region 320, which defines a space for storing a smaller cassette therein. Hook releasing pins 343 for engaging the respective hooks 341 are mounted on the lower panel 140 of the housing 100.

Before a smaller cassette is inserted, the cassette holder 300 is in the position shown in FIG. 1. When a smaller cassette CS2 is inserted into the cassette holder 300 while pushing open the second door 220, the lateral sides of the smaller cassette CS2 at its leading end engage and spread the hooks 341 apart from each other against the bias of the hook springs 342.

Figure 20A:
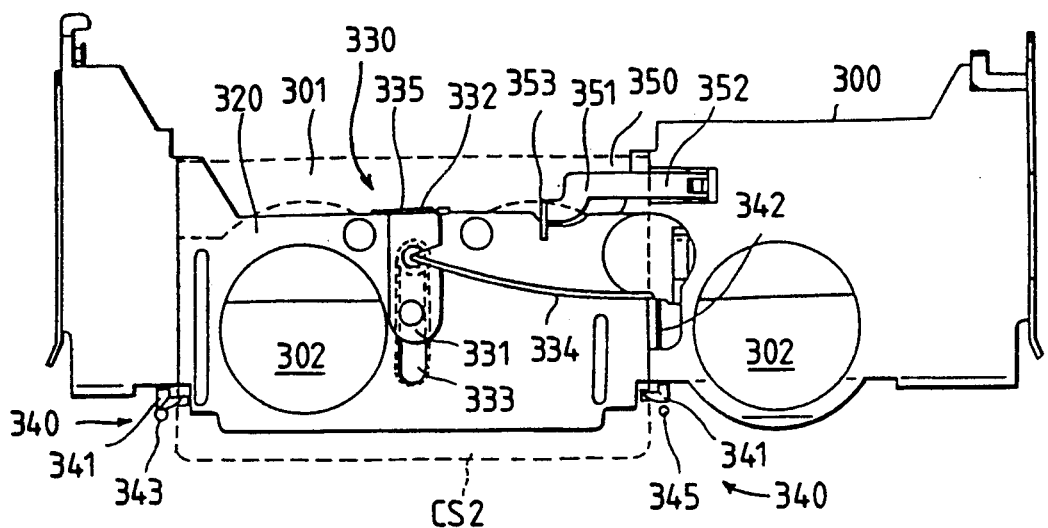
FIGS. 20A and 20B are plan views of a smaller cassette detecting mechanism and a smaller cassette positioning mechanism.

When the smaller cassette CS2 is inserted a predetermined distance (i.e., substantially at the same time that the smaller cassette detecting switch 335 is turned on), the positioning hooks 341 engage respectively in the vertical slots 50 of the smaller cassette CS2 as shown in FIG. 20A, thereby positioning the smaller cassette CS2 in the directions indicated by the arrows X, Y and other directions perpendicular thereto.

Figure 20B:
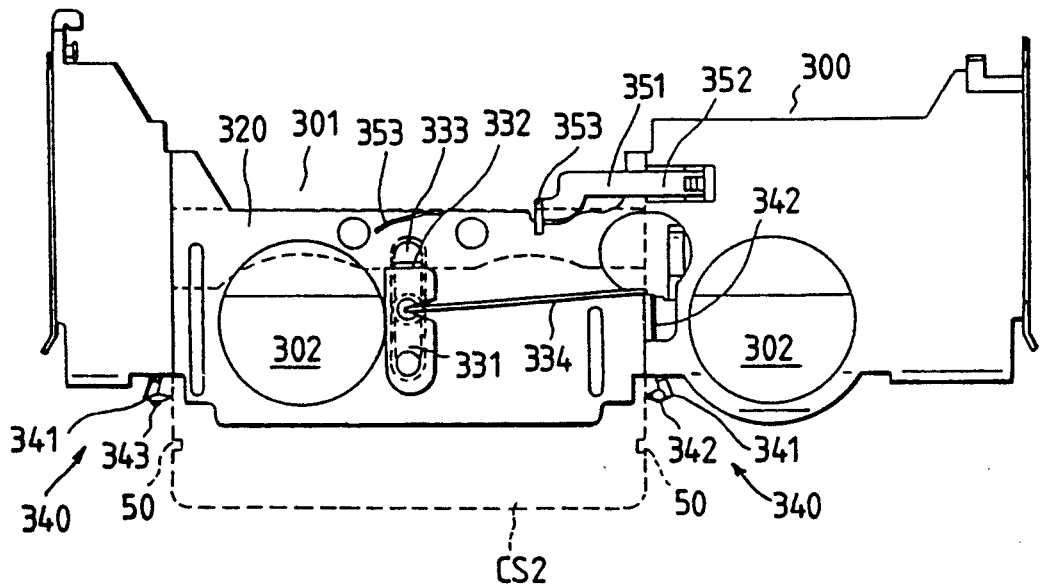

To eject the loaded smaller cassette CS2, the cassette holder 300 moves in the direction indicated by the arrow X from the position shown in FIG. 20A through the position shown in FIG. 1 to the position shown in FIG. 20B. At this time, the positioning hooks 341 are engaged by the respective hook releasing pins 343 and spread apart from each other by the hook releasing pins 343, until the positioning hooks 341 are displaced out of the respective vertical slots 50 of the smaller cassette CS2.

Then, the smaller cassette CS2 is discharged from the cassette holder 300 in the direction indicated by the arrow X in FIG. 20B under the energy stored in the spring 334 which has resiliently been flexed by the slide plate 331 when the smaller cassette CS2 has been positioned as described above. The end of the smaller cassette CS2 projects from the cassette holder 300 from the second door 220 at least to the extent that the smaller cassette CS2 can be gripped by the user. Therefore, the smaller cassette CS2 can reliably and easily be taken out of the video cassette recorder. The smaller cassette CS2 is forcibly ejected by the spring-loaded slide plate 331 because the smaller cassette CS2 has a width which is smaller than that of the standard cassette CS2.

A smaller cassette CS2, when inserted, is placed on the lowered region 320 of the cassette holder 300. Therefore, standard and smaller cassettes are loaded in different vertical positions. In addition, grooves defined respectively in standard and smaller cassettes for preventing these cassettes from being inserted in error have different depths. For these reasons, it has heretofore been required to employ different mechanisms for preventing respective standard and smaller cassettes from being inserted in error. Consequently, the conventional cassette loading devices have been made up of a large number of parts, costly to manufacture, and complex to assemble.

According to the present invention, the mechanism, generally denoted at 350, for preventing standard and smaller cassettes from being inserted in error is mounted on the bottom of the cassette holder 300 as shown in FIGS. 1, 20A, 20B, 21, and 22.

Figure 21:
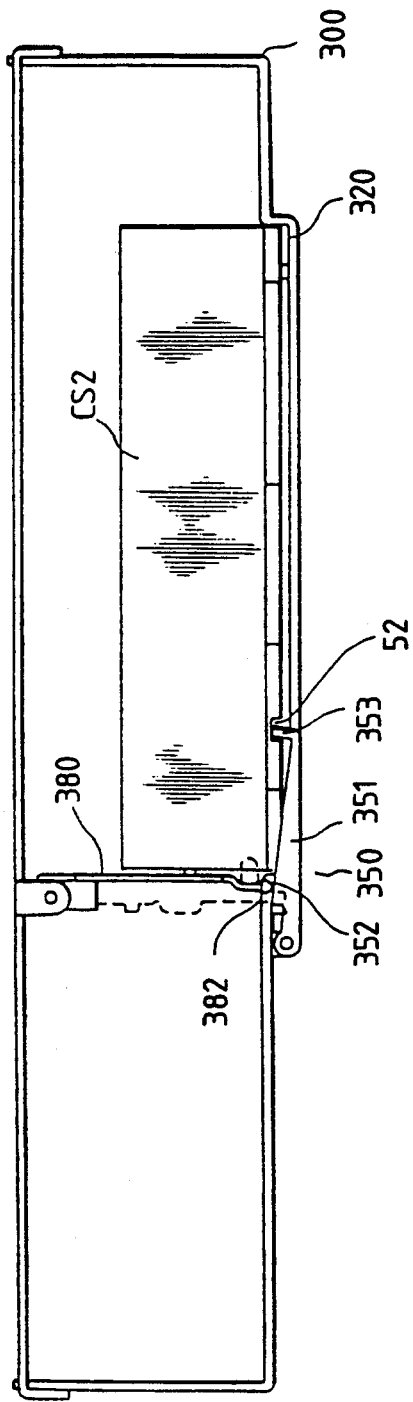
FIGS. 21 and 22 are front elevational views of a mechanism for preventing standard and smaller cassettes from being inserted in error.
Figure 22:
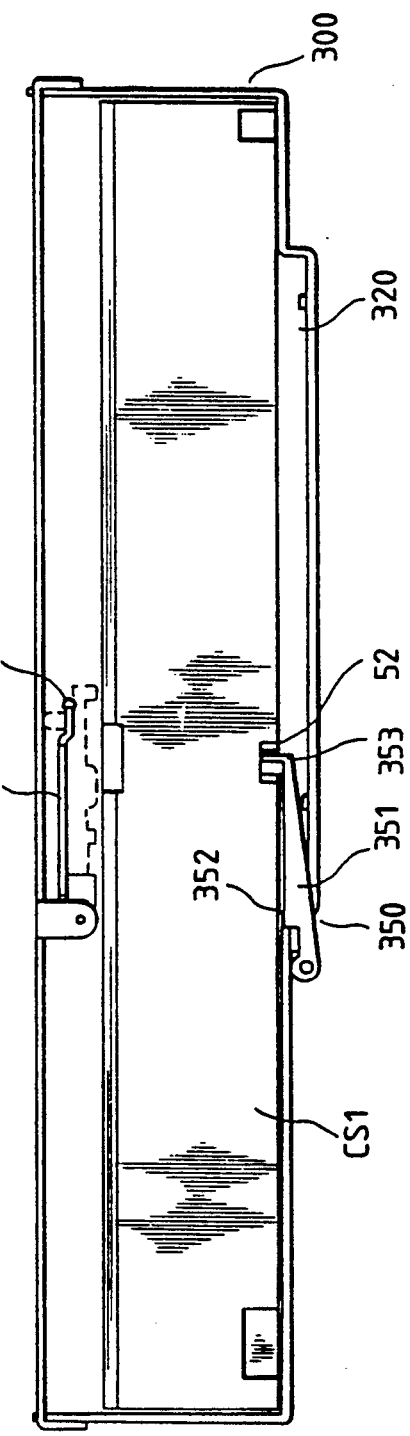

As shown in FIGS. 21 and 22, the erroneous insertion prevention mechanism 350 comprises an erroneous insertion prevention lever 351 angularly movably mounted on the lower surface of the bottom of the cassette holder 300. The erroneous insertion prevention lever 351 has an engaging portion 352 for engaging a guide plate 380 which guides one side of a smaller cassette, and an erroneous insertion prevention finger 353 at its tip end for engaging in an erroneous insertion prevention groove 52 defined in the bottom of each of standard and smaller cassettes.

Before a cassette is loaded, the guide plate 380 depends vertically as shown in FIG. 21, and has a presser 382 on its lower end pushing the engaging portion 352 of the erroneous insertion prevention lever 351, which is thus slightly turned clockwise about its pivoted end. The erroneous insertion prevention finger 353 is now held at the same vertical position as that of the erroneous insertion prevention groove 52 of a smaller cassette.

When a smaller cassette CS2 is normally inserted into the cassette holder 300, the erroneous insertion prevention finger 353 enters the erroneous insertion prevention groove 52 of the smaller cassette CS2, and hence does not interfere with the insertion of the smaller cassette CS2. If the smaller cassette CS2 is improperly inserted, e.g., if it is inserted in an inverted manner, or upside down, the erroneous insertion prevention finger 353 hits the smaller cassette CS2, preventing the smaller cassette CS2 from being further inserted into the cassette holder 300.

When a standard cassette CS1 is inserted, the guide plate 380 is automatically turned and held against the top panel of the cassette holder 22 by a mechanism described later on, as shown in FIG. 22. Since the erroneous insertion prevention lever 351 is no longer pushed downwardly by the presser 382 of the guide plate 380, the erroneous insertion prevention lever 351 is slightly turned counterclockwise (FIG. 21) into the position shown in FIG. 22. Now, the erroneous insertion prevention finger 353 is held at the same vertical position as that of the erroneous insertion prevention groove 52 of the standard cassette CS1. When the standard cassette CS1 is normally inserted, the erroneous insertion prevention finger 353 enters the erroneous insertion prevention slot 52 of the standard cassette CS1, and does not interfere with the insertion of the standard cassette CS1. If the standard cassette CS1 is improperly inserted, e.g., if it is inserted upside down, the standard cassette CS1 is checked by the erroneous insertion prevention finger 353 against further insertion.

Figure 23:
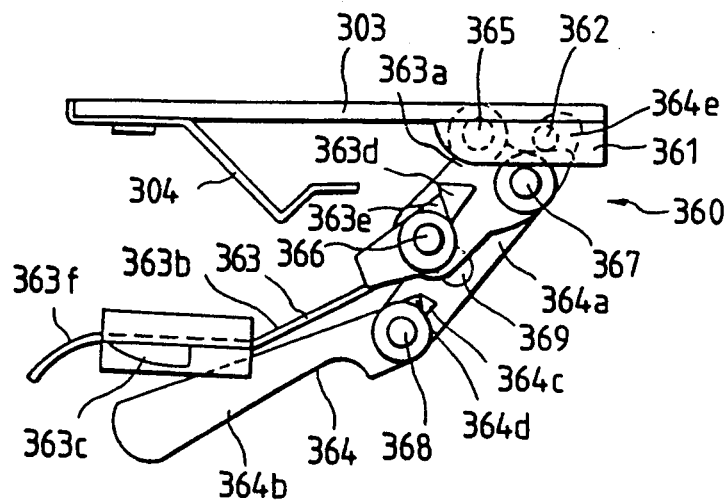
FIGS. 23 through 28 are views of a smaller cassette holding mechanism.
Figure 24:
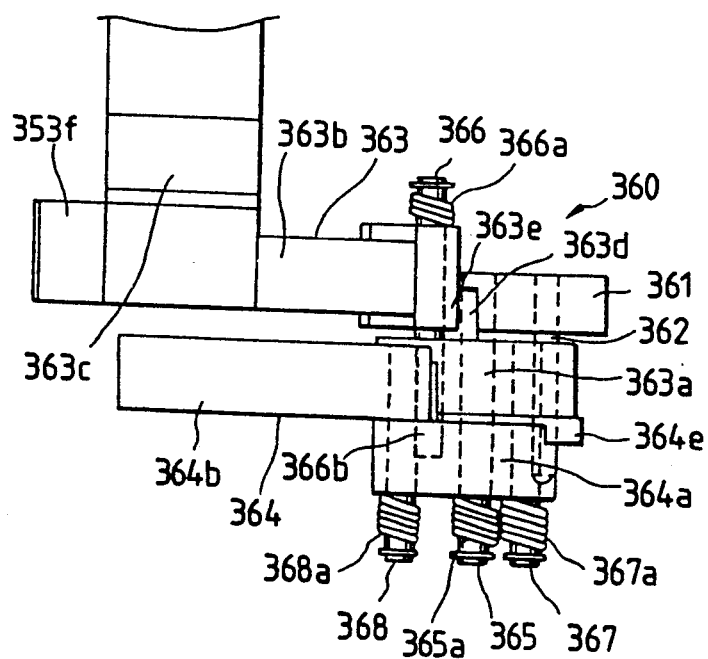

As shown in FIGS. 3 and 23 through 28, the smaller cassette holding mechanism, generally denoted at 360, is mounted on the top panel 303 of the cassette holder 300. As shown in FIGS. 3, 23, and 24, the smaller cassette holding mechanism 360 basically comprises a pair of laterally spaced pressers 363 and a pair of laterally spaced actuators 364 parallel to and associated with the respective pressers 363.

Each of the pressers 363 comprises a presser base 363a angularly movably mounted on a first shaft 365 attached to a mount 361 on the top panel 303, and a leaf spring 363b pivotally mounted on the presser base 363a by a second shaft 366. The leaf spring 363b has on its distal end a presser element 363c for pressing a smaller cassette CS2. The presser element 363c has an arcuate surface 363f on its distal end as shown in FIG. 23.

The presser base 363a is normally urged to turn counterclockwise (FIG. 23) about the first shaft 365 by a first spring 365a (FIG. 24) disposed around the first shaft 365, for thereby holding the upper surface of the presser base 363a against a pin 362 projecting from the mount 361. The leaf spring 363b is normally urged to turn clockwise (FIG. 23) about the second shaft 366 by a second spring 366a disposed around the second shaft 366. A stopper 363d on a side of the presser base 363a is engaged by an abutment 363e of the leaf spring 363b, so that the leaf spring 363b is normally kept in an inclined position as shown in FIG. 23. The leaf spring 363b is thus angularly movable counterclockwise (FIG. 23), but not angularly movable clockwise about the second shaft 366.

Each of the actuators 364 comprises an actuator base 364a angularly movably mounted on the presser base 363a by a third shaft 367, and an actuator element 364b mounted on the actuator base 364a by a fourth shaft 368.

The actuator base 364a is normally urged to turn counterclockwise (FIG. 23) about the third shaft 367 by a third spring 367a disposed around the third shaft 367. A hook 364e is mounted on the actuator base 364a and engages the pin 362 of the mount 361. The hook 364e serves as a rotation limiting member for selectively making the presser 363 rotatable and nonrotatable. The actuator element 364b is normally urged to turn clockwise (FIG. 23) about the fourth shaft 368 by a fourth spring 368a disposed around the fourth shaft 368. A stopper 364c on a side of the actuator base 364a is engaged by an abutment 364d of the actuator element 364b, so that the actuator element 364b is normally kept in an inclined position as shown in FIG. 23. The actuator element 364b is thus angularly movable counterclockwise (FIG. 23), but not angularly movable clockwise about the fourth shaft 368.

The second shaft 366 has an end 366b projecting toward the actuator 364 and positioned above the actuator base 364a. When the actuator 364 is turned clockwise (FIG. 23), it engages the projecting end 366b and turns also the presser 363 clockwise with the actuator 364. The actuator base 364a has an upwardly opening U-shaped groove 369 defined therein for receiving the projecting end 366b therein. When the smaller cassette holding mechanism 360 is moving upwardly to its highest position, the projecting end 366b is fitted into the U-shaped groove 366b and does not interfere with further upward movement of the actuator 364.

Figure 26A:
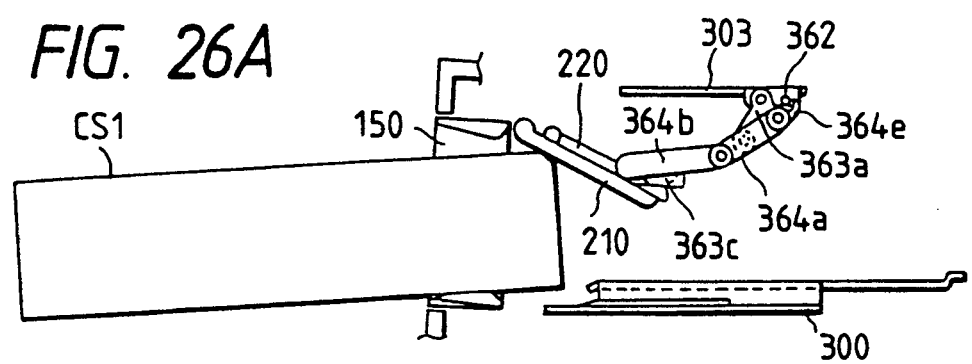
Figure 28:
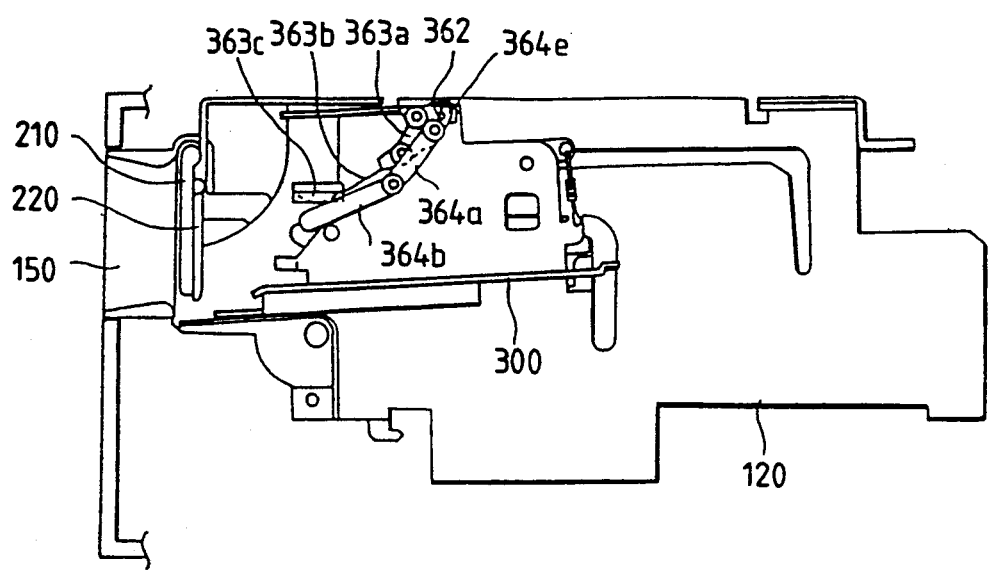
Figure 29:
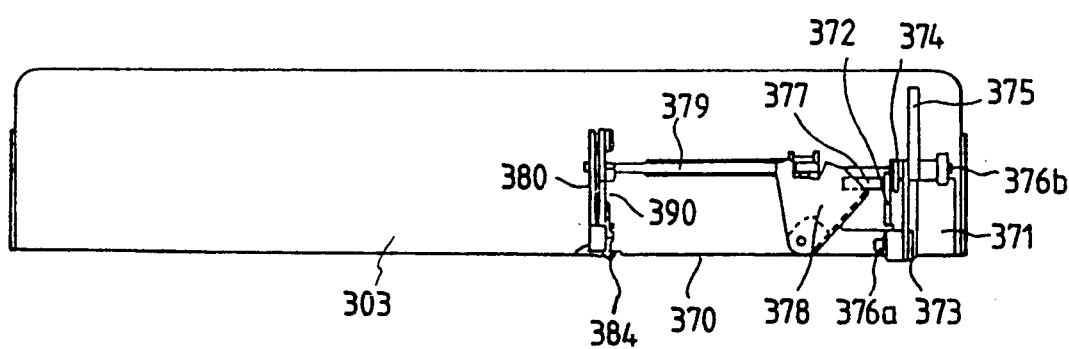

Before a cassette is inserted, the smaller cassette holding mechanism 360 is held in the position shown in FIG. 28. When a standard cassette CS1 is inserted as shown in FIG. 26A, the first door 210 is opened by the inserted standard cassette CS1, and the actuator element 364b of the actuator 364 is pushed upwardly by the first door 210. Since the stopper 364c is engaged by the abutment 364d, the actuator element 364b and the actuator base 364a turn in unison clockwise (FIG. 26A) about the third shaft 367, until the hook 364e disengages from the pin 362.

Figure 26B:
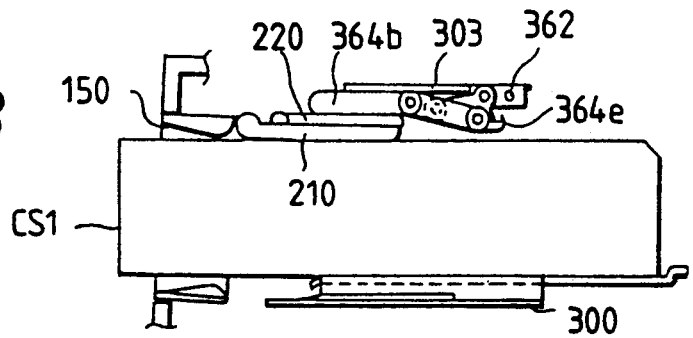

Continued insertion of the standard cassette CS1 causes the first door 210 to push the presser 363 and the actuator 364 further upwardly, bringing the first door 210 underneath the smaller cassette holding mechanism 360, as shown in FIG. 26B. At this time, the projecting end 366b of the second shaft 366 is inserted in the U-shaped groove 369, allowing the actuator 364 to move upwardly.

Figure 25:
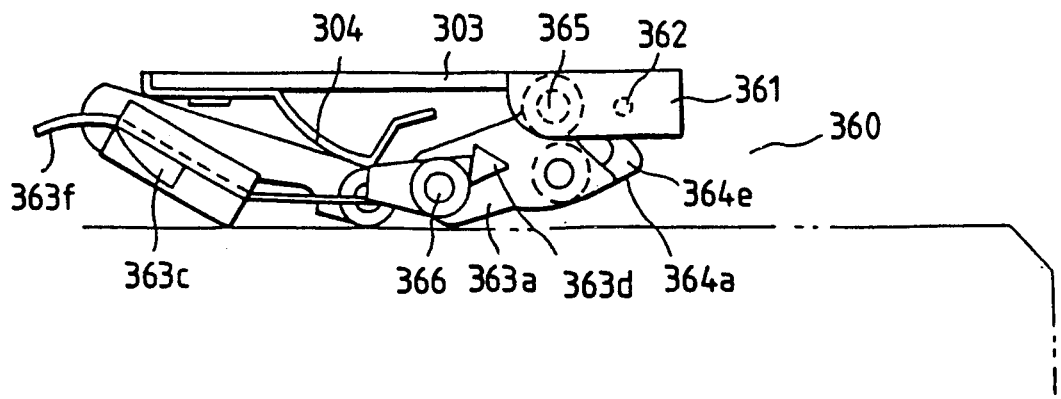
Figure 26C:
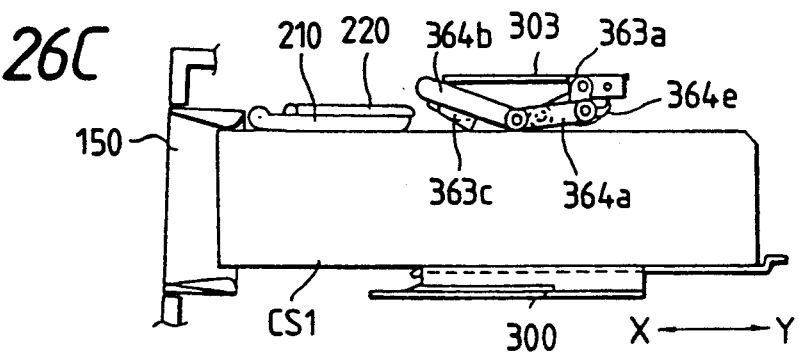

Thereafter, the cassette holder 300 with the standard cassette CS1 inserted therein is moved in the direction indicated by the arrow Y, and the smaller cassette holding mechanism 360 disengages from the first door 210, as shown in FIG. 26C. As shown in FIG. 23, a leaf spring 304 is mounted on the lower surface of the top pane 303 above the actuator 364. As shown in FIG. 25, when the smaller cassette holding mechanism 360 is pushed upwardly, the leaf spring 304 is held against and applies resilient forces to the actuator 364, which thus serves as a cassette presser for pressing one end of the inserted standard cassette CS1, as shown in FIG. 26C. When the loaded standard cassette CS1 is to be ejected, the smaller cassette holding mechanism 360 operates in a reverse manner, from the position shown in FIG. 26C through the position shown in FIG. 26B to the position shown in FIG. 26A.

Figure 27A:
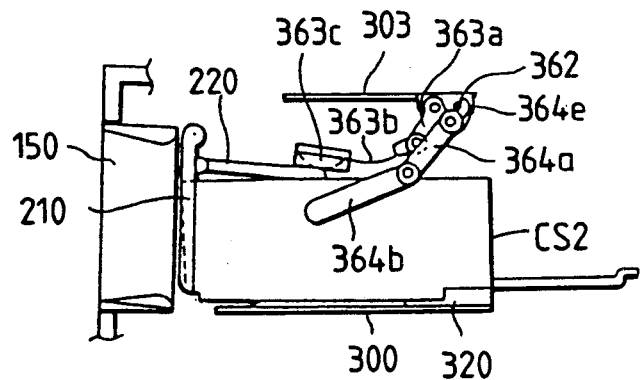

When a smaller cassette CS2 is inserted with the smaller cassette holding mechanism 360 positioned as shown in FIG. 28, only the second door 220 is opened by the inserted smaller cassette CS2 as shown in FIG. 27A, and pushes the leaf spring 363b upwardly or clockwise (FIG. 27A). At this time, the actuator element 364b is positioned out of engagement with the second door 220, and hence is not pushed upwardly. Since the hook 364e remains in engagement with the pin 362 as shown in FIG. 27A, the presser base 363a is not turned upwardly about the first shaft 365 toward the top panel 303, but remains in the position shown in FIG. 27A. Only the leaf spring 363b is resiliently flexed upwardly by the second door 220, which is brought underneath the leaf spring 363b.

Figure 27B:
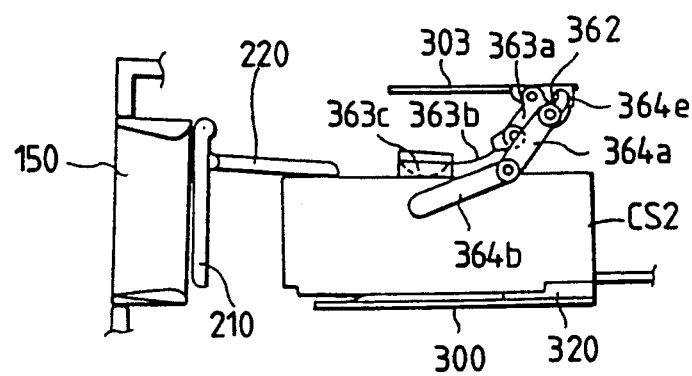

When the cassette holder 300 with the smaller cassette CS2 inserted therein is moved into the position shown in FIG. 27B, the smaller cassette holding mechanism 360 disengages from the second door 220. At this time, the smaller cassette CS2 is pressed downwardly by the presser element 363c under the bias of the leaf spring 363b.

When the loaded smaller cassette CS2 is to be ejected, the smaller cassette holding mechanism 360 operates substantially in a reverse fashion, i.e., from the position shown in FIG. 27B to the position shown in FIG. 27A. If, however, the second door 220 were placed underneath the leaf spring 363b as shown in FIG. 27A during the ejection stroke, the leaf spring 363b would frictionally engage the second door 220 and impose an undue load on the ejection of the smaller cassette CS2 by the spring-loaded slide plate 331.

Figure 27C:
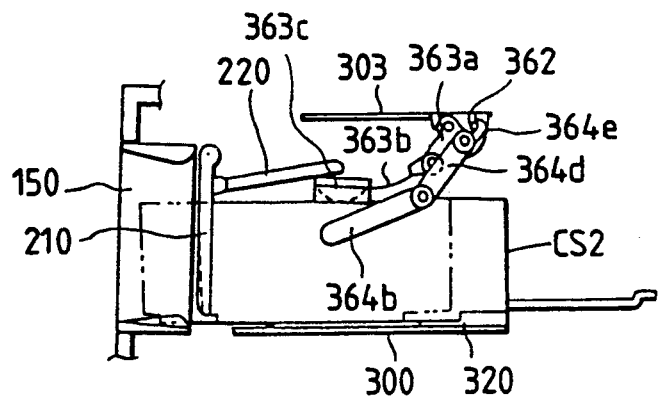

To avoid the above difficulty, the arcuate end 363f of the leaf spring 363b enters beneath the second door 220, and hence the second door 220 rides on the arcuate end 363f when the cassette holder 300 approaches the cassette insertion slot 150 upon the ejection movement as shown in FIG. 27C. Inasmuch as the second door 220 smoothly rides onto the arcuate end 363f of the leaf spring 363, no undue load is imposed on the smaller cassette CS2 as it is ejected, and thus the smaller cassette CS2 can smoothly and reliably be ejected by the spring-loaded slide plate 331.

Figure 40A:
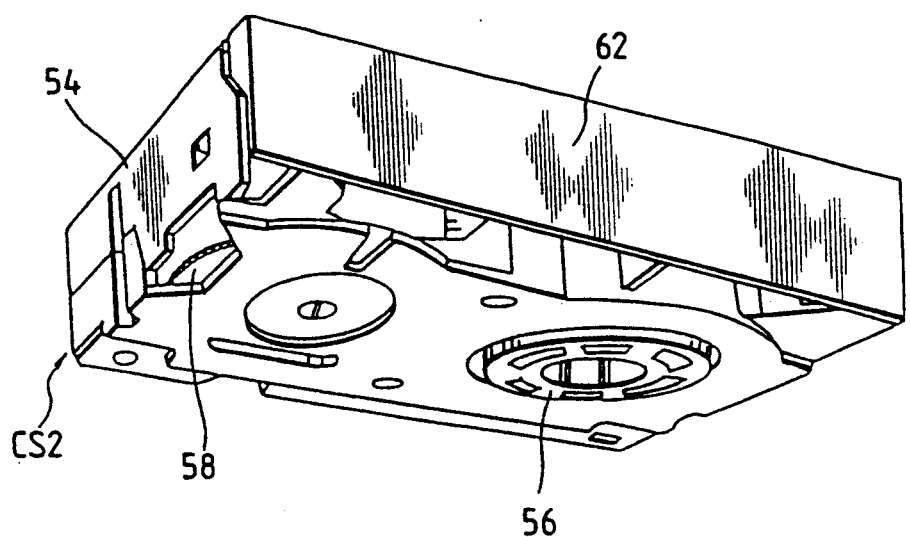
FIGS. 40A and 40B are perspective and side elevational views of a smaller cassette.
Figure 40B:
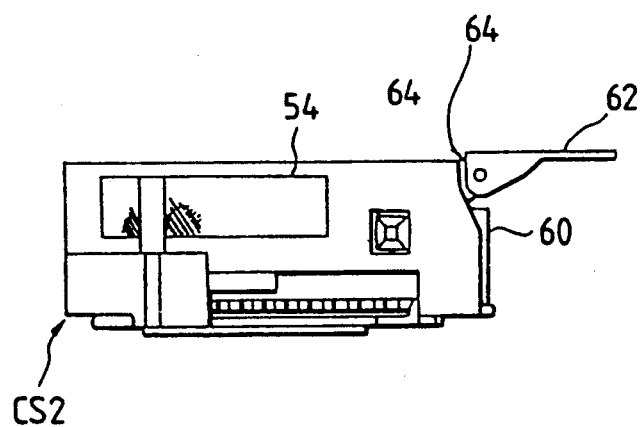

As shown in FIG. 40A, a smaller cassette CS2 generally comprises a cassette case 4 having supply and takeup reels 56, 58 with a magnetic tape 60 (FIG. 40B) wound thereon, and a lid 62 pivotally mounted on the cassette case 54 for protecting a stretch of the magnetic tape 60 on a front side of the cassette case 54. The lid 62 is spring-biased to close on the magnetic tape 60. When the lid 62 is fully opened, the upper surface of the lid 62 is positioned upwardly of the upper surface of the cassette case 54, providing a step 64. When the smaller cassette CS2 is ejected, the step 64 is caught by the right edge (as viewed in FIG. 23) of the presser element 363c of the leaf spring 363b, thus closing the lid 62. Accordingly, when the smaller cassette CS2 is ejected, the lid 62 is closed by engagement with the presser element 363c of the leaf spring 363b.

As shown in FIGS. 29 through 31A and 30B, the mechanism, generally denoted at 370, for turning a lid opener assembly for a smaller cassette is mounted on the lower surface of the top panel 303 of the cassette holder 300. As shown in FIGS. 29 through 32, the mechanism 370 comprises a first arm 373 pivotally mounted on a first shaft 376a supported on a mount 371 on the top panel 303 of the cassette holder 300, a second arm 374 pivotally mounted on one end of a pin 377 slidably engaging in a slot 372a defined in a raised member 372 of the top panel 303, and a third arm 375 pivotally mounted on the first and second arms 373, 374 by a second shaft 376b.

The third arm 375 is normally urged to turn clockwise (FIG. 31A) about the second shaft 376b by a spring 376c disposed around the second shaft 376b. However, the third arm 375 is prevented by a stopper (not shown) from further turning clockwise from the position shown in FIG. 31A.

An angularly movable sector plate 378 is connected to the other end of the pin 377, and lies in a plane normal to the arms 373, 374, 375. A rack rod 379 which is movable along its own axis engages the sector plate 378. The rack rod 379 extends perpendicularly to the arms 373, 374, 375. The rack rod 379 has a rack 379a on its end remote from the sector plate 378. The guide plate 380 is pivotally mounted on a third shaft 384, for guiding a side of a smaller cassette when the smaller cassette is inserted, the guide plate 380 having a lid opener assembly 390. The guide plate 380 also has a gear 381 meshing with the rack 379a and a presser 382 for pressing the engaging portion 352 of the erroneous insertion prevention lever 351 shown in FIGS. 21 and 22. The guide plate 380 is normally urged to turn counterclockwise, i.e., downwardly, in FIG. 30B about the third shaft 384 by a spring 383 disposed around the third shaft 384.

Figure 31A:
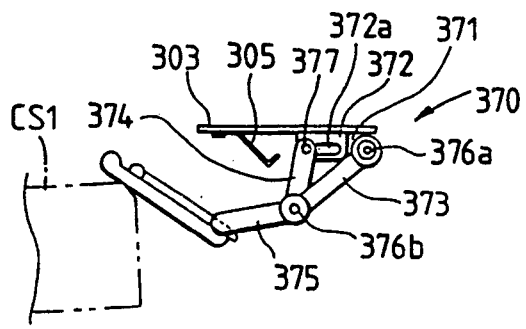

When the first door 210 is turned or opened by the insertion of a standard cassette CS1, the third arm 375 is angularly pushed clockwise by the first door 210 as shown in FIG. 31A, and the pin 377 joined to the second arm 374 is moved in the direction indicated by the arrow Y in and along the slot 372a. This movement of the pin 377 causes the sector plate 378 to turn from the position shown in FIG. 30A to the position shown in FIG. 30D.

Figure 30A:
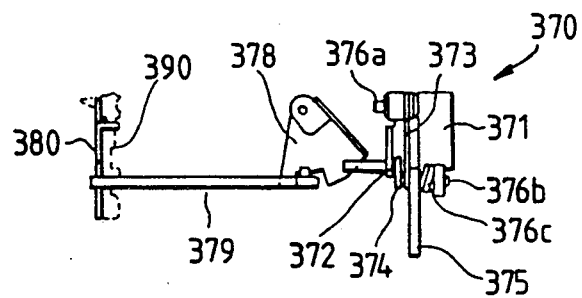
Figure 30B:
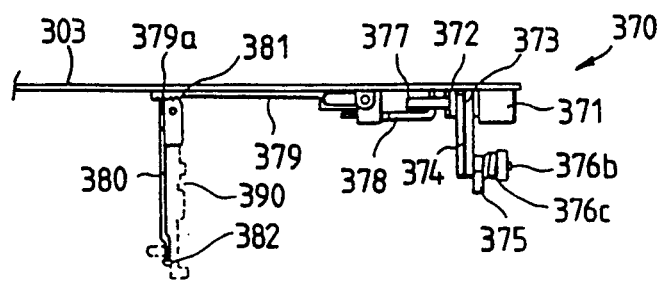
Figure 30C:
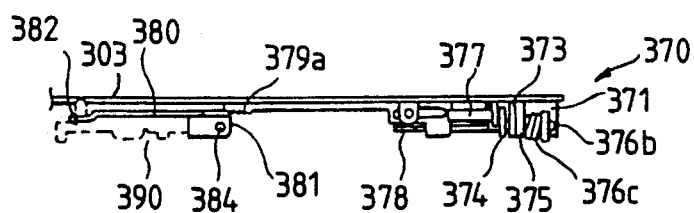
Figure 30D:
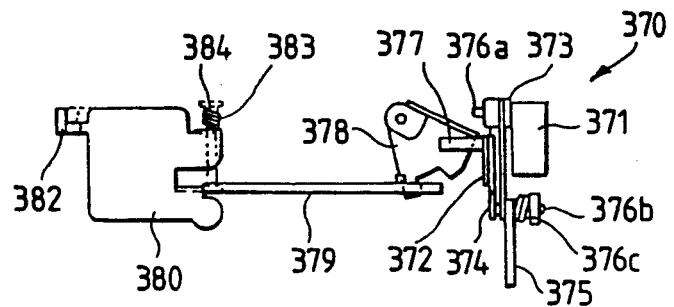

Upon the angular movement of the sector plate 378, the rack rod 379 is axially slid to the right in FIG. 30B. The guide plate 380, whose gear 381 meshes with the rack 379a, is angularly moved from the downwardly depending position shown in FIG. 30B to the position shown in FIG. 30C in which the guide plate 380 lies against and substantially parallel to the top panel 303.

The guide plate 380 with the lid opener assembly 390 is now positioned between the inserted standard cassette CS1 and the top panel 303, out of interference with further insertion of the standard cassette CS1. When the guide plate 380 depends vertically as shown in FIG. 30B, the presser 382 on the lower end thereof presses the engaging portion 352 of the erroneous insertion prevention lever 351 as shown in FIG. 21. When the guide plate 380 is angularly displaced upwardly into the position shown in FIG. 30C, it releases the engaging portion 352 of the erroneous insertion prevention lever 351 as shown in FIG. 22.

When a smaller cassette is inserted, the second door 220 does not engage the third arm 375 and the mechanism 370 does not operate as described above. The guide plate 380 remains depending vertically, and guides one side of the smaller cassette as it is inserted.

Figure 31B:
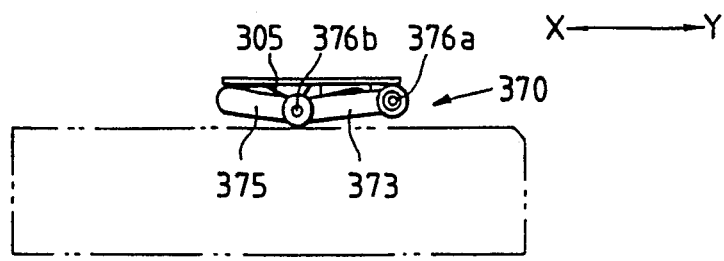

As shown in FIG. 31, a leaf spring 305 is mounted on the top panel 303 of the cassette holder 300, for engagement with the second shaft 376b. When a standard cassette is inserted, and the second arm 374 is pushed upwardly, the second shaft 376b is engaged and resiliently biased by the leaf spring 305, as shown in FIG. 31B. The second shaft 276b therefore serves as a cassette presser for pressing the other end of the standard cassette (the cassette presser for pressing the opposite end of the standard cassette is the actuator 364 of the smaller cassette holding mechanism 360).

Figure 32:
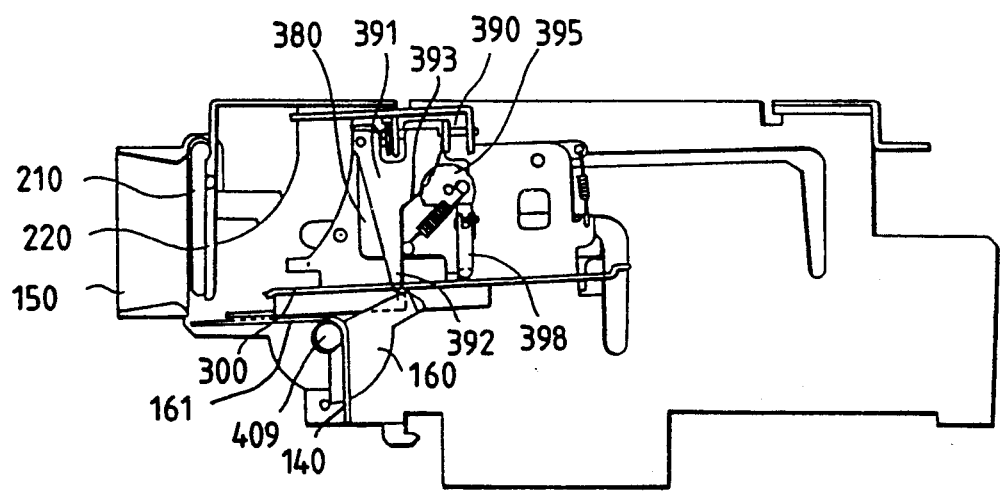
FIG. 32, 33A, and 33B are views of the lid opener assembly for a smaller cassette.
Figure 33A:
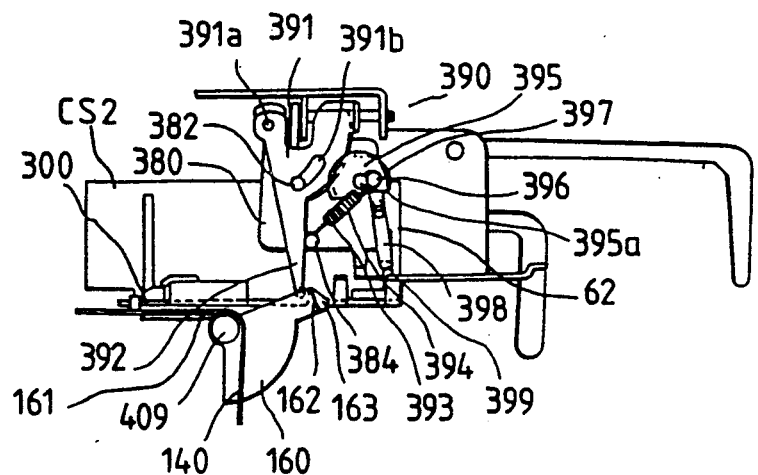
Figure 33B:
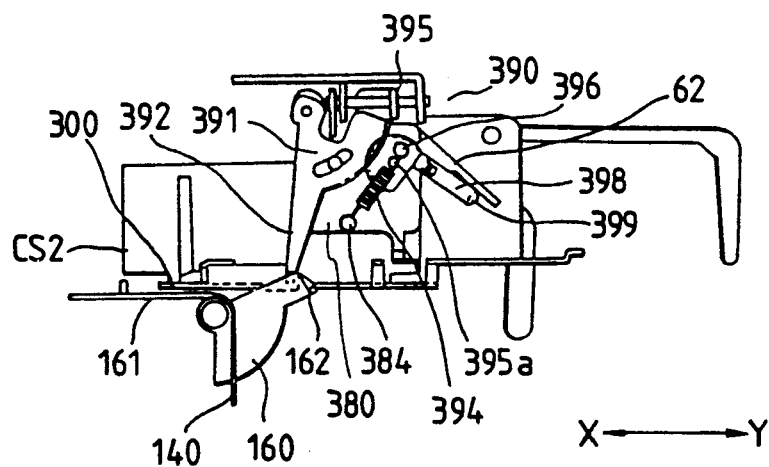

As shown in FIGS. 32, 33A and 33B, the lid opener assembly 390 on the guide plate 380 comprises an arm gear 391 mounted on one side of the guide plate 380, and a lid opener 395.

The arm gear 391 is angularly movably supported on a shaft 391a mounted on the guide plate 380 and has an arcuate slot 391b defined therein. The arm gear 391 is angularly movable in a limited angular range by a pin 382 mounted on the guide plate 380 and fitted in the arcuate slot 391b. The arm gear 391 also has an engaging finger 392 and gear teeth 393.

The lid opener 395 is angularly movably mounted on the guide plate 380 by a shaft 395a. The lid opener 395 is normally urged to turn clockwise in FIG. 33A by a spring 394 which engages and extends between a pin 396 mounted on the lid opener 395 off the shaft 395a and a pin 384 mounted on the guide plate 380. The lid opener 395 has gear teeth 397 meshing with the gear teeth 393 of the arm gear 391, and an opener member 398 which has a finger 399 for projecting into the smaller cassette storing space and opening the lid 62 of a smaller cassette CS2 in the cassette holder 300.

An arm gear hook 160 is angularly movably mounted on the shaft 409 in the lower panel 140 of the housing 100. The arm gear hook 160 is normally urged to turn counterclockwise (FIG. 33) by a spring 161, and has an end engaging an end of a recess defined in the lower panel 140, thus keeping the arm gear hook 160 in the position shown in FIG. 32. The arm gear hook 160 has a hook member 162 engaging the distal end of the engaging finger 392, and a tapered surface 163 on an outer side of the hook member 162.

When no cassette is loaded, the guide plate 380 depends downwardly as shown in FIG. 32, and the lid opener assembly 390, the engaging finger 392 of the arm gear 391, and the opener member 398 of the lid opener 395 are all directed downwardly.

When a smaller cassette CS2 is inserted as shown in FIG. 33A, the finger 399 of the opener member 398 engages an inner surface of the lid 62 of the smaller cassette CS2. Since the cassette holder 300 itself is moved in the direction indicated by the arrow Y in FIGS. 33A and 33B, the distal end of the engaging finger 392 is caught by the hook member 162 of the arm gear hook 160. As the cassette holder 300 is moved in the direction indicated by the arrow Y, the engaging finger 392 is pulled by the hook member 162 in the direction indicated by the arrow X, and the arm gear 391 is turned clockwise (FIG. 33B) about the shaft 391a. Thus, the lid opener 395 is turned counterclockwise about the shaft 395a.

When the pin 396 moves past a line which interconnects the pin 384 on the guide plate 380 and the shaft 395a of the lid opener 395, as shown in FIG. 33B, the spring 394 applies its resilient forces in a direction to turn the lid opener 395 counterclockwise. Therefore, the lid opener 395 clicks into the position shown in FIG. 33C. At this time, the engaging finger 392 disengages from the hook member 162.

Figure 33C:
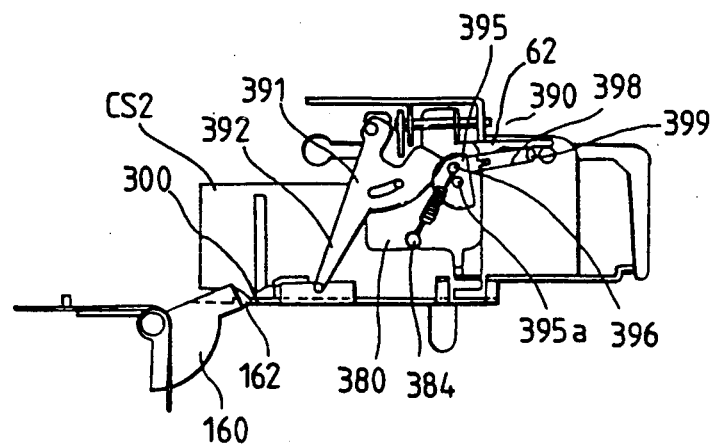

The lid 62 of the smaller cassette CS2, which is engaged by the finger 399 of the opener member 398, is therefor turned from the closed position shown in FIG. 33A to the open position shown in FIG. 33C.

Figure 33D:
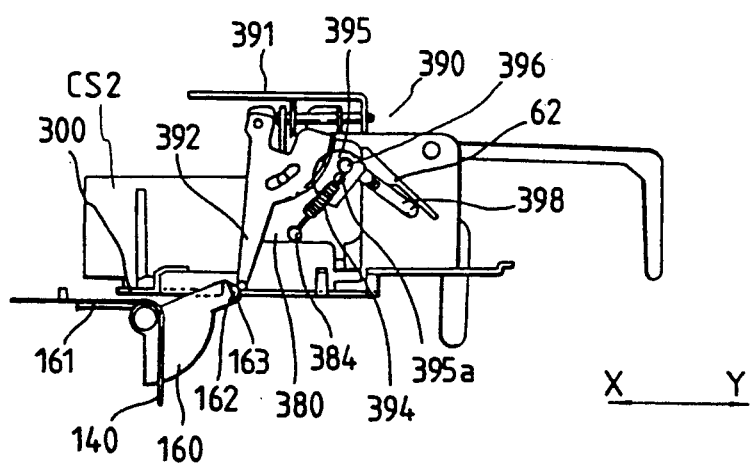

To eject the loaded smaller cassette CS2, the cassette holder 300 is moved in the direction indicated by the arrow X with the lid opener assembly 390 being held in the position shown in FIG. 33C. Upon the movement of the cassette holder 300 in the direction indicated by the arrow X, the distal end of the engaging finger 392 abuts against the tapered surface 163 of the arm gear hook 160, as shown in FIG. 33D. In response to further movement of the cassette holder 300 in the direction indicated by the arrow X, the arm gear 391 is turned to turn counterclockwise by its engaging finger 392 engaging the tapered surface 163.

As shown in FIG. 33B, when the pin 396 moves back past the line interconnecting the pin 384 and the shaft 395a, the spring 394 applies its resilient forces in a direction to turn the lid opener 395 clockwise. The lid opener 395 now clicks into the position shown in FIG. 32.

As the cassette holder 300 is further moved in the direction indicated by the arrow X, the distal end of the engaging finger 392 rides over the tapered surface 163, turning the arm gear hook 160 clockwise. The distal end of the engaging finger 392 is positioned just in front of the hook member 162 in the direction indicated by the arrow X, as shown in FIG. 33A.

The wire guiding mechanism, generally denoted at 500, will now be described below. As shown in FIG. 1, the cassette holder 300 has the standard cassette detecting switches 313 and the smaller cassette detecting switch 335, as described above. Wires extending from these switches 313, 335 are connected to a microcomputer in the video cassette recorder. Since the cassette holder 300 is movable in the directions indicated by the arrows X, Y, these wires 501 may be caught by other components in the video cassette recorder or may be cut off, or may hold the cassette holder 300 against movement.

Figure 4B:
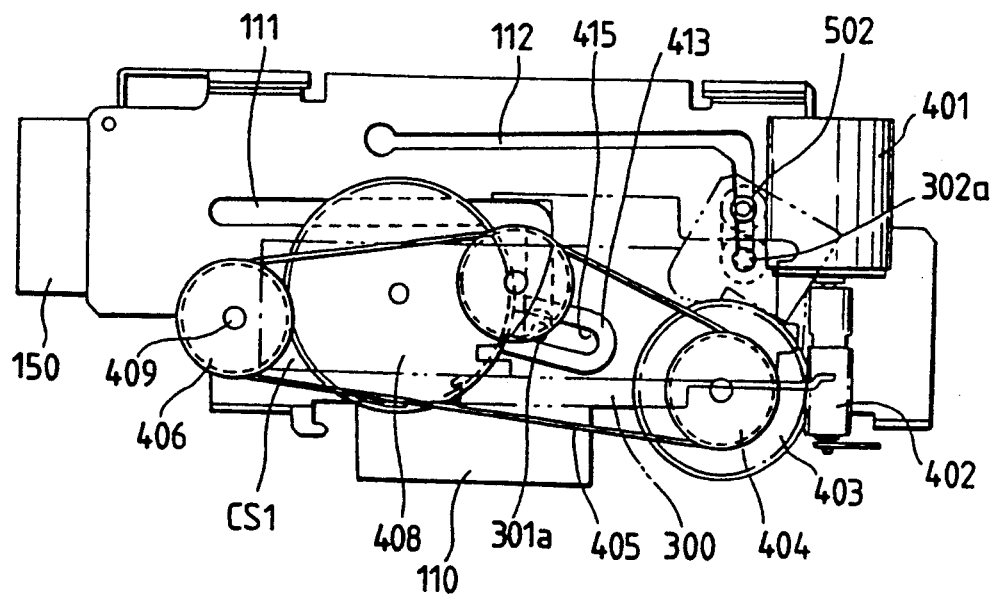
Figure 4C:
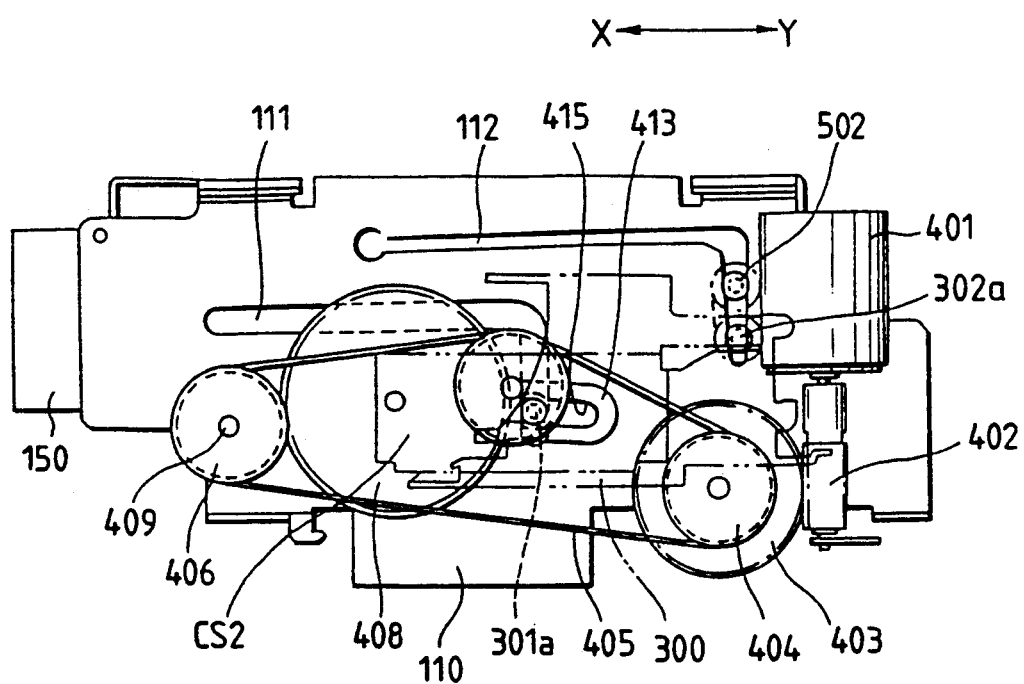
Figure 34A:
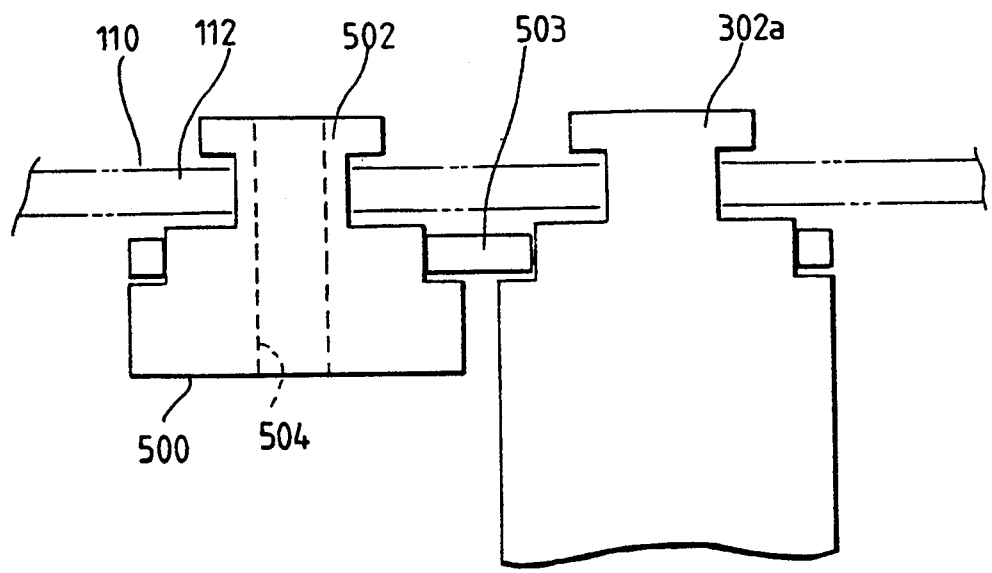
FIGS. 34A and 34B are plan and front elevational views of a wire grommet and a guide pin.
Figure 34B:
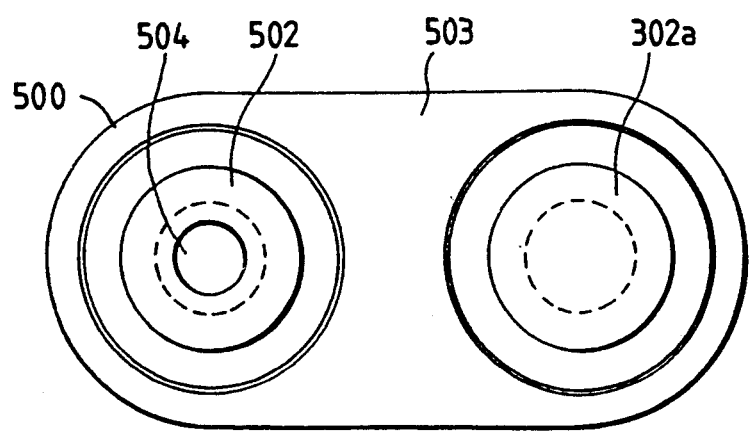

As shown in FIGS. 1, 4A and 4B, a wire grommet 502 is mounted on the right side panel 110 of the housing 100 adjacent to the right guide pin 302a in the direction indicated by the arrow X. As shown in FIGS. 34A and 34B, the wire grommet 502 is angularly movably coupled to the guide pin 302a by a connector 503. The wire grommet 502 is also fitted in the guide groove 112, so that the wire grommet 502 can move with the guide pin 302a in the guide groove 112.

The wires 501 from the switches 313, 335 may directly lead through a through hole 504 in the wire grommet 502 onto the outer surface of the fixed side panel 110 of the housing 100. More preferably, since the wire grommet 502 is turned clockwise in FIGS. 4B and 4C when it reaches a vertical portion of the guide groove 112, the wires 501 should be wound on the guide pin 302a in such a direction that the wires 501 will loosen when the wire grommet 502 is turned, and then be extended through the wire grommet 502 onto the outer surface of the side panel 110.

With the above arrangement, the wires 501 are prevented from being damaged by the cassette holder 300 as it moves, and does not hold the cassette holder 300 immovable. In addition, the wire guiding mechanism 500 is simple in structure.

The holder support mechanism, generally denoted at 600, for supporting the cassette holder 300 will be described below with reference to FIGS. 35A, 35B and 36A, 36B.

The holder support mechanism 600 comprises a small chassis 601 mounted in the video cassette recorder and supporting positioning pins 602 for a smaller cassette, a gear 603, and other components. The small chassis 601 is lowered when a standard cassette is loaded as shown in FIGS. 35A and 35B, and is elevated when a smaller cassette is loaded as shown in FIGS. 35A and 35B.

Standard and smaller cassettes are in different vertical positions when they are inserted in the cassette holder 300, and also in different vertical positions when they are in the loaded position in the video cassette recorder. More specifically, when a standard cassette CS1 is loaded as shown in FIGS. 35A and 35B, the guide pins 301a, 302a and 301b, 302b the cassette holder 300 are located at and supported by the lowermost ends of the respective guide grooves 111, 112 and 121, 122. The cassette holder 300 is thus positioned accurately in the position shown in FIGS. 35A and 35B.

Figure 36A:
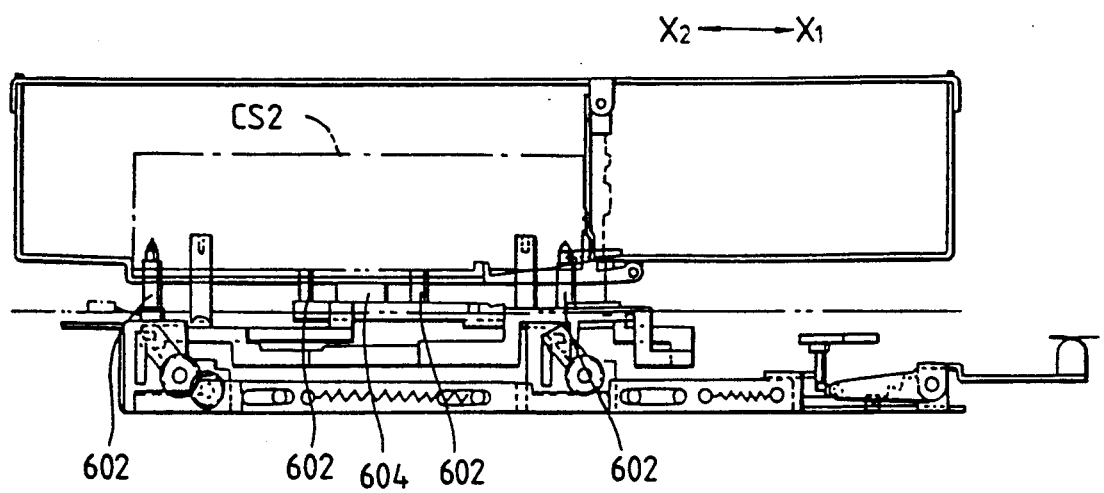
Figure 36B:
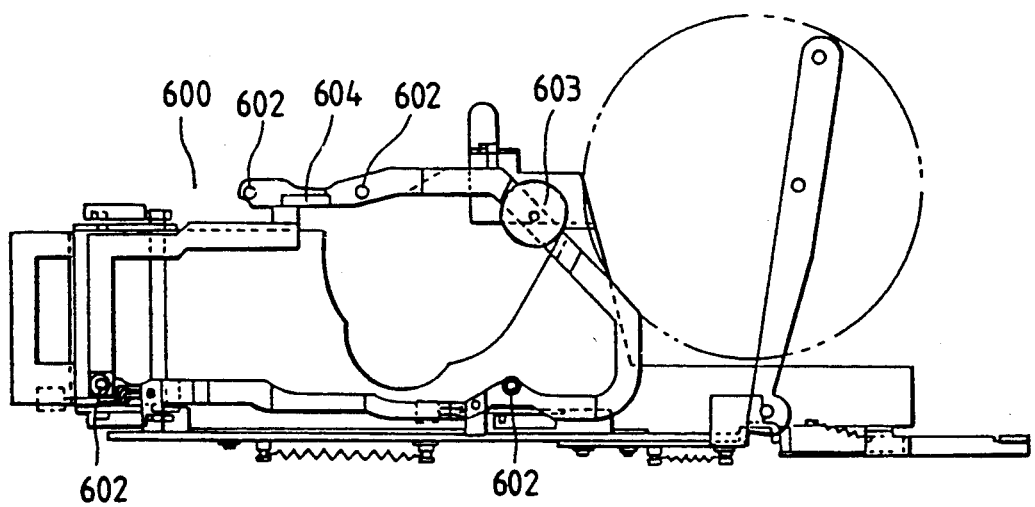

When a smaller cassette CS2 is loaded as shown in FIGS. 36A and 36B, the guide pins 301a, 302a and 301b, 302b are positioned slightly above the lowermost ends of the respective guide grooves 111, 112 and 121, 122, and hence cannot supported on the lowermost ends of these guide grooves 111, 112 and 121, 122. The cassette holder 300 would therefore be not supported in its proper vertical position, and might be lowered from the vertical position for some reasons. If the cassette holder 300 were lowered and abutted against a component such as an idler in the video cassette recorder, then the component would not be properly operated. If the cassette holder 300 were lowered, the smaller cassette holding mechanism 360 shown in FIGS. 27A through 27C would exert increasing holding forces, which would in turn apply an undue load on the smaller cassette holding mechanism 360 and might damage the smaller cassette holding mechanism 360. To eliminate the above drawback, the small chassis 601 has a support 604 for abutting against and supporting the cassette holder 300.

Figure 35A:
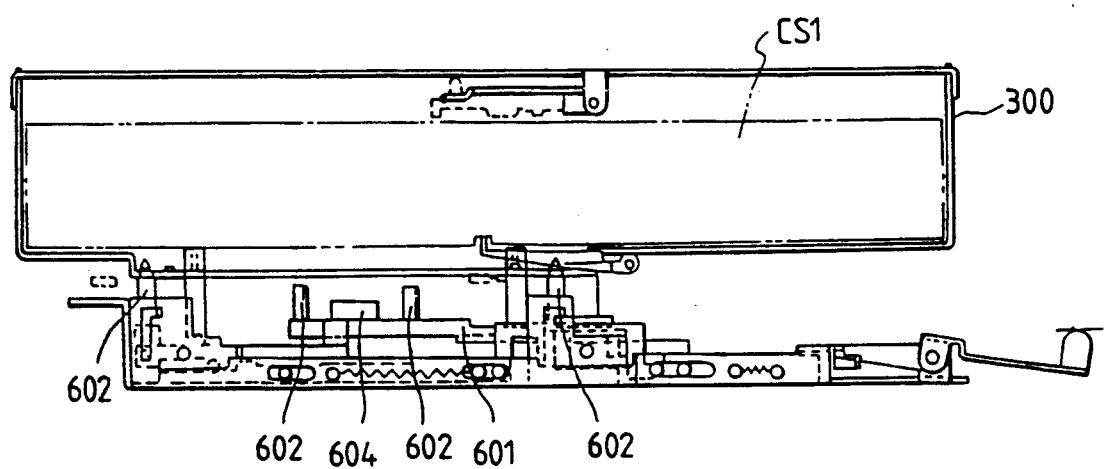
FIGS. 35A, 35B, 36A, and 36B are views of a holder support mechanism.
Figure 35B:
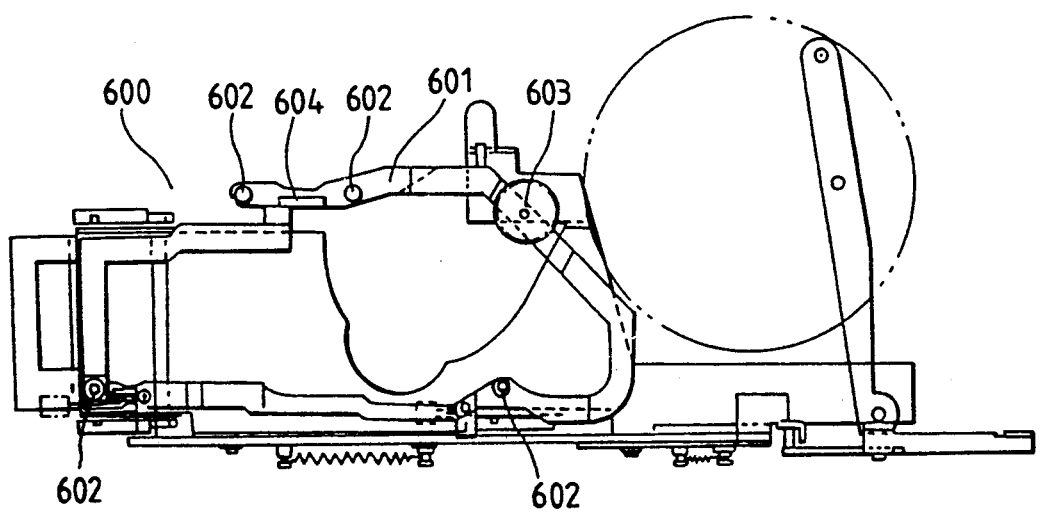

More specifically, when the standard cassette is loaded, as shown in FIGS. 35A and 35B, the small chassis 601 is lowered to keep the support 604 out of engagement with the cassette holder 300. When the smaller cassette is loaded, since the small chassis 601 is elevated, the support 604 of the small chassis 601 abuts against the bottom of the cassette holder 300 which is lowered, and supports the cassette holder 300. Therefore, the cassette holder 300 is reliably and easily prevented from being unduly lowered.

A sequence of operation for positioning the cassette holder 300 will be described below. As shown in FIGS. 1, 20A, and 20B, when a loaded smaller cassette CS2 is to be ejected, the cassette holder 300 is moved in the direction indicated by the arrow X (FIG. 20B) beyond a normal ejecting position (which is the same as the insertion standby position shown in FIG. 1) into the position (overstroke position) shown in FIG. 20B, in which the hooks 341 are spread apart from each other by the respective hook release pins 343 to free the smaller cassette CS2. Thereafter, the cassette holder 300 is returned to the normal ejecting position. When a loaded standard cassette CS1 is to be ejected, the cassette holder 300 is stopped in the normal ejecting position when it moves in the direction indicated by the arrow X, rather than being once brought into the overstroke position.

Therefore, the movement of the cassette holder 300 is differently controlled depending on the cassette to be loaded. More specifically, immediately before the cassette holder 300 is finally stopped, it moves in different directions when standard and smaller cassettes are to be ejected. It is quite difficult to stop the cassette holder 300 always at the same final position because of the accuracies of different sensors used and the backlash or play of mechanisms used.

To stop the cassette holder 300 accurately, it is controlled as shown in FIG. 37 which illustrates a more detailed control sequence.

(a) When a loaded smaller cassette is to be ejected, the cassette holder 300 is moved toward the cassette insertion slot, or in an ejecting direction, beyond the normal ejecting position into the overstroke position, in which the smaller cassette is released from the hooks 341.

(b) The cassette holder 300 is then withdrawn back from the overstroke position through the normal ejecting position into the housing.

(c) The cassette holder 300 is thereafter moved toward the cassette insertion slot from the withdrawn position into the normal ejecting position, or in a loading direction.

In this manner, the cassette holder 300 finally moves into the normal ejecting position always in the same direction regardless of whether the standard cassette or the smaller cassette is to be ejected. Since the cassette holder 300 finally moves in the same direction so that it is stopped in the same ejecting position with high accuracy, a next cassette can reliably be inserted into the cassette holder 300.

Figure 38:
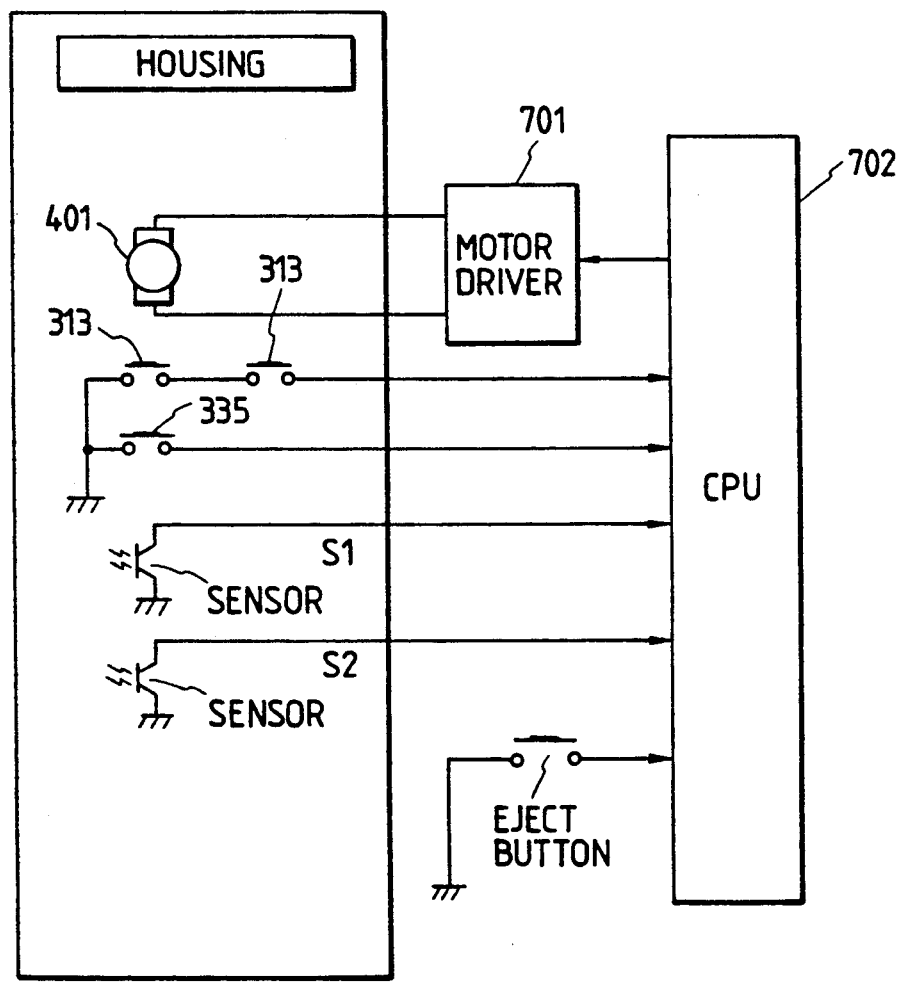
FIG. 38 is a schematic diagram showing an electronic control system for controlling the cassette holder according to the sequence shown in FIG. 37.
Figure 39A:
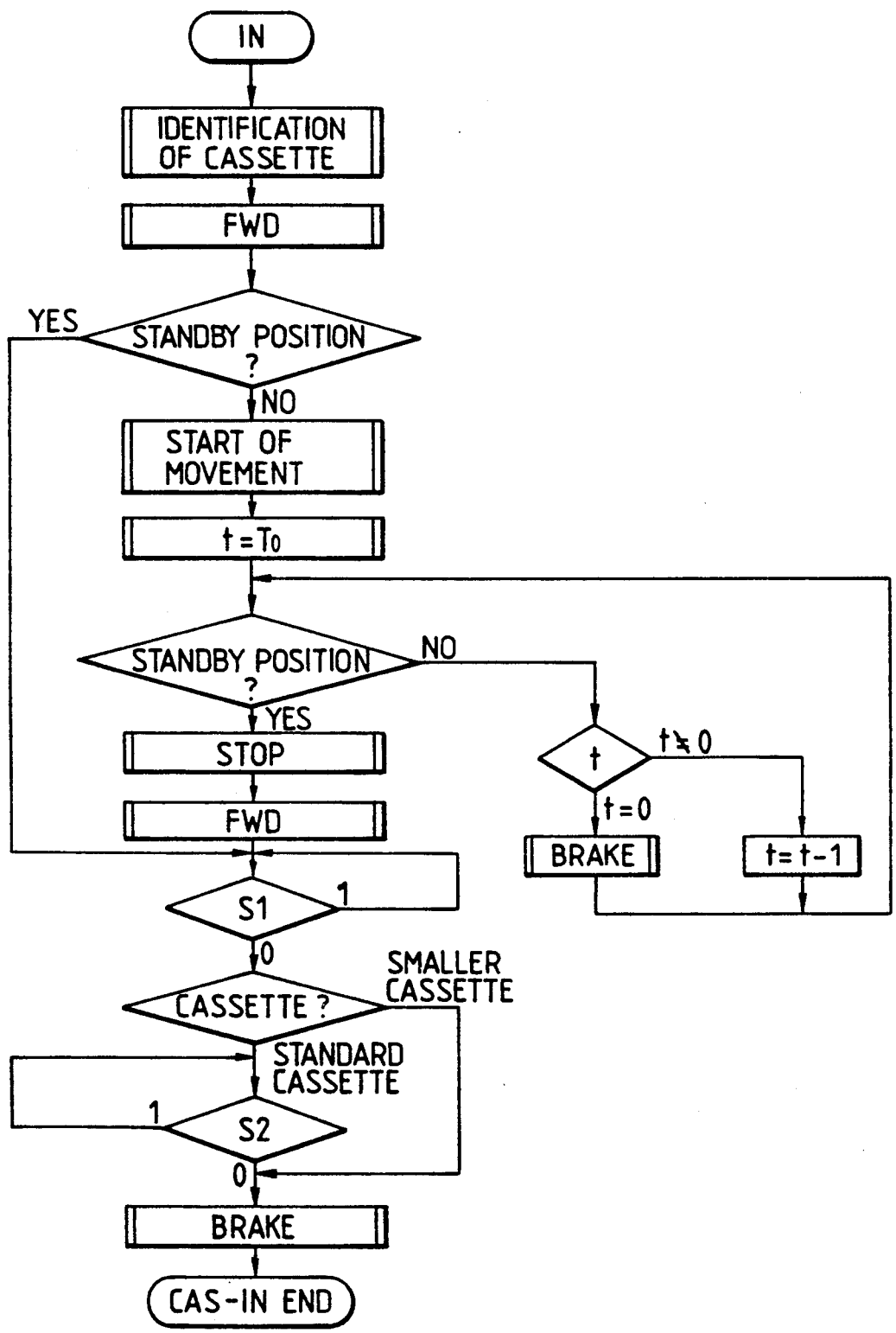
FIGS. 39A and 39B are flowcharts of CPU operation for controlling the cassette holder according to the control sequence shown in FIG. 37.
Figure 39B:
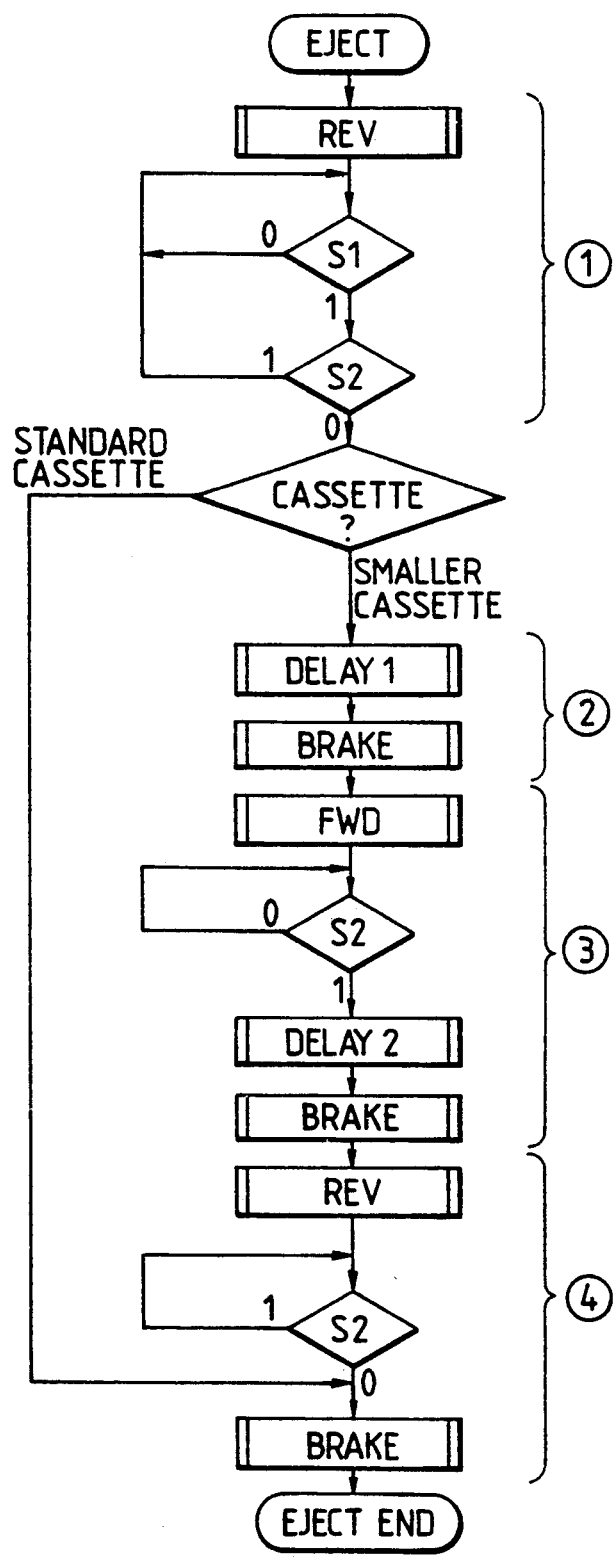

FIG. 38 schematically shows an electronic hardware system for carrying out the control sequence shown in FIG. 37. FIGS. 39A and 39B show flowcharts of CPU operation for controlling the cassette holder 300 according to the sequence shown in FIG. 37 when a cassette is inserted and ejected.

As shown in FIG. 38, the motor 401 for moving the cassette holder 300 in the housing 100 is controlled by a central processing unit (CPU) 702 through a motor driver 701. The CPU 702 is supplied with signals from the standard cassette detecting switches 313 and the smaller cassette detecting switch 335. The CPU 702 is also supplied with signals from sensors S1, S2 (also shown in FIG. 37) which are mounted respectively on the main gears 408, 411, for detecting when smaller and standard cassettes reach the loaded position, based on angular displacements of the main gears 408, 411, and also with a signal from an eject button that is operated on by the user to eject a loaded cassette. Based on these supplied signals, the CPU 702 controls the motor 401 according to the flowcharts shown in FIGS. 39A and 39B.

FIG. 39A shows a control sequence when a cassette is inserted. First, an inserted cassette is identified, and the motor 401 is rotated in a forward direction to move the cassette holder 300 horizontally in the FWD step. Then, it is determined whether various movable mechanisms in the video cassette recorder, such as the small chassis 601, tape loading members, etc., are in a loading standby position depending on the identified (inserted) cassette, and can load the cassette or not. If not in the standby position, then the movable mechanisms in the video cassette recorder start being moved into the loading standby position. Then, a timer t is set to an initial value To (corresponding to a period of time in which the cassette holder 300 is moved horizontally as shown in FIG. 37). If the movable mechanisms in the video cassette recorder do not reach the loading standby position yet, the timer is counted down. If the movable mechanisms do not still reach the loading standby position, then the motor 401 is braked or de-energized to prevent the cassette holder 300 from colliding with the movable mechanisms in the video cassette recorder. At this time, the movable mechanisms continue to move.

If the movable mechanisms in the video cassette recorder reach the loading standby position depending on the inserted cassette, then the movable mechanisms are stopped, and thereafter the motor 401 is rotated in the forward direction to move the cassette holder 300 vertically in the FWD step. (If the motor 401 has been braked or de-energized as described above, then the rotation of the motor 401 in the forward direction is resumed, and if not, then the motor 401 is continuously rotated in the forward direction.)

Thereafter, or if the movable mechanisms are first found to be in the loading standby position, and if the signal from the sensor S1 is "0", then whether the inserted cassette is a standard cassette or a smaller cassette is determined on the basis of the signals from the cassette detecting switches 313, 335. If the inserted cassette is a smaller cassette, then the motor 401 is braked or de-energized, and control goes to an end. If the inserted cassette is a standard cassette, then after the signal from the sensor S2 becomes "0", the motor 401 is braked or de-energized, and control goes to an end. Therefore, when a standard cassette is inserted, the cassette holder 300 moves from the insertion standby position or ejecting position (FIG. 37) to the first loaded position shown in FIG. 4B, and when a smaller cassette is inserted, the cassette holder 300 moves from the insertion standby position or ejecting position to the second loaded position shown in FIG. 4C, which is slightly higher than the first loaded position.

FIG. 39A shows a control sequence when a cassette is ejected. The numerals (1) through (4) correspond to those shown in FIG. 37. First, in response to an eject signal from the eject button, the motor 401 is reversed to move the cassette holder 300 from the loaded position in the ejecting direction in the REV step. Then, the signals from the sensors S1, S2 are checked to determine whether the cassette holder 300 reaches the ejecting position. Thereafter, it is determined whether the inserted cassette is a standard cassette or a smaller cassette based on the signals from the detecting switches 313, 335. If the inserted cassette is a standard cassette, then the motor 401 is braked or de-energized to stop the cassette holder 300 in the normal ejecting position. Thereafter, control goes to an end.

If the inserted cassette is a smaller cassette, then a certain period of time is caused to elapse in the step DELAY1 to move the cassette holder 300 in the ejecting direction beyond the normal ejecting position into the overstroke position, and thereafter the motor 401 is braked or de-energized.

Since the smaller cassette held by the cassette holder 300 now projects from the cassette insertion slot, the smaller cassette can easily be taken out.

Then, the motor 401 is rotated in the forward direction to withdraw the cassette holder 300 in the loading direction from the overstroke position beyond the ejecting position in the FWD step. If the signal from the sensor S2 becomes "1", then another period of time is caused to elapse in the step DELAY2. Thereafter, the motor 401 is braked or de-energized. The motor 401 is then reversed again in the REV step to move the cassette holder 300 in the ejecting direction from the withdrawn position. If the signal from the sensor S2 becomes "0", i.e., if the normal ejecting position is reached, the motor 401 is braked or de-energized, and the entire ejecting process is finished.

FIGS. 41 through 45A and 45B illustrate second door lock mechanisms 3000 and second door unlock mechanisms 4000 according to another embodiment of the present invention.

As shown in FIG. 41, the second door 220 has a pair of laterally spaced vertical slots 3033 defined in the respective lateral opposite sides thereof.

Figure 43:
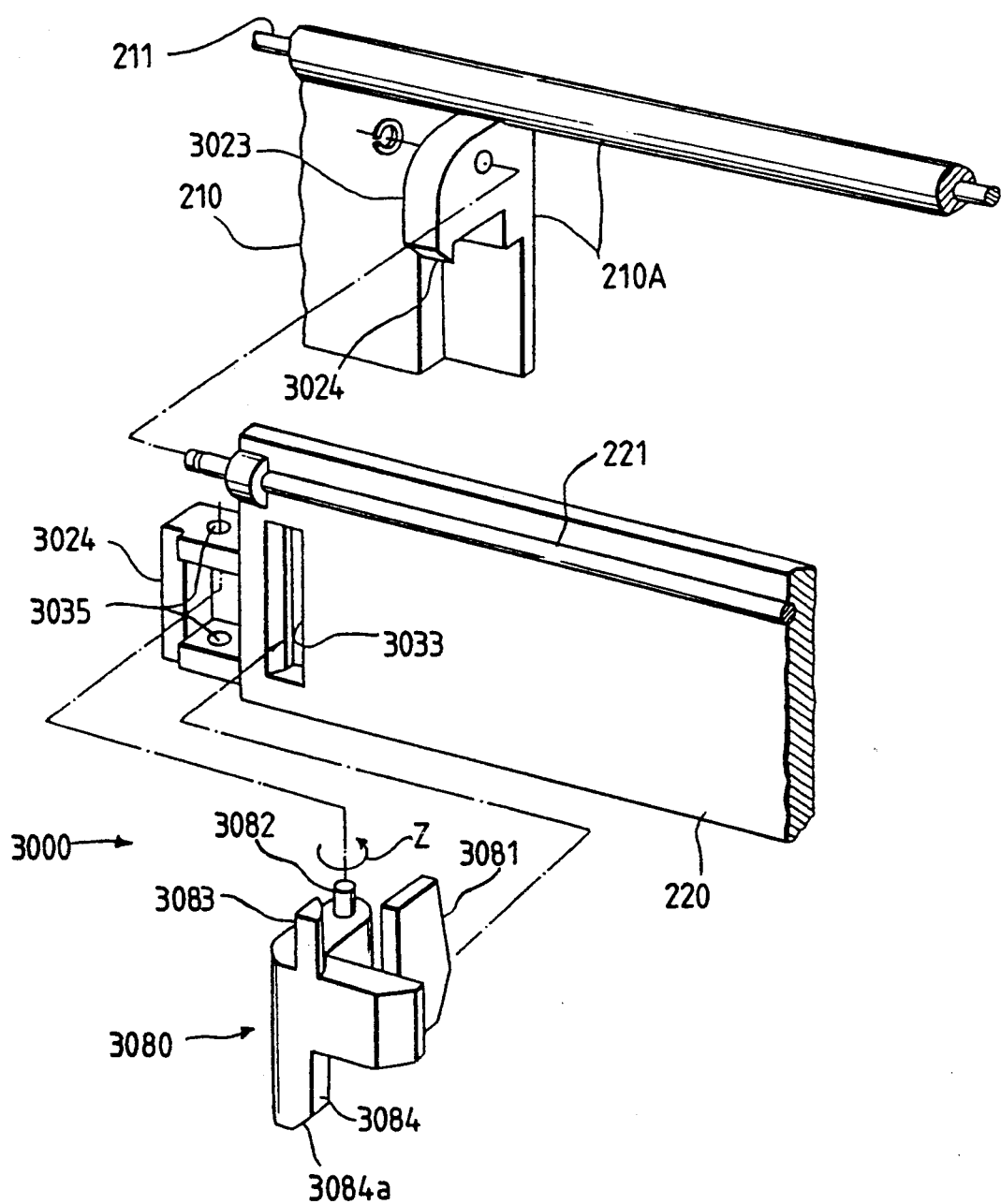
FIG. 43 is an exploded fragmentary perspective view of the second door lock mechanisms and the second door unlock mechanism shown in FIG. 42.
Figure 44:
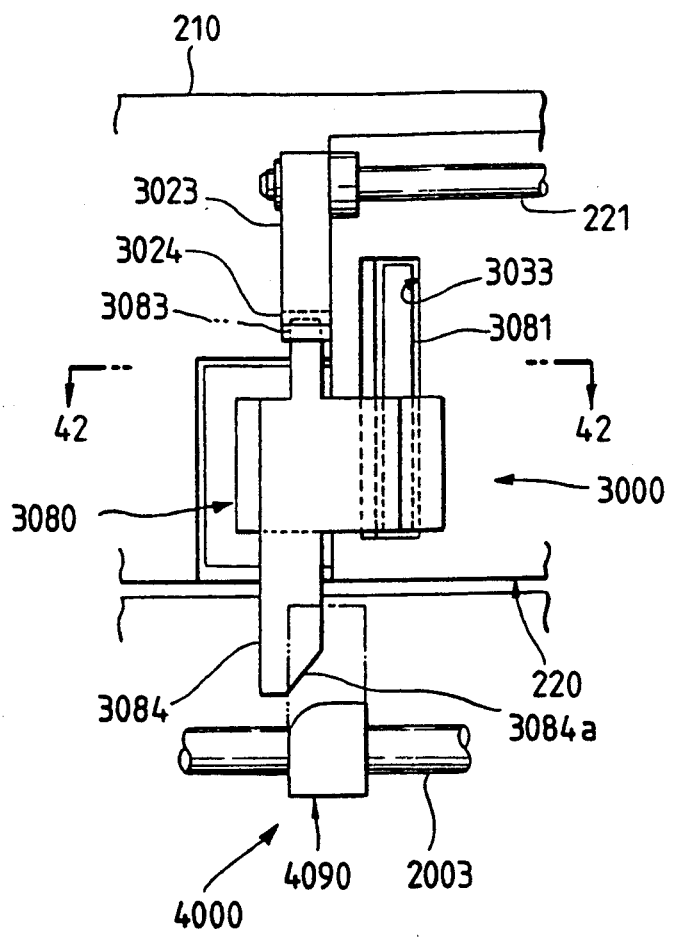
FIG. 44 is a rear elevational view of the second door lock mechanism and the second door unlock mechanism shown in FIG. 42.
Figure 45A:
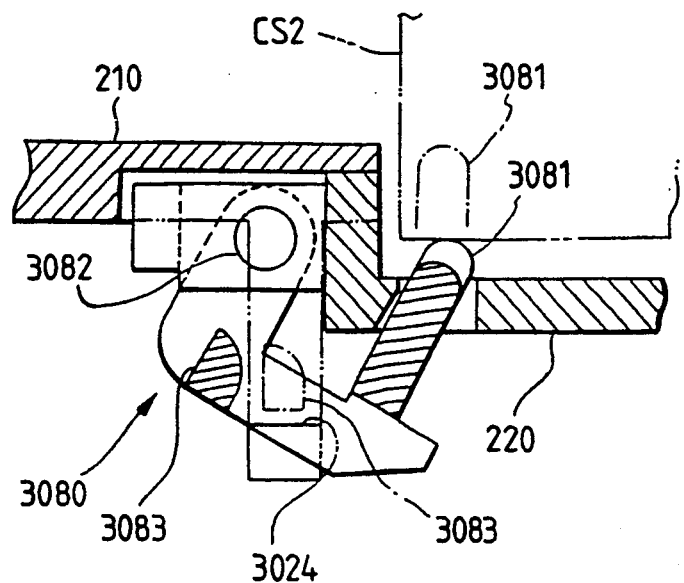
FIGS. 45A and 45B are enlarged fragmentary cross-sectional views showing the manner in which the second door lock mechanism and the second door unlock mechanism shown in FIG. 42 operate.
Figure 45B:
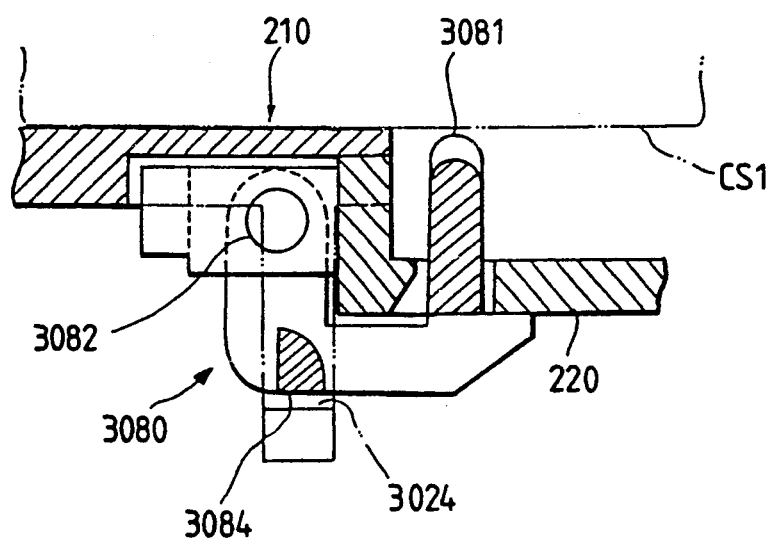
Figure 46:
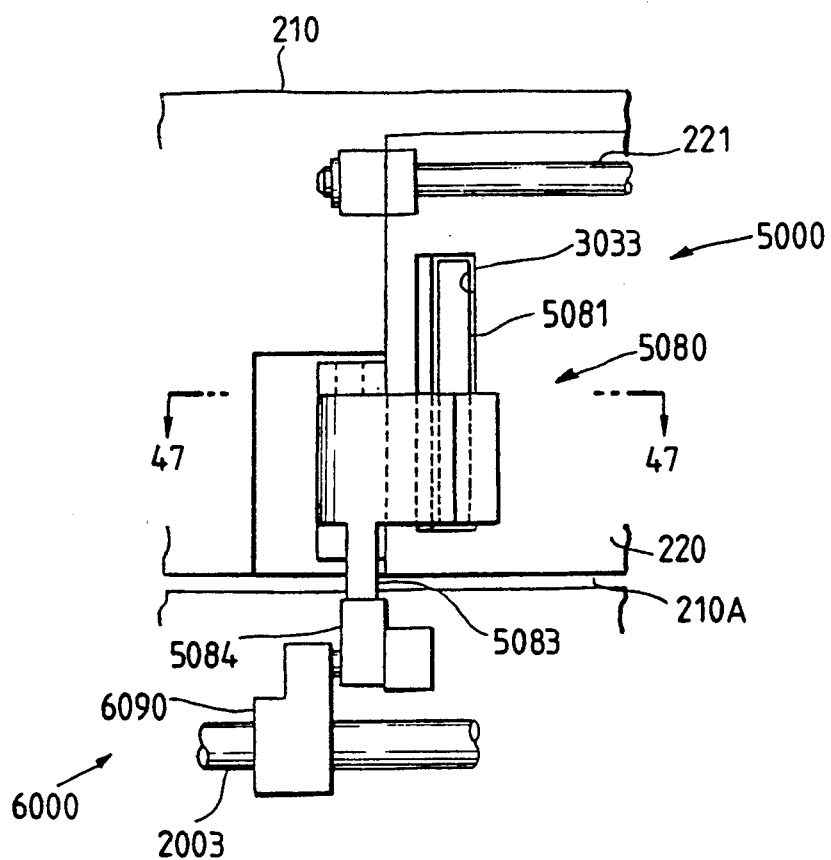
FIG. 46 is a rear elevational view of a second door lock mechanism and a second door unlock mechanism according to still another embodiment of the present invention.

As shown in FIGS. 42 through 44, each of the second door lock mechanisms 3000 includes a hollow block 3034 mounted on one side edge of the second door 220 and positioned immediately outwardly of the vertical slot 3033. The hollow block 3034 has a pair of holes 3035 defined in respective upper and lower ends thereof. The second door lock mechanism 3000 also includes a second door lock member 3080 comprising a wing 3081, a shaft 3082 parallel to the wing 3081, a downwardly projecting lock element 3083 of quadrantal cross section, and a downwardly projecting tongue 3084 below the lock element 3083. The tongue 3084 has a tapered surface 3084a on its lower end. The wing 3081 can be inserted into the vertical slot 3033 in the second door 220. The wing 3081 has a horizontal length selected such that when the wing 3081 is inserted in the vertical slot 3033, the tip end of the wing 3081 projects beyond the front surface of the second door 220 but does not project beyond the front surface of the first door 210, as shown in FIGS. 45A and 45B.

The shaft 3082 has upper and lower ends pivotally inserted in the holes 3035, respectively, in the hollow block 3034. Therefore, the second door lock member 3080 is angularly movable about the shaft 3082. The second door lock member 3080 is normally urged to turn counterclockwise (FIGS. 42 and 43) in the direction indicated by the arrow Z (FIG. 43).

The first door 210 has a pair of rearwardly projecting arms 3023 (only one shown) one on each side of the smaller cassette insertion slot 210A. Each of the arms 3023 has a stopper 3024 projecting downwardly for engagement with the lock element 3083.

The first door 210, the second door 220, and the second door lock member 3080 are assembled together as shown in FIG. 44. Each end of the shaft 221 on the second door 220 is inserted in one of the arms 3023, and the second door lock member 3080 is angularly movably supported on the block 3034 with the wing 3081 received in the vertical slot 3033. The lock element 3083 is disposed behind the stopper 3024.

Each of the second door unlock mechanisms 4000 comprises a second door unlock member 4090 disposed below the second door lock member 3080. The second door unlock member 4090 is fixedly mounted on the shaft 2003 and positioned for engagement with the tapered surface 3084a of the tongue 3084.

When the shaft 2003 is rotated about it own axis, the second door unlock member 4090 is angularly moved into the position indicated by the two-dot-and-dash lines in FIG. 44, pushing the torque 3084 to the left to turn the second door lock member 3080 clockwise about the shaft 3082.

When a smaller cassette CS2 is inserted, from above, as shown in FIG. 45A, the lid of the smaller cassette CS2 pushes the wing 3081, turning the second door lock member 3080 clockwise about the shaft 3082 until the lock element 3083 disengages from the stopper 3024. The second door 220 is now unlocked. When the smaller cassette CS2 is further inserted, the second door 220 is pushed open by the inserted smaller cassette CS2, allowing the smaller cassette CS2 to be inserted continuously.

When a standard cassette CS1 is inserted, from above, as shown in FIG. 45B, the lid of the standard cassette CS1 abuts against the first door 210. Since the wing 3081 does not project beyond the front surface of the first door 210, the wing 3081 is not pushed by the standard cassette CS1, and hence the second door lock member 3080 is held in the locked position by the lock element 3083 and the stopper 3024 as shown in FIG. 45B. Further insertion of the standard cassette CS1 releases the first door 210 from the first door lock mechanisms 240, as described above, and pushes open the first door 210 including the second door 220.

To eject the inserted smaller cassette CS2, the second door unlock member 3090 is turned in response to rotation of the shaft 2003 about its own axis, thereby pushing the tongue 3084 to the left. Since the second door lock member 3080 is turned about the shaft 3082 into the position shown in FIG. 45A, the second door 220 can now be opened by the door opening mechanism shown in FIG. 5.

Except when the standard and smaller cassettes CS1, CS2 are to be inserted, the lock element 3083 of the second door lock member 3080 is locked by the stopper 3024 as shown in FIG. 45B. Therefore, even if manual attempts are made to push open the first and second doors 210, 220, these doors are locked and cannot be opened.

Figure 47:
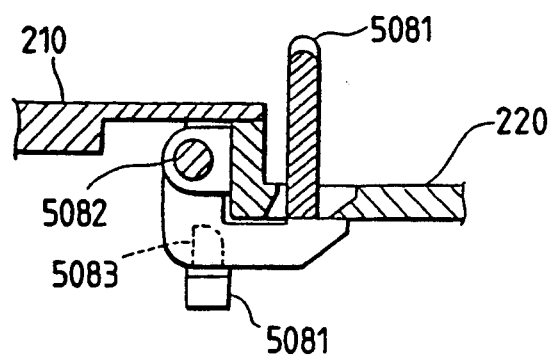
FIG. 47 is a cross-sectional view taken along line 47—47 of FIG. 46.
Figure 48:
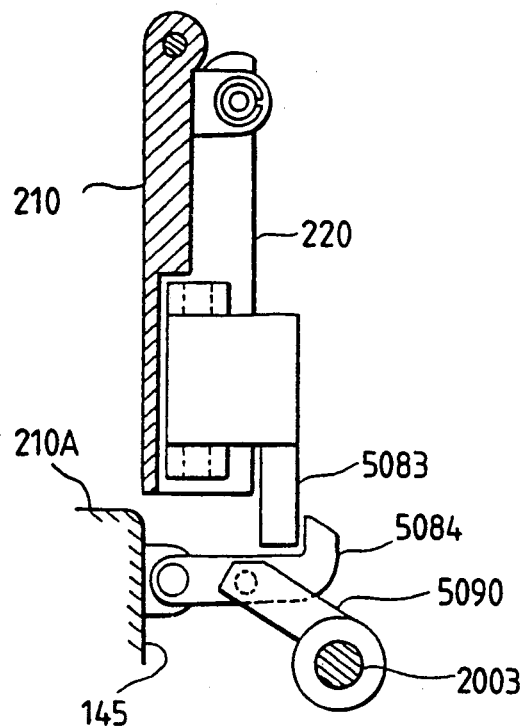
FIG. 48 is a side elevational view, partly in cross section, of the second door lock mechanism and the second door unlock mechanism shown in FIG. 46.

FIGS. 46 through 49 show a second door lock mechanism 5000 and a second door unlock mechanism 6000 according to still another embodiment of the present invention. The second door lock mechanism 5000 includes a second door lock member 5080 having a wing 5081 inserted in the vertical slot 3033 in the second door 220 and normally projecting beyond the front surface of the first door 210 as shown in FIG. 47. The second door lock member 5080 has a downwardly projecting lock element 5083 having a lower end extending downwardly beyond the lower end of the smaller cassette insertion slot 210A. A hook-shaped stopper arm 5084 is vertically swingably mounted on a rear surface of the front panel 145 (FIG. 48) below the smaller cassette insertion slot 210A. The second door unlock mechanism 6000 includes a second door unlock member 6090 fixedly mounted on the shaft 2003 and pivotally coupled to the hook-shaped stopper arm 5084.

Figure 49:
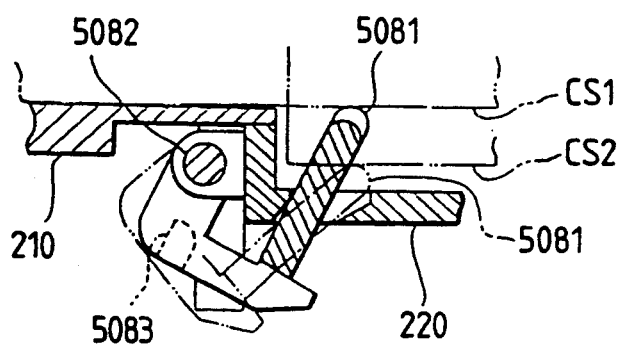
FIG. 49 is an enlarged fragmentary cross-sectional view showing the manner in which the second door lock mechanism and the second door unlock mechanism shown in FIG. 46 operate.

When a smaller cassette CS2 is inserted, as shown in FIG. 49, the lid of the smaller cassette CS2 pushes the wing 5081 to the position indicated by the two-dot-and-dash lines, turning the second door lock member 5080 clockwise about the shaft 5082 until the lock element 5083 disengages from the stopper arm 5084. The second door 220 is now unlocked and can be pushed open by the inserted smaller cassette CS2.

When a standard cassette CS1 is inserted, the lid thereof also pushes the wing 5081 until the second door 220 is unlocked. At the same time, the first door 210 is unlocked and pushed open by the inserted standard cassette CS1.

When no smaller and standard cassettes are inserted, the lock element 5083 remains locked by the stepper arm 5084. Therefore, the first and second door 210, 220 also remain locked and cannot be opened even if they are manually pushed from outside.

To eject the loaded smaller and standard cassettes CS2, CS1, the shaft 2003 is turned counterclockwise (FIG. 48) about its own axis to swing the stopper arm 5084 clockwise. The distal end of the stopper arm 5084 is lowered out of the way of the lock element 5083. The second door 20 is therefore unlocked and can be opened by the door opening mechanism. The first door 210 can also be opened by the door opening mechanism.

Although certain preferred embodiments have been shown and described, it should be understood that many changes and modifications may be made therein without departing from the scope of the appended claims.

What is claimed is:

1. A cassette loading device of the front loading type for selectively loading either a standard cassette or a smaller cassette into a loaded position in a video cassette recorder, comprising:

a housing having a cassette insertion slot;

a door mounted on said housing for selectively opening and closing said cassette insertion slot;

a door lock member mounted on said housing and having a first engaging surface for locking said door in engagement therewith and a tapered surface for engaging a standard cassette upon insertion into said cassette insertion slot in front of said door;

a door unlock member mounted on said housing and having a second engaging surface for engaging the standard cassette which is loaded in the loaded position in the video cassette recorder and a control surface for controlling said door lock member; and the arrangement being such that when the standard cassette is inserted through said cassette insertion slot, said tapered surface of the door lock member is pushed by the inserted standard cassette to disengage said first engaging surface of the door lock member from said door to unlock the door, and when the standard cassette is thereafter brought into the loaded position, said second engaging surface of the door unlock member is engaged by the inserted standard cassette to cause said control surface to keep said first engaging surface of the door lock member out of engagement with said door, for thereby unlocking the door.

2. A cassette loading device of the front loading type for selectively loading either a standard cassette or a smaller cassette into a loaded position in a video cassette recorder, comprising:

a housing having a cassette insertion slot, said cassette insertion slot having a width which is substantially the same as the width of the standard cassette;

a first door mounted on said housing for selectively opening and closing said cassette insertion slot, said first door having an opening defined therein, said opening having a width which is substantially the same as the width of the smaller cassette;

a second door mounted on said first door for selectively opening and closing said opening;

a pair of door lock members mounted on said housing, one on each side of said cassette insertion slot, each of said door lock members having an engaging surface for locking said first door in engagement therewith and a tapered surface for engaging a standard cassette upon insertion into said cassette insertion slot in front of said first door; and the arrangement being such that when no cassette is inserted, said first door is locked at lateral opposite ends thereof against angular movement by said door lock members, and when the standard cassette is inserted through said cassette insertion slot, said tapered surface of each of the door lock members is pushed by the inserted standard cassette to disengage said engaging surface from said first door to unlock the first door, and when the smaller cassette is inserted through said opening, the smaller cassette is guided through said opening for thereby opening said second door.

3. A cassette loading device according to claim 2, further including a pair of door unlock members mounted on said housing, one on each side of said cassette insertion slot, each of said door unlock members having an engaging surface for engaging the standard cassette which is loaded in the loaded position in the video cassette recorder and a control surface for controlling said door lock member; and the arrangement being such that when the standard cassette is inserted through said cassette insertion slot, said tapered surface of each of the door lock members is pushed by the inserted cassette to disengage said engaging surface from said first door to unlock the first door, and when the standard cassette is thereafter brought into the loaded position, said engaging surface of each of the door unlock members is engaged by the inserted standard cassette to cause said control surface to keep said engaging surface of each of the door lock members out of engagement with said front door, for thereby unlocking the door, and when the smaller cassette is inserted through said opening, the smaller cassette is guided through said opening for thereby opening said second door and holding said first door locked by said door lock members.

4. A cassette loading device of the front loading type for selectively loading either a standard cassette or a smaller cassette into a loaded position in a video cassette recorder, comprising:

a housing having a cassette insertion slot, said cassette insertion slot having a width which is substantially the same as the width of the standard cassette;

a cassette holder movably mounted in said housing, for holding a cassette therein;

a first door mounted on said housing for selectively opening and closing said cassette insertion slot, said first door being normally urged to close said cassette insertion slot, said first door having an opening defined therein and having a center positioned out of alignment with the center of said first door, said opening having a width which is substantially the same as the width of the smaller cassette;

a second door mounted on said first door for selectively opening and closing said opening, said second door being normally urged to close said opening and having a control lever on one end thereof;

a pair of door lock members mounted on said housing one on each side of said cassette insertion slot, for locking said first door in engagement therewith;

a catch lever angularly movably mounted on said housing and having a control pin for engaging said first door, said catch lever applying forces tending to open said first door, through said control pin to said first door as the catch lever is angularly moved;

a power transmitting mechanism for moving said cassette holder, said power transmitting mechanism including a main gear having a cam;

a first door opening lever held in engagement with and angularly movable by said cam, said first door opening lever having an end engaging said catch lever;

a second door opening lever held in engagement with and angularly movable by said cam, said second door opening lever having an end engaging said control lever;

a pair of door unlock members mounted on said housing one on each side of said cassette insertion slot, for causing said door lock members to unlock said first door when a standard cassette is placed in the loaded position; and the arrangement being such that when a standard cassette is to be ejected from the loaded position, said main gear is rotated to cause said cam to angularly move said first door opening lever, for thereby angularly moving said catch lever to produce forces tending to open said first door together with said second door, and when a smaller cassette is to be ejected from the loaded position, said main gear is rotated to cause said cam to angularly moving said control lever to open said second door while preventing, with said door lock members, said first door from being opened by the forces produced when said catch lever is angularly moved by said first door opening lever which is angularly moved by said cam.

5. A cassette loading device of the front loading type for selectively loading either a standard cassette or a smaller cassette into a loaded position in a video cassette recorder, comprising:

a housing having a cassette insertion slot, said cassette insertion slot having a width which is substantially the same as the width of the standard cassette;

a first door mounted on said housing for selectively opening and closing said cassette insertion slot, said first door having an opening defined therein and spaced from an end of the first door, said opening having a width which is substantially the same as the width of the smaller cassette;

a second door mounted on said first door for selectively opening and closing said opening;

a pair of first door lock members mounted on said housing one on each side of said cassette insertion slot, each of said door lock members having an engaging surface for locking said first door in engagement therewith against angular movement thereof, and a tapered surface for engaging a standard cassette which is about to be inserted into said cassette insertion slot in front of said first door, to bring said engaging surface out of engagement with said first door thereby to unlock the first door; and a pair of second door lock members mounted on said housing one on each side of said opening at a lower edge thereof, each of said second door lock members having an engaging surface for locking said second door in engagement therewith against angular movement thereof, a standard cassette receiver disposed in said cassette insertion slot and engageable with and movable by a bottom of a standard cassette, at a position off an opening defined therein, which standard cassette is about to be inserted into said cassette insertion slot in front of said second door, thereby to unlock said second door, and a smaller cassette receiver disposed in said opening and engageable with and movable by a bottom of a smaller cassette, at a position off an opening defined therein, which smaller cassette is about to be inserted into said opening, thereby to unlock only said second door.

6. A cassette loading device of the front loading type for selectively loading either a standard cassette or a smaller cassette into a loaded position in a video cassette recorder, comprising:

a housing having a cassette insertion slot;

a door mounted on said housing for selectively opening and closing said cassette insertion slot;

a door lock member mounted on said housing and having an engaging surface for locking said door in engagement therewith and a tapered surface for engaging a standard cassette upon insertion into said cassette insertion slot in front of said door;

a power transmitting mechanism for moving the standard cassette inserted through said cassette insertion slot into the loaded position, said power transmitting mechanism having a gear; and a door unlock mechanism mounted in said housing and including a control element for controlling said door lock member to lock said door when no cassette is inserted, and for turning said door lock member out of locking engagement with said door to keep the door unlocked, in response to rotation of said gear, when a standard cassette is inserted through said cassette insertion slot and moved into the loaded position.

7. A cassette loading device of the front loading type for selectively loading either a standard cassette or a smaller cassette into a loaded position in a video cassette recorder, comprising:

a housing having a cassette insertion slot, said cassette insertion slot having a width which is substantially the same as the width of the standard cassette;

a first door mounted on said housing for selectively opening and closing said cassette insertion slot, said first door having an opening defined therein and spaced from an end of the first door, said opening having a width which is substantially the same as the width of the smaller cassette;

a second door mounted on said first door for selectively opening and closing said opening; and a pair of door lock members mounted on said housing one on each side of said opening at a lower edge thereof, each of said second door lock members having an engaging surface for locking said second door in engagement therewith against angular movement thereof when no cassette is inserted, a step disposed in said opening for guiding lower corners of a smaller cassette which is inserted through said opening, thereby to limit the smaller cassette in lateral position, and a smaller cassette receiver disposed in said opening and engageable with and movable by a bottom of the inserted smaller cassette, thereby to unlock said second door.

8. A cassette loading device of the front loading type for selectively loading either a standard cassette or a smaller cassette into a loaded position in a video cassette recorder, comprising:

a housing having a cassette insertion slot, said cassette insertion slot having a width which is substantially the same as the width of the standard cassette;

a first door mounted on said housing for selectively opening and closing said cassette insertion slot, said first door having an opening defined therein and spaced from an end of the first door, said opening having a width which is substantially the same as the width of the smaller cassette;

a second door mounted on said first door for selectively opening and closing said opening; and a pair of guides mounted on said second door in said opening and projecting from said second door toward said first door, for guiding upper corners of a smaller cassette which is inserted through said opening, thereby to limit the smaller cassette in lateral position.

9. A cassette loading device of the front loading type for selectively loading either a standard cassette or a smaller cassette into a loaded position in a video cassette recorder, comprising:

a housing having a cassette insertion slot, said cassette insertion slot having a width which is substantially the same as the width of the standard cassette;

a first door mounted on said housing for selectively opening and closing said cassette insertion slot, said first door having an opening defined therein and spaced from an end of the first door, said opening having a width which is substantially the same as the width of the smaller cassette;

a second door mounted on said first door for selectively opening and closing said opening;

a pair of door lock members mounted on said housing one on each side of said opening at a lower edge thereof, each of said door lock members having an engaging surface for locking said second door in engagement therewith against angular movement thereof when no cassette is inserted, a step disposed in said opening for guiding lower corners of a smaller cassette which is inserted through said opening, thereby to limit the smaller cassette in lateral position, and a smaller cassette receiver disposed in said opening and engageable with and movable by a bottom of the inserted smaller cassette, thereby to unlock said second door; and a pair of guides mounted on said second door in said opening and projecting from said second door toward said first door, for guiding upper corners of a smaller cassette which is inserted through said opening, thereby to limit the smaller cassette in lateral position.

10. A cassette loading device of the front loading type for selectively loading either a standard cassette or a smaller cassette into a loaded position in a video cassette recorder, comprising:

a housing having a cassette insertion slot, said cassette insertion slot having a width which is substantially the same as the width of the standard cassette;

a cassette holder movably mounted in said housing, for holding a cassette which is inserted;

a first door mounted on said housing for selectively opening and closing said cassette insertion slot, said first door having an opening defined therein and spaced from an end of the first door, said opening having a width which is substantially the same as the width of the smaller cassette;

a second door mounted on said first door for selectively opening and closing said opening;

a pair of door lock members mounted on said second door one on each side of said opening at a lower edge thereof, for locking said second door with respect to said first door, each of said door lock members having a wing movably extending through said second door, a shaft angularly movably supported on said second door for turning said door lock member thereabout, and a lock element, said first door having a stopper for engaging said lock element to lock said second door with respect to said first door; and the arrangement being such that when a smaller cassette is inserted through said opening, said wing is pushed by the smaller cassette to turn said door lock member about said shaft for thereby bringing s id lock element out of engagement with said stopper, whereby said second door is unlocked from said first door and can be opened by the inserted smaller cassette, and when no cassette is inserted through said opening, said lock element is engaged by said stopper thereby locking said second door with respect to said first door.

11. A cassette loading device according to claim 10, wherein each of said door lock members has a tongue spaced from said shaft, further including a pair of door unlock members mounted in said housing, each for pushing said tongue to turn said door lock member for bringing said lock element out of engagement with said stopper, the arrangement being such that when a loaded smaller cassette is ejected, said tongue is pushed by said door unlock member to turn said door lock member thereby unlocking said second door from said first door.

12. A cassette loading device of the front loading type for selectively loading either a standard cassette or a smaller cassette into a loaded position in a video cassette recorder, comprising:

a housing having a cassette insertion slot, said cassette insertion slot having a width which is substantially the same as the width of the standard cassette;

a cassette holder movably mounted in said housing, for holding a cassette which is inserted;

a first door mounted on said housing for selectively opening and closing said cassette insertion slot, said first door having an opening defined therein and spaced from an end of the first door, said opening having a width which is substantially the same as the width of the smaller cassette;

a second door mounted on said first door for selectively opening and closing said opening;

a pair of door lock members mounted on said second door, one on each side of said opening at a lower edge thereof, for locking said second door with respect to said housing, each of said door lock members having a wing movably extending through said second door beyond said first door, a shaft angularly movably supported on said second door for turning said door lock member thereabout, and a lock element extending beyond a lower edge of said opening, said housing having a pair of stopper arms each for engaging said lock element to lock said second door with respect to said housing; and the arrangement being such that when a standard or smaller cassette is inserted, said wing is pushed by the cassette to turn said door lock member about said shaft for thereby bringing said lock element out of engagement with said stopper arm, whereby said second door is unlocked from said housing and can be opened by the inserted cassette, and when no cassette is inserted, said lock element is engaged by said stopper arm thereby locking said second door with respect to said housing.

13. A cassette loading device according to claim 12, wherein said stopper arm is angularly movably mounted on said housing, further including a pair of door unlock members mounted in said housing, each for turning said stopper arm for bringing said stopper arm out of engagement with said lock element, the arrangement being such that when a loaded standard or smaller cassette is ejected, said stopper arm is turned by said door unlock member out of engagement with said lock element thereby unlocking said second door from said housing.

* * * * *